United States Patent [19]

Abraham

[11] Patent Number: 5,625,863

[45] Date of Patent: Apr. 29, 1997

[54] VIDEO DISTRIBUTION SYSTEM USING IN-WALL WIRING

[75] Inventor: Charles Abraham, Wayne, Pa.

[73] Assignee: VideoCom, Inc., Wayne, Pa.

[21] Appl. No.: 526,871

[22] Filed: Sep. 12, 1995

Related U.S. Application Data

[63] Continuation-in-part of Ser. No. 304,495, Sep. 12, 1994, Pat. No. 5,592,482, which is a continuation-in-part of Ser. No. 180,421, Jan. 11, 1994, abandoned, which is a continuation-in-part of Ser. No. 822,329, Jan. 17, 1992, abandoned, which is a continuation of Ser. No. 515,578, Apr. 26, 1990, abandoned, which is a continuation-in-part of Ser. No. 429,208, Oct. 30, 1989, abandoned, which is a continuation-in-part of Ser. No. 344,907, Apr. 28, 1989, abandoned.

[51] Int. Cl.⁶ ............................................. H04N 7/10
[52] U.S. Cl. ........................ 455/3.3; 348/6; 340/310.01
[58] Field of Search ........................... 348/6, 8; 455/3.3, 455/6.3; 340/310.01–310.08

[56] References Cited

U.S. PATENT DOCUMENTS

| | | | |
|---|---|---|---|
| 4,412,553 | 11/1983 | Pal et al. | 348/8 |
| 4,994,909 | 2/1991 | Graves et al. | 358/86 |
| 5,010,399 | 4/1991 | Goodman et al. | 348/14 |
| 5,247,347 | 9/1993 | Litteral et al. | 358/85 |
| 5,327,230 | 7/1994 | Dockery | 348/8 |
| 5,334,975 | 8/1994 | Wachub et al. | 348/8 |
| 5,351,272 | 9/1994 | Abraham | 375/38 |

OTHER PUBLICATIONS

"Color Bursts", Communications Engineering and Design, p. 10, (Nov. 1992).

"Transmission of Full–Motion Analog and Digital Video and other Wideband Signals over the Twisted Pair Wiring Internal and Apartment and Office Buildings", Inline Connection Corporation, pp. 1–19, (Jul. 1993).

David D. Goodman, "Using the Telephone Wires Internal to a Residence for the Distribution of Broadband Signals to Settops and Computers", Inline Connection Corporation Standards Project, pp. 1–14, (Aug. 1993).

David D. Goodman, "Distribution of Broadband Signals to the Individual Units of an Apartment Building using Internal Telephone Wires", Inline Connection Corporation Standards Project, pp. 1–6, (Aug. 1993).

Eric Miller, "Creating a critical vehicle for the new 'information superhighways'", Microware Interactive Digital Television Networks, pp. 1–6.

*Primary Examiner*—John K. Peng
*Assistant Examiner*—Nathan J. Flynn
*Attorney, Agent, or Firm*—Panitch Schwarze Jacobs & Nadel, P.C.

[57] ABSTRACT

A cable television/video distribution and selection system for distributing video signals throughout a home or building over in-wall electrical wiring. A remote device is connected to a display monitor or television set and also to the electrical wiring through an electrical outlet. The remote device is comprised of a first video signal selector device which is used by a user to generate a selection signal which corresponds to the cable television channel which the user has selected. The remote device also includes a transmitter/receiver for sending the selection signal over the electrical wiring to a tuner and then receiving the video signal (television station) from the tuner. The transmitter/receiver matches the characteristic impedance of the electrical wiring and is tuned to a predetermined frequency band. The distribution device is connected to the electrical wiring and also to a video signal source, such as a cable television cable entering the building. The distribution device contains a second transmitter/receiver which is tuned to the same frequency band as the remote device and is similarly matched to the characteristic impedance of the electrical wiring. The distribution device also contains a tuner for tuning the cable television channel corresponding to the selector signal it receives from the remote device. After the requested channel is tuned by the tuner, the video signal is sent back to the remote device for viewing on the display monitor.

14 Claims, 56 Drawing Sheets

OTHER PUBLICATIONS

David D. Goodman, "Using the IEEE LAN Coding System to Communicate Bitstreams across Internal Telephone Wiring (in Coordination with Transmission of Analog Video)", Inline Connection Corporation Standards Project, pp. 1–9, (Nov. 1993).

David D. Goodman, "On 2–Way Broadband Communication over POTS Internal to the Residence", Inline Connection Corporation Standards Project, pp. 1–19, (Oct. 1993).

POWER LINE SPREAD SPECTRUM TRANSMITTER

POWER LINE SPREAD SPECTRUM RECEIVER

VIDEO DISTRIBUTION SYSTEM USING IN-WALL WIRING

RELATED APPLICATIONS

This application is a continuation-in-part of U.S. application Ser. No. 08/304,495, filed Sep. 12, 1994, now U.S. Pat. No. 5,592,482, which is a Continuation-In-Part of U.S. application Ser. No. 08/180,421, filed Jan. 11, 1994 now abandoned, which is a continuation-in-part of U.S. application Ser. No. 07/822,329, filed Jan. 17, 1992 (now abandoned), which is a continuation of U.S. application Ser. No. 07/515,578, filed Apr. 26, 1990 (now abandoned), which is a continuation-in-part of U.S. application Ser. No. 07/429,208, filed Oct. 30, 1989 (now abandoned), which is a continuation-in-part of U.S. application Ser. No. 07/344,907, filed Apr. 28, 1989 (now abandoned).

FIELD OF THE INVENTION

The present invention relates to a video distribution and selection system used to distribute cable television (CATV) and video signals over existing AC wiring in a building.

BACKGROUND OF THE INVENTION

A common system for distributing television signals is known as a cable television system. Cable television systems distribute television channels over coaxial cable networks laid out between a cable broadcasting facility and a cable customer's house or building. With the advent of fiber optics, fiber optic cable is also used for the cable television network which exists between the cable broadcasting facility and a customer's home.

Regardless of whether the cable signal is distributed over fiber optic cable or coaxial cable, when the cable hook-up is made at a customer's home, coaxial cable is currently used to distribute the cable television signal throughout a customer's house. In structures built before the advent of cable television and coaxial cable usage, there is no existing cabling in the structure. If cable television is desired, it is necessary to wire each room in the building where a television set is to be used. As pointed out in Applicant's co-pending applications, this requires running new coaxial cable to each room where a television set is to be used and may involve draping cable over the outside walls of the house and drilling through the walls or the window frames of each room to run the cable. In order to provide multiple outlets in a particular room, it is necessary to split the cable and snake the cable through the walls or ceiling or along the baseboards to the desired locations. These requirements can be expensive, unsightly, and cause a degree of damage to the external and internal walls of the building.

Even in new construction, coaxial cable wiring has its disadvantages. The new construction may be "under wired" by not running cable to every room in the building where a television set will ultimately be used. Further, there may be only one cable television outlet installed per room. If a user's ultimate layout of a room does not include a television on the wall where the cable television outlet is located, it is necessary to run a cable wire from the outlet to the location of the television set.

With the increasing number of stations available through cable television, users may require and/or desire access to all of the available stations. In the current cable television systems, all cable television channels are broadcast throughout the house over the coaxial cable. As the number of available channels approaches into the hundreds, the present system becomes unworkable as there is a limit of approximately 100 channels (of programming) which can be simultaneously broadcast over conventional coaxial cable in an uncompressed analog format. This results in a limitation of present cable distribution systems within a house or other structure.

Another limitation of present cable systems relates to the Pay Per View channels. Pay Per View channels require a user to communicate the channel which the user desires to view to the cable television broadcasting facility. The cable television broadcasting facility then sends a signal to the user's cable selector box, allowing the signal for the requested channel to be viewed.

Selecting a Pay Per View channel incurs an additional cost for the user above the normal cable charges. Pay Per View programs are typically selected by tuning to a particular Pay Per View channel on the user's cable selector which is provided by the cable company. The cable selector box is connected to a telephone outlet in the user's house (in addition to the connection to the cable line). A call is made over the user's telephone line to the cable company through the selector box and the user's account is accordingly noted and debited. The use of Pay Per View in current cable systems requires a telephone outlet in proximity to the cable selector box to connect to the cable selector box in order to allow Pay Per View selection. This multiplies the problem of cable outlets by requiring that not only does every room require a cable outlet in a location convenient for installation of a television, but now requires a telephone outlet in every room. This telephone outlet must also be in proximity to the cable television selector in order to make a connection. The further a telephone outlet is located from the cable television selector box, the longer and more noticeable will be the telephone wiring running between the telephone outlet and cable selector box.

Goodman (U.S. Pat. No. 5,010,399) discloses a video transmission and control system utilizing internal telephone lines to distribute a television signal. One of the limitations of Goodman is that in order to simultaneously transmit more than one video/television signal, it is necessary to tune the receiver/selector of Goodman to an alternate VHF channel. For example, if a first receiver/selector is operating on VHF channel 3 or 4 as is common in video communication devices connected to television sets such as cable convertors, VCRs, and laser disc players), a second television selector/receiver is required to operate at a different VHF channel such as channel 5 or 6. As it is not unusual to have more than two television sets operating in a home or building, it is necessary to move upward in the VHF channels to allow additional television sets. Such a system increases the chance of interference from broadcast stations as more channels are used, particularly in overlapping broadcast regimes in urban areas.

Accordingly, it is desirable to be able to operate multiple, inadequate television sets simultaneously within a home or building without the need for coaxial cable. It is also desirable to allow selection of cable television channels or alternate video sources using a device which interfaces with the television on VHF channel 3 or 4 for each of the multiple, independent and simultaneous televisions used.

SUMMARY OF THE INVENTION

The present invention comprises a cable television/video distribution and selection system for distributing video signals throughout a home or building over in-wall electrical wiring. A remote device is connected to a display monitor or television set and also to the electrical wiring through an electrical outlet. The remote device is comprised of a first video signal selector device which is used by a user to generate a selection signal which corresponds to the cable television channel which the user has selected. The remote device also includes a transmitter/receiver for sending the selection signal over the electrical wiring to a tuner and then receiving the video signal (television station) from the tuner. The transmitter/receiver matches the characteristic impedance of the electrical wiring and is tuned to a predetermined frequency band.

The distribution device is connected to the electrical wiring and also to a video signal source, such as a cable television cable entering the building. The distribution device contains a second transmitter/receiver which is tuned to the same frequency band as the remote device and is similarly matched to the characteristic impedance of the electrical wiring. The distribution device also contains a tuner for tuning the cable television channel corresponding to the selector signal it receives from the remote device. After the requested channel is tuned by the tuner, the video signal is sent back to the remote device for viewing on the display monitor.

BRIEF DESCRIPTION OF THE FIGURES

The invention will now be described by way of nonlimiting example, with reference to the attached drawings in which.

DETAILED DESCRIPTION

In order to fully understand the application of the invention disclosed herewith, it is necessary to understand power lines and coupling technology. Power line coupling technology has been the subject of U.S. patent application Ser. No. 08/270,002 filed Jul. 1, 1994, and European Patent No. EP90-907-855.2. The following extended explanation reviews power line coupling technology as described and as necessary to practice the video distribution system disclosed herewith.

Background of Power Line Coupler Technology

"Power-line carriers" are well known in the field of power system communications. The principal elements of such power-line carriers are transmitting and receiving terminals, which include one or more line traps, one or more coupling capacitors, as well as tuning and coupling equipment. Detailed information regarding the description and typical composition of conventional power line carriers may be found in Fundamentals Handbook of Electrical and Computer Engineering, Volume II: Communication, Control, Devices, and Systems, John Wiley & Sons, 1983, pp 617–627, the contents of which are incorporated herein by reference.

A significant problem associated with prior art power-line carriers is their requirement for one or more line traps, one or more capacitors, one or more coupling transformers or one or more carrier frequency hybrid circuits and frequency connection cables. The new power-line carrier system presents a solution to the fundamental problem of matching the electrical line characteristic impedance with the line coupler. The novel signal coupler design is easily adaptable for operation on distribution and low voltage lines.

All traditional couplers incorporate a ferrite or iron core transformer which causes signal distortion due to the non-linear phase characteristic of the transfer function between the transmit coupler and the receive coupler. The distortion is created by the presence of magnetic core material which exhibits hysteresis. For distribution power-line carriers, the distortion is particularly severe because the signal must propagate through three such non-linear devices, the distribution transformer and two power-line couplers, that use ferrite core transformers. The distortion leads to envelope delay distortion which limits communication speeds.

Figure 25:
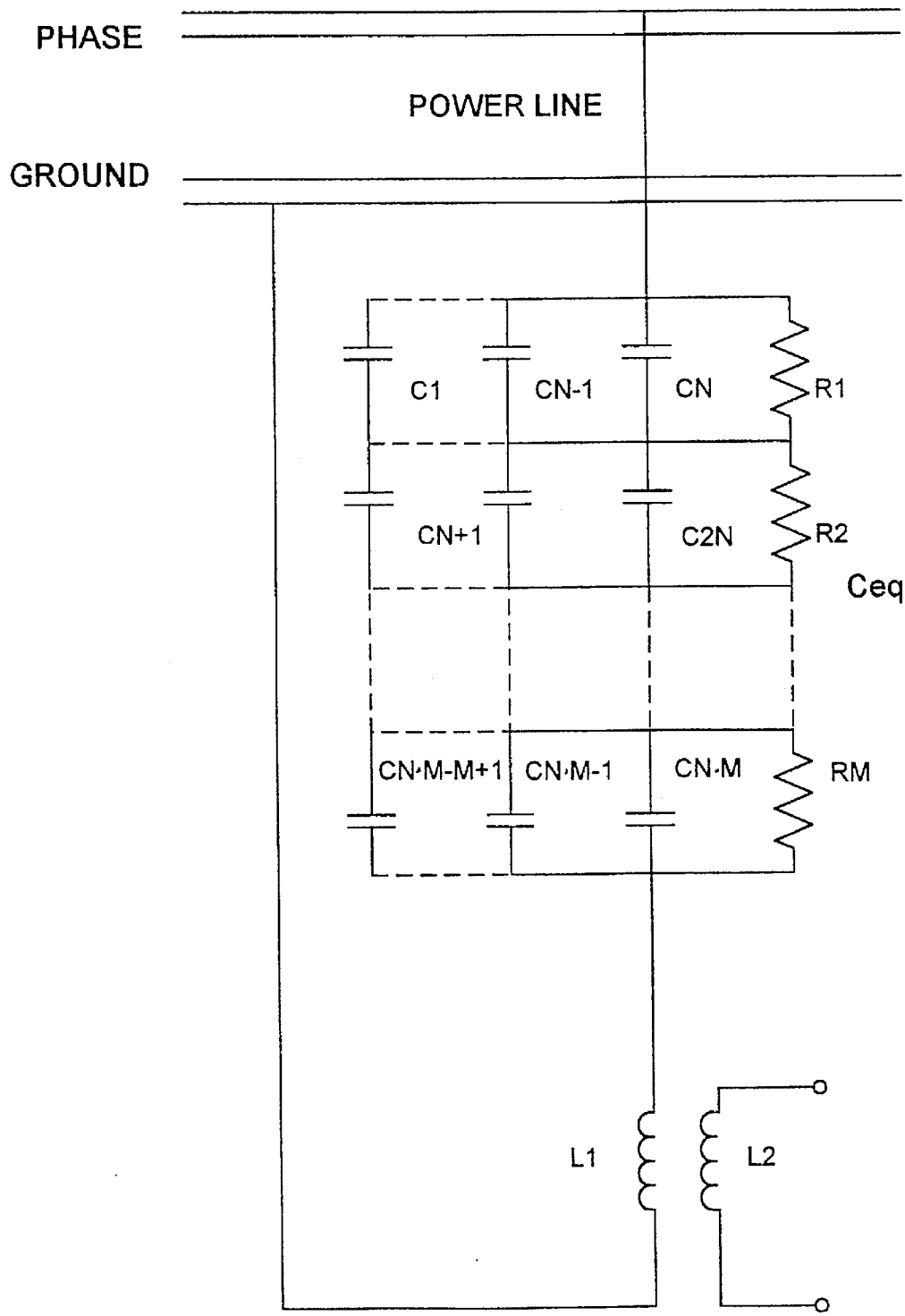
FIG. 25 schematically represents the general circuit diagram of the phase shift linear coupler of the present invention.

A line with characteristic impedance Zo is ideally matched by terminations equal to Zo at both ends. Since Zo is primarily resistive at the frequencies of interest, the input impedance of the couplers should also be primarily resistive and equal to Zo at the carrier frequencies. A general configuration to achieve this is shown in FIG. 25. It uses a serially connected equivalent capacitor, Ceq. on the primary off a transformer. The design is based on two principles. First, the resonance between the coupling capacitor, Ceq and the primary winding inductance, L1, provides a low resistive impedance at the desired transmit carrier frequency. Second, Ceq has a large enough impedance at 60 Hz to block the line frequency. Note that this approach is not new, however, previous efforts at achieving satisfactory impedance matching encountered problems discussed below.

Figure 22:
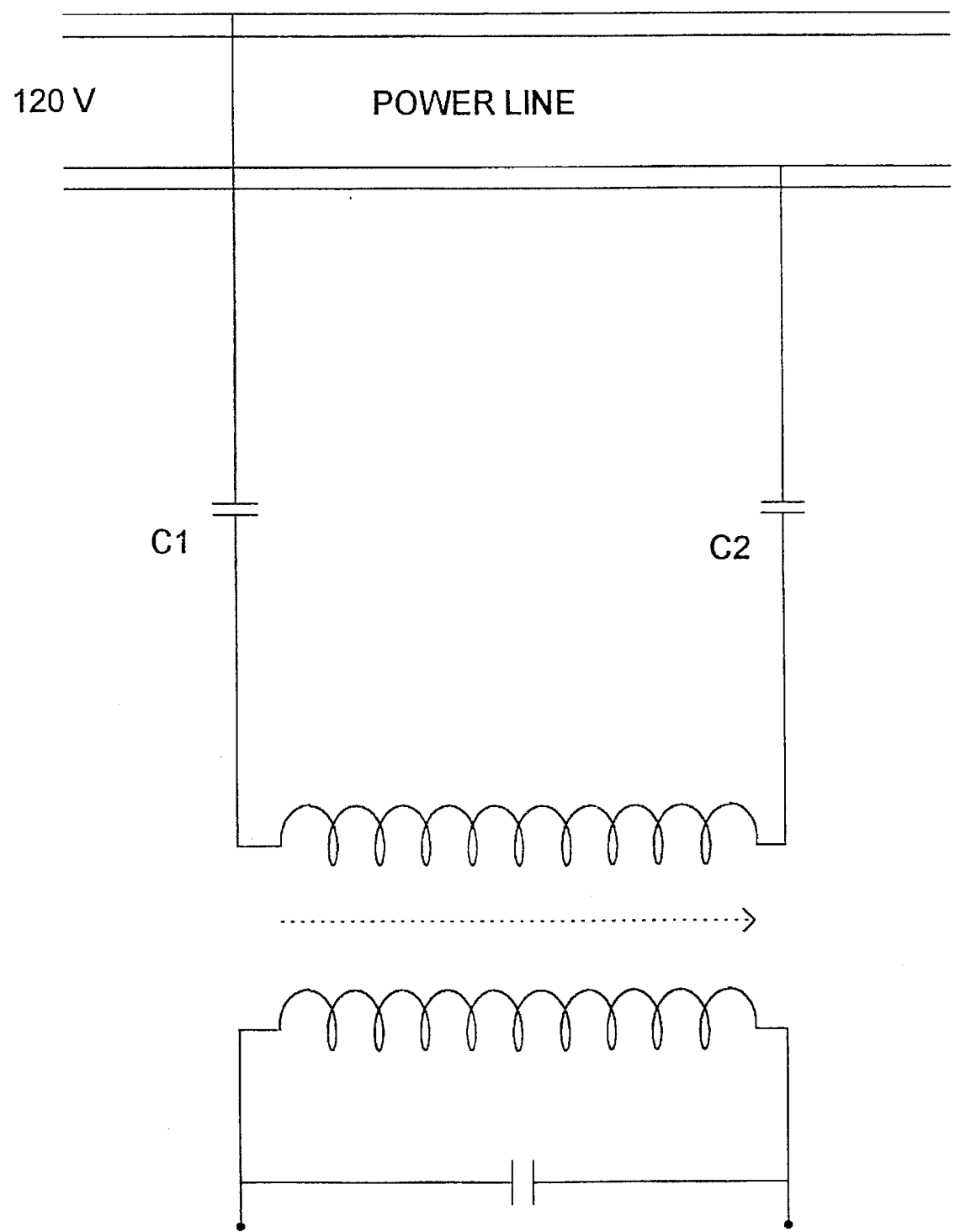
FIGS. 22 and 23 schematically represent traditional duplexing couplers on both low and high voltage power lines.
Figure 23:
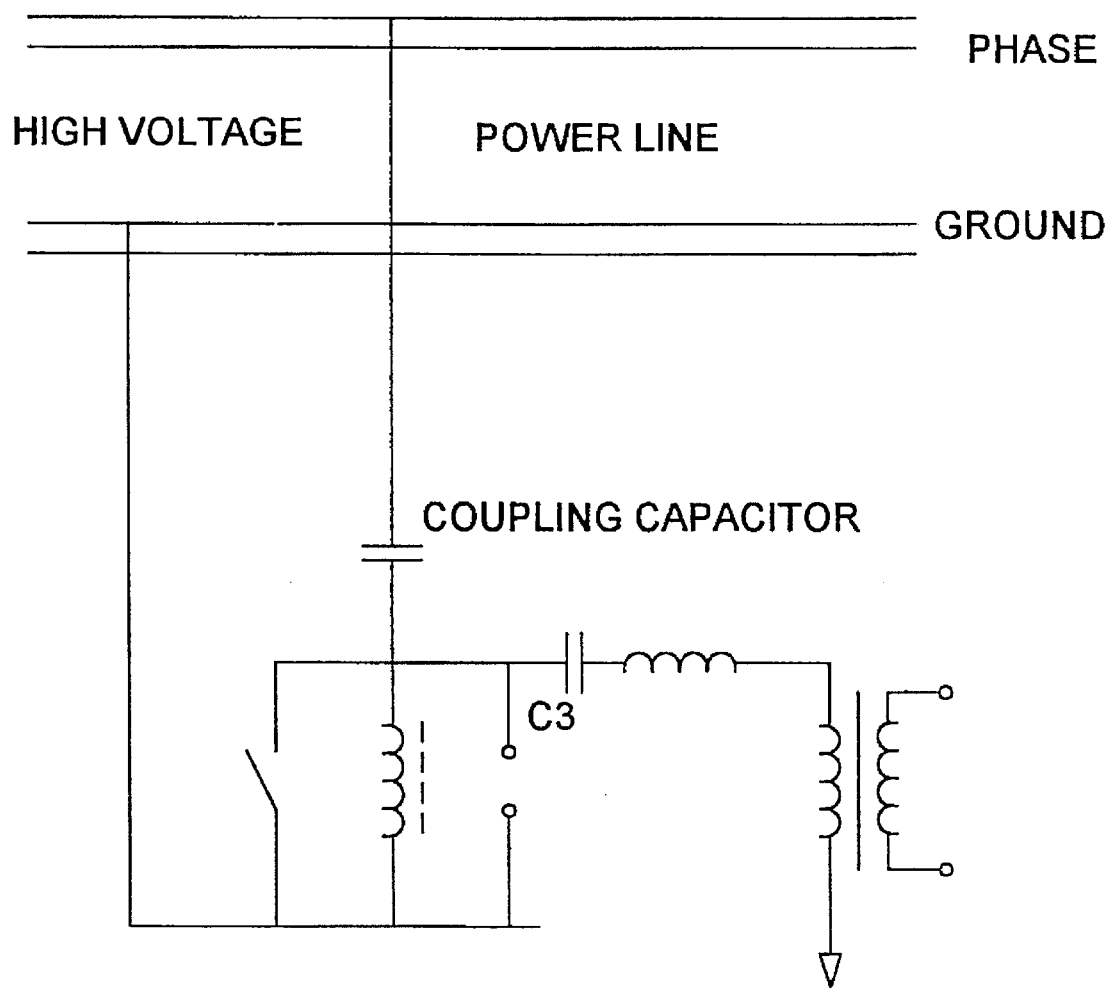

The major shortcoming of previous designs resulted from the use of ferrite or iron core transformers in the signal couplers. The inductance, L1, is altered to some unknown valve due to the non-linearity of the core. This results in a mistuning of the desired carrier frequency. Also, the impedance of the primary winding at the desired carrier frequency is no longer purely resistive. This may lead to a mismatch with respect to the line characteristic impedance. In recognition of this fact, other designs (FIGS. 22, 23) attempt to merely couple the signal onto the power line with a low transceiver input impedance by using a large coupling capacitor (approx. 0.5 uF). This results in a significant coupling loss of up to 20 dB at carrier frequency.

Figure 35:
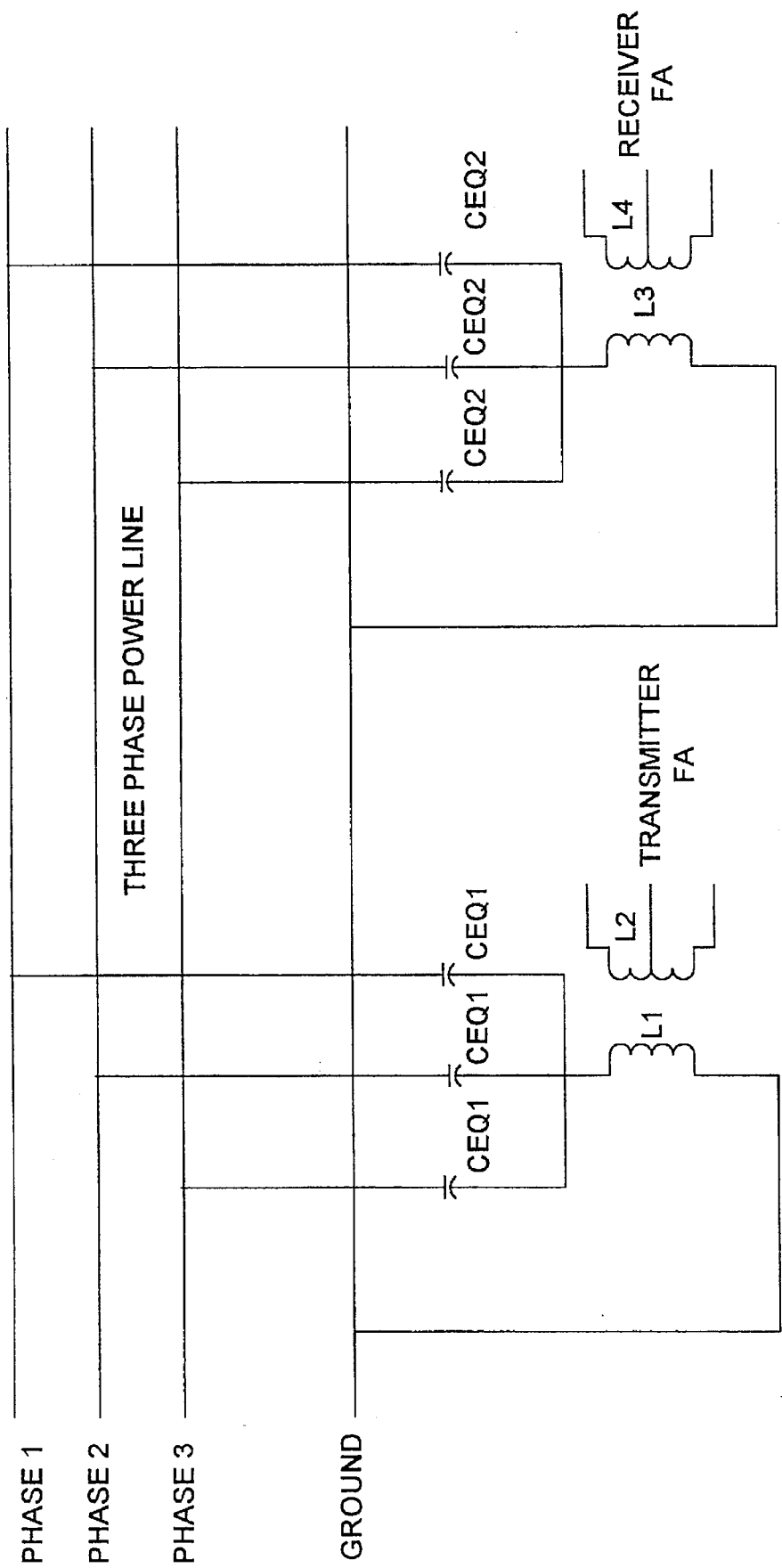
FIG. 35 is a schematic representation of a three phase coupling to the power line, three phases to ground.

The present invention, characterized in FIG. 35, has two coaxial solenoids or air-coils of different diameter with primary and secondary inductances L1 and L2 respectively. Both L1 and L2 are inductively and capacitively coupled creating an air-core transformer (see FIG. 30A). The air-gap is filled with resin which insulates the AC current from the transceiver. The size of the gap is selected to reduce inductive loading effects from coupler secondary to the primary. Since the coupling capacitor, Ceq, is significantly larger than the static capacitor, Cs the static capacitor (FIG. 41) does not mistune the desired carrier frequency. Inductive loading effects from the secondary to primary of the air-core transformer are minimized at the transmit frequency. The effective transceiver input independence, as seen at the primary, is equal to the resistance of the primary winding (Rt or Rr). This value can be chosen to optimally match the line characteristic independence. When Zo equals the resistance of the primary winding, Rt, of the air-core transformer about 25% of the source power can be coupled into the line through the power line coupler. Note that Zo varies between 5 and 150 Ohms on distribution lines and 1 and 20 Ohms on 120/240 V network lines depending on loading conditions. Since insertion loss increases rapidly for termination impedances were the primary winding impedance is greater than Zo (as compared to primary winding impedance less than Zo), a prudent design choice is to use a value of primary winding resistance approximately equal to the minimum value of the line characteristic impedance, Zo.

Figure 24:
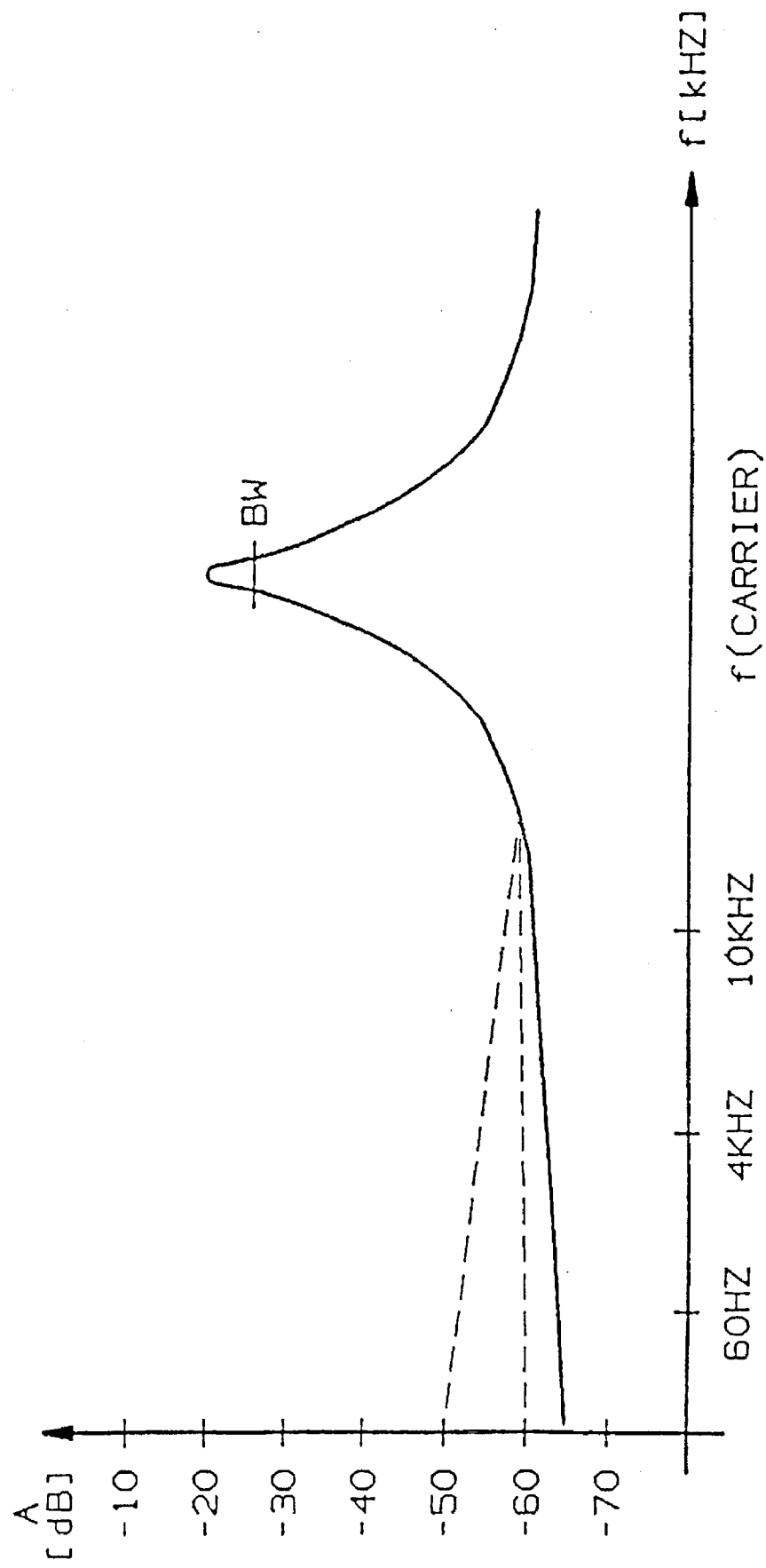
FIG. 24 illustrates the frequency characteristics of traditional serial LC couplers.
Figure 26:
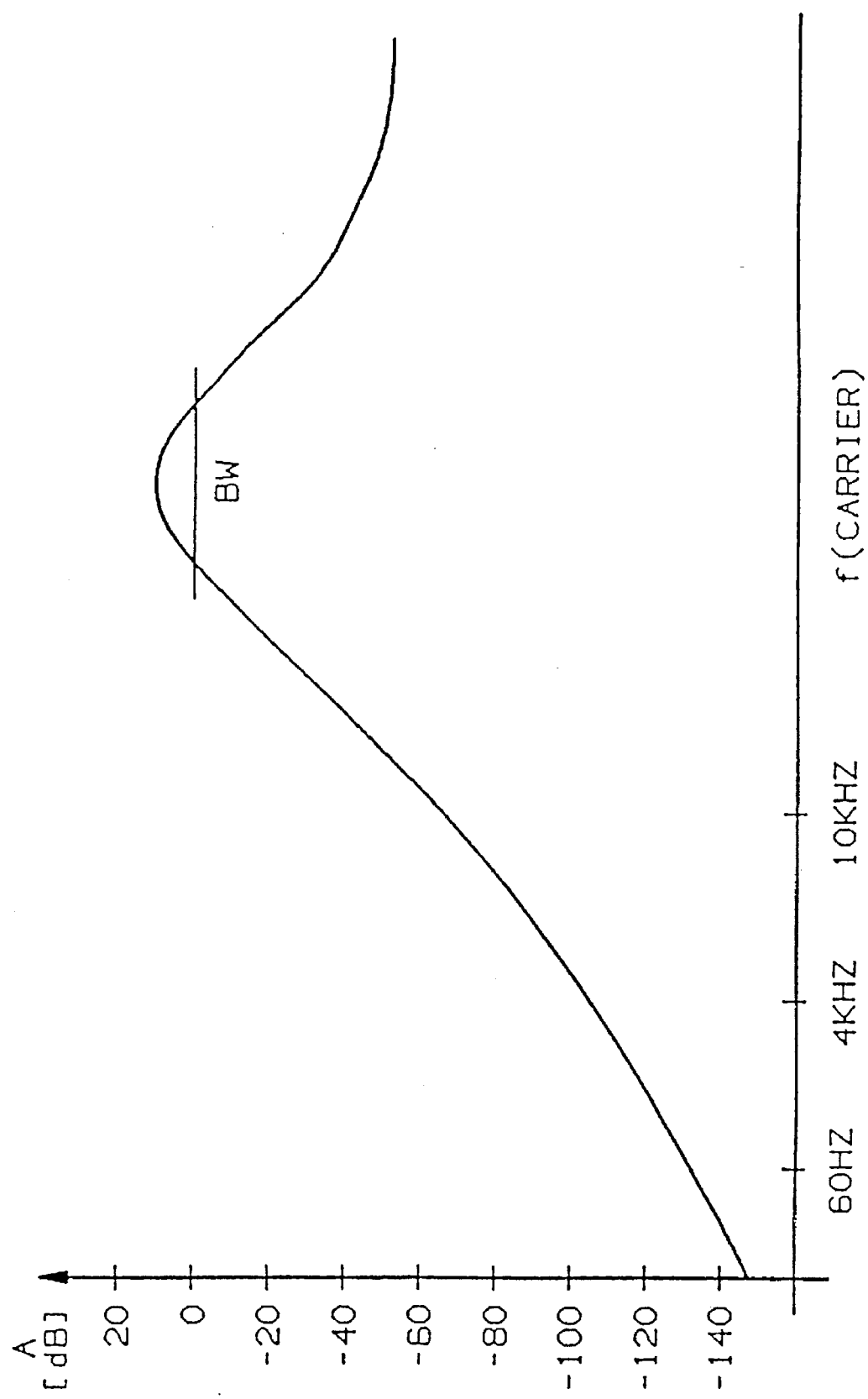
FIG. 26 illustrates the frequency characteristics of the phase shift linear coupler of the present invention.

The advantage of an air-core transformer in the novel coupler is exhibited by the frequency response shown in FIG. 26. There is a considerably greater band width around the center frequency when comparing it to the response of a traditional coupler which uses a magnetic-core transformer (FIG. 24).

A significant reduction of 60 Hz harmonics are observed at the secondary side of the novel coupler. This reduction can exceed 20 dB over a wide band. Most noise generated on power lines by AC motors and equipment has a large reactive source impedance. This type of noise experiences significant loss through the novel couplers due to the coupler's low resistive impedance at or around the carrier frequency of the transmission or reception. In contrast, the transfer characteristic of ferrite or iron core couplers typically has a high Q (FIG. 24), which is advantageous in theory for reducing the effects of the harmonics outside the bandwidth, but in actuality constrains the useful transmission bandwidth of the power-line carrier and does not provide noise attenuation inside the bandwidth. The wide bandwidth noise rejection of the novel coupler obviates the need for a sinx/x type receive filter for harmonic rejection. This implies that no separate receiver is required, other than the coupler, for high speed transmission.

Another significant aspect of the design is the phase linearity achieved. The matching of the line impedance and the use of air-core transformers are responsible for the amount of phase linearity achieved. In fact, the phase response of the overall transmission system is linear over a very wide range of frequencies. This implies that almost any desired frequency range can be selected for communication. Also, standing waves are virtually suppressed due to the low resistive matching at both ends of the line. The peak amplitude of the first reflection is around 40 mV, which is small compared to the transmitted signal amplitude of a few volts. Thus, setting the receiver threshold above 40 mV can eliminate any remaining source errors. There is also an elimination of standing waves on the line. This implies that there are no anti-nodes, places where the magnitude of the standing wave is zero and no transmission can occur, at points on the line situated at odd multiples of lambda/4 away from the end of the line.

The best frequency range 120/240 V power lines is 70–160 KHz (this includes LAN operations). For data transmission through power line transformers the optimal frequency to use is the 25–45 KHz band. For very high speed LAN applications a frequency range of 70–480 KHz is appropriate. Finally, the novel coupler of the present invention is equally applicable to any voltage AC, DC, phone, twisted pair or coaxial line.

DETAILED DESCRIPTION OF THE INVENTION

Figure 27:
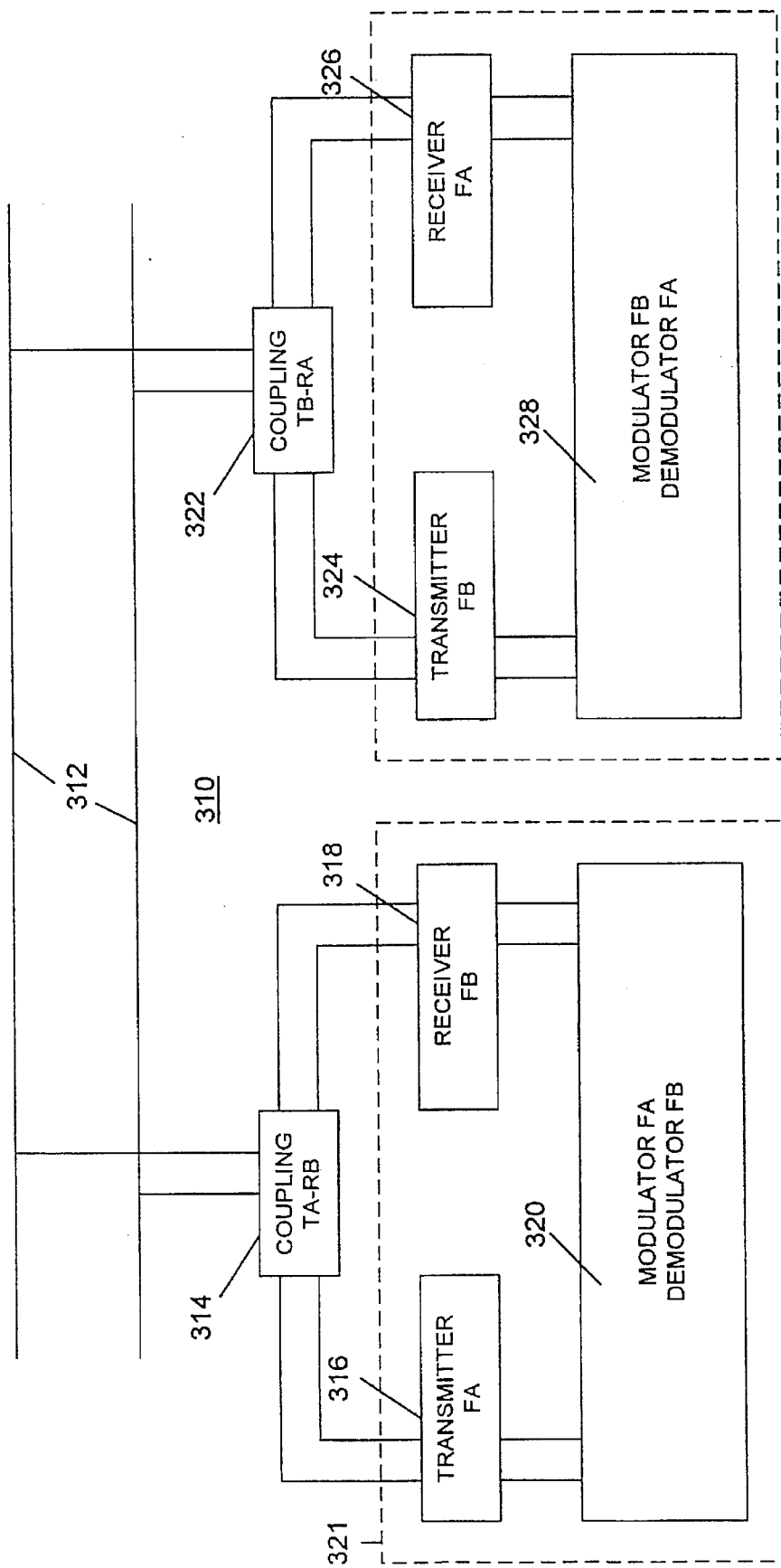
FIG. 27 is a block diagram of a power-line communication apparatus in accordance with the present invention.
Figure 27A:
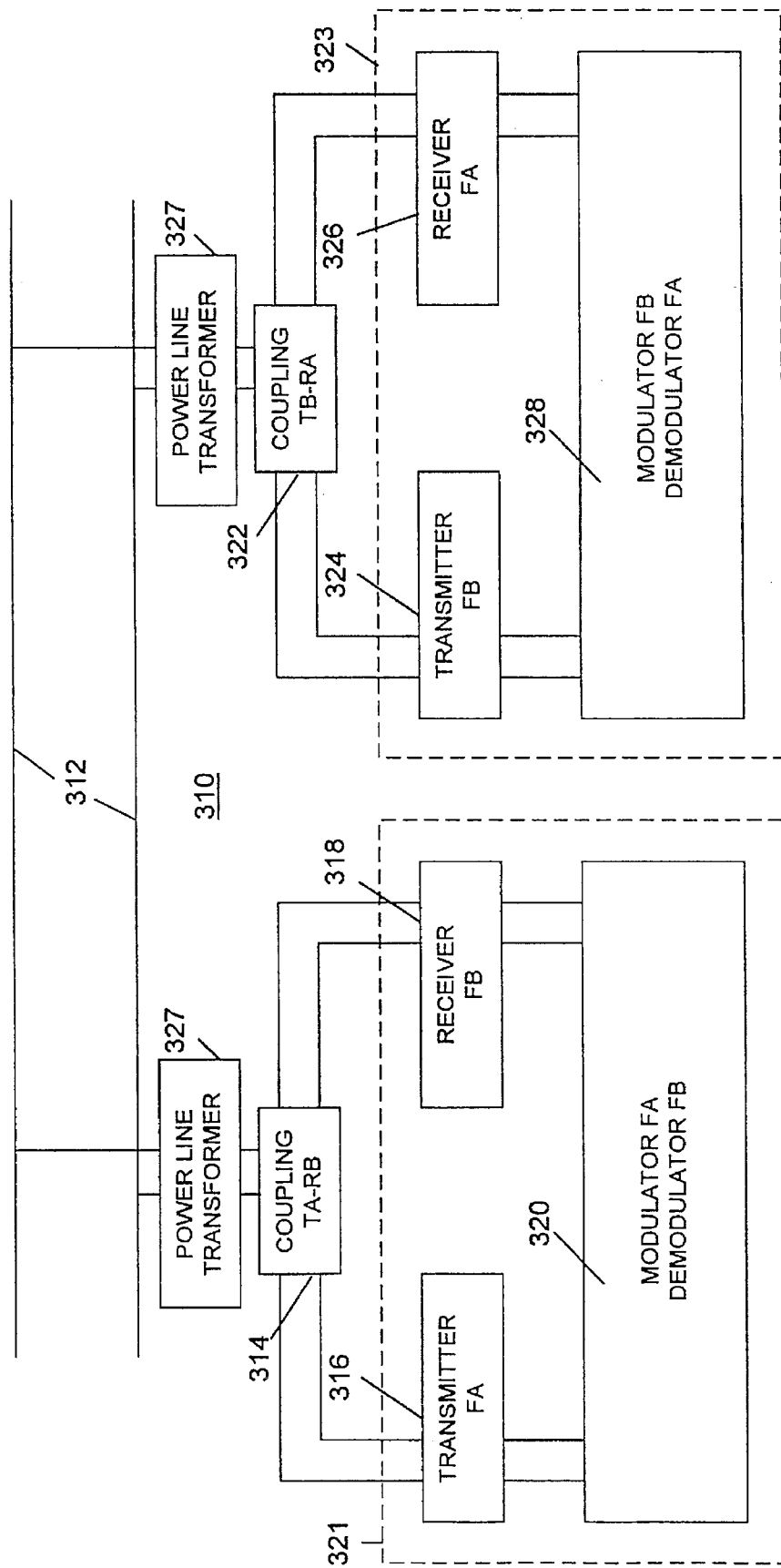
FIG. 27A is a block diagram of a power-line communication apparatus in accordance with the present invention including power-line transformers.

Referring now to the Figures, wherein like numbers designate like or corresponding parts throughout each of the several views, there is shown in FIGS. 27 and 27A block diagrams of a power line communication apparatus 10 according to the present invention for use in low power applications (up to 480 VAC).

The communications apparatus 10 shown is coupled to a pair of power lines 312, and generally comprises first coupling means 314, first transmitter means 316, first receiver means 318, and first modulator/demodulator means 320 at a first location along the power lines 312. The combination of transmitter means 316, receiver means 318 and modulator/demodulator means 320 comprise a first modem means 321. At a second location along power line 312 are second coupling means 322 second transmitter means 324 second receiver means 326 and second modulator-demodulator means 328. The combination of transmitter means 324, receiver means 326 and modulator/demodulator means 328 comprise a second modem means 323.

As will be explained in greater detail herein below, both coupling means 314, 322 include a pair of serial LC circuits (FIGS. 28 and 29) which are coupled to the pair of power lines 312. Referring to FIG. 27A, the apparatus is coupled to power line transformers 327. Each of the serial LC circuits in a respective one of the coupling means 314, 322 resonate at a given frequency. The LC circuits include a plurality of capacitors which are connected in a series and parallel configuration. See FIG. 25. The coupling means 314, 322 further incorporates novel air-core transformers for both transmission and reception which serve as the inductive (L) component of the respective LC circuits. It is to be noted that while the present invention is being described in the context of two identical communications apparatus, either circuit may be configured to function as a simple receiver or transmitter.

The first transmitter means 316, coupled to the first coupling means 314, is capable of transmitting digital data signals carried by a first carrier frequency FA across the pair of power lines 312, and as shown in FIG. 27A, through power line transformers. The first receiver means 318, coupled to the first coupling means 314, is capable of receiving digital data signals carried by a second carrier frequency FB from the pair of power lines 312. The modulator/demodulator means 320, coupled between the first transmitter means 316 and the first receiver means 318, modulates the digital data signals to be carried by the first carrier frequency FA, and demodulates the digital data signals carried by the second carrier frequency FB.

In a similar manner, at the second location along the power lines 312, the second transmitter means 324 is coupled to the second coupling means 322. Second transmitter means 324 is capable of transmitting the digital data signals to be carried by the second carrier frequency FB across the pair of power-lines 312, and as shown in FIG. 27A through power-line transformers. Accordingly, the second receiver means 326 is coupled to said second coupling means 322, and is capable of receiving the digital data signals carried by the first carrier frequency FA from the pair of power lines 312. The second modulator/demodulator 328, coupled between the second transmitter means 324 and the second receiver means 326, modulates the digital data signals to be carried by the second carrier frequency FB and demodulates the digital data signals carried by the first carrier frequency FA.

The first and second carrier frequencies FA, FB preferably comprise frequencies up to 11 MHZ. For most high voltage, long distance communications, the first and second carrier frequencies FA, FB will typically comprise frequencies that are less than about 160 KHz, having bandwidths of less than 20 KHz. When used for communication through power line transformers, FA and FB will typically comprise frequencies below 90 KHz (preferably 25–45 KHz) with bandwidth of about 6 KHz. The serial LC circuits (FIGS. 28 and 29) of both coupling means 314, 322 each comprise resistive matching means which will be described in greater detail below.

Figure 28:
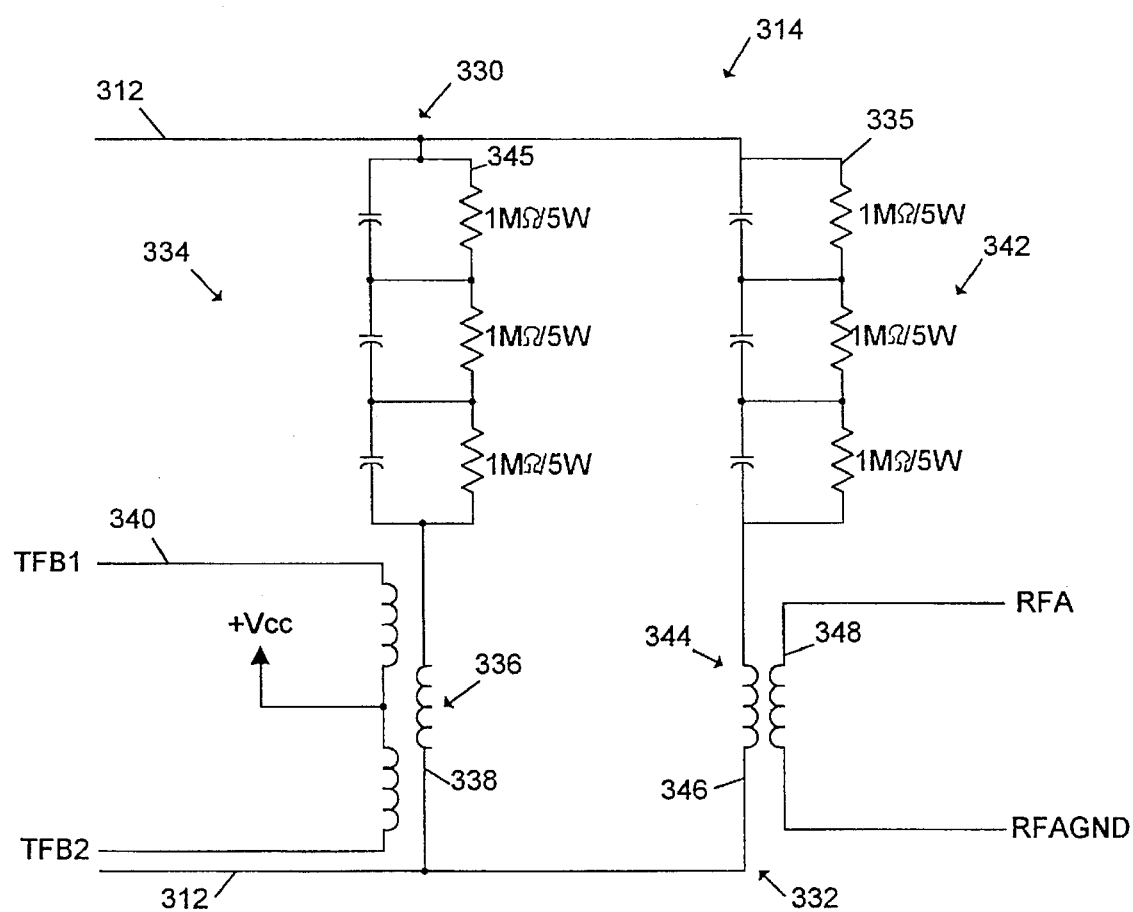
FIG. 28 is a schematic diagram of first coupling means in accordance with the present invention, which corresponds to the coupling TA-RB shown in FIGS. 27 and 27A.
Figure 29:
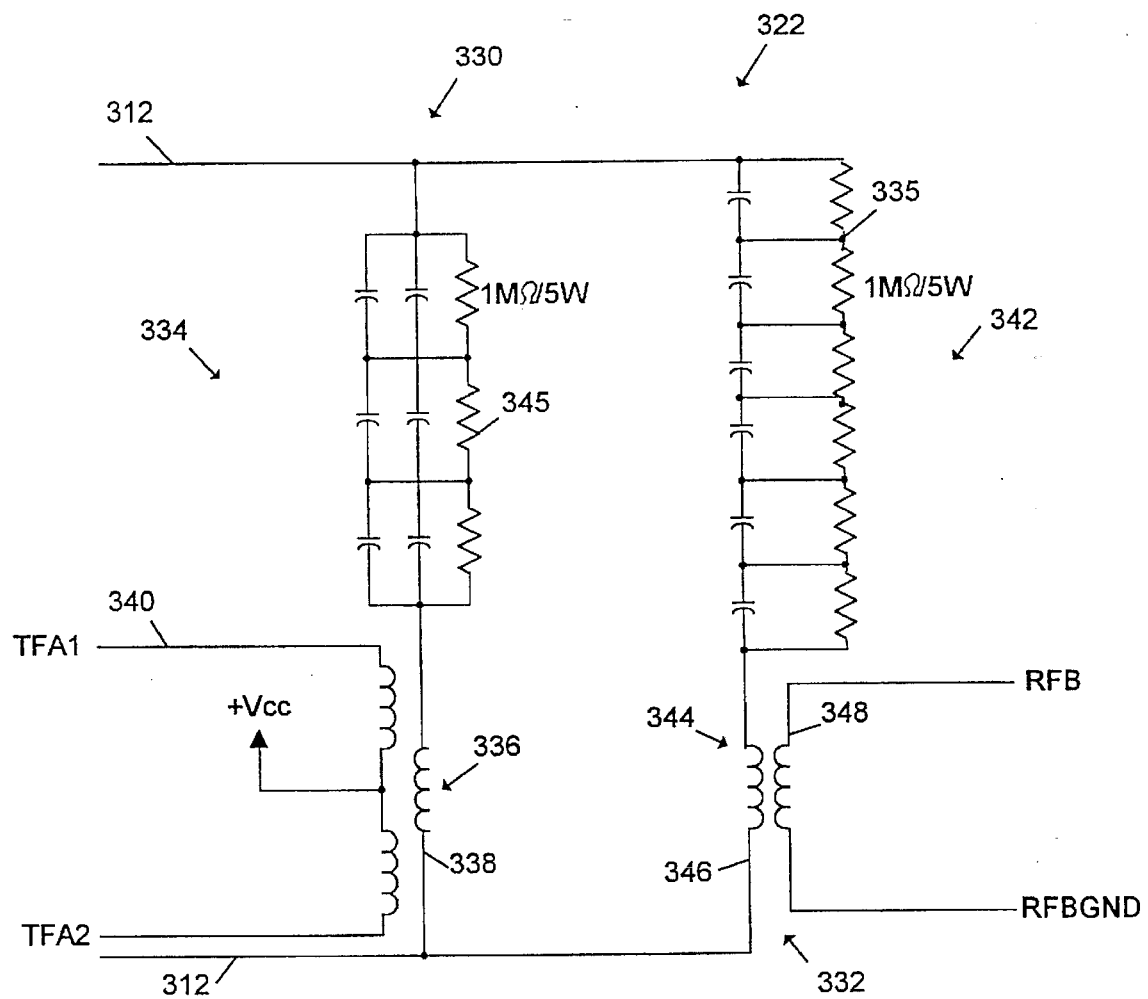
FIG. 29 is a schematic diagram of second coupling means in accordance with the present invention, which corresponds to the coupling TB-RA shown in FIGS. 27 and 27A.

With reference next to FIGS. 28 and 29, the specific circuitry for representative coupling means 314, 322 is now described in greater detail. The coupling means 314 (FIG. 28), 22 (FIG. 29) each include a pair of serial LC circuits 330, 332 which resonate at the carrier frequencies FA, FB. It will be appreciated by those skilled in the art that for FSK (Frequency Shift Key) applications FA will correspond to F1 and F2 and FE will correspond to F3 and F4. The serial LC circuit 330 shown in FIG. 28 resonates at the second carrier frequency FB, while serial LC circuit 332 resonates at the first carrier frequency FA. Similarly, the serial LC circuit 330 of FIG. 29 resonates at the first carrier frequency FA, and serial LC circuit 332 resonates at the first carrier frequency FB.

The LC circuits include respective serially and parallel connected capacitor networks 334, 342. To each capacitor in series is connected a resistor 335 and 345 which evenly divides down the AC voltage. Preferably, the resistor values should be rated at 1 Megohm per 5 watts and the capacitors should be 200 VAC capacitors. The resistors should preferably be thick film (i.e. carbonless). The Q point of the capacitors should similarly be high. In operation, the couplers (LC) should be placed into a resin for good insulation when used with operating voltages up to 660 V. At operating voltages above 660 v, the capacitors should be separately placed in an oil filled insulator and the air coil transformer placed into a resin. The use of the resistors 335, 345 serve to minimize the DC current so as to prevent spiking and afford lightning protection.

It is to be appreciated that the capacitor networks 334, 342 create equivalent capacitances Ceq1 and Ceq2 for transmission and reception, respectively. The capacitor networks are connected to air-core transformers to be discussed below which function as the inductive element (L) of the LC circuit. Ceq1 and Ceq2 resonate with the primary windings of the air-core transformers.

The air coil means comprise a first air coil 336 which includes a primary winding 338 and a smaller secondary, winding 340 situated coaxially within the primary winding. The second serial LC circuit 332 includes second air coil 344 including a primary winding 346 and smaller secondary winding 348 situated coaxially within the primary winding.

The first plurality of capacitors 334 are connected together in series between one of the power lines 312 and the primary winding 338 of the first air coil 336. The primary winding 338 of the first air coil 336 is thereafter serially connected to the other power line 312. The secondary winding 340 of the first air coil 336 is connected to its respective transmitter means 316. The second plurality of capacitors 342 are serially connected together between one of power lines 316 and the primary winding 346 of the second air coil 344. The primary winding 346 of the second air coil 344 thereafter being serially connected to the other power line 312. As noted above resistors, 335 and 345 function to evenly divide the voltage and serve to minimize spiking and afford lightning protection.

Figure 30A:
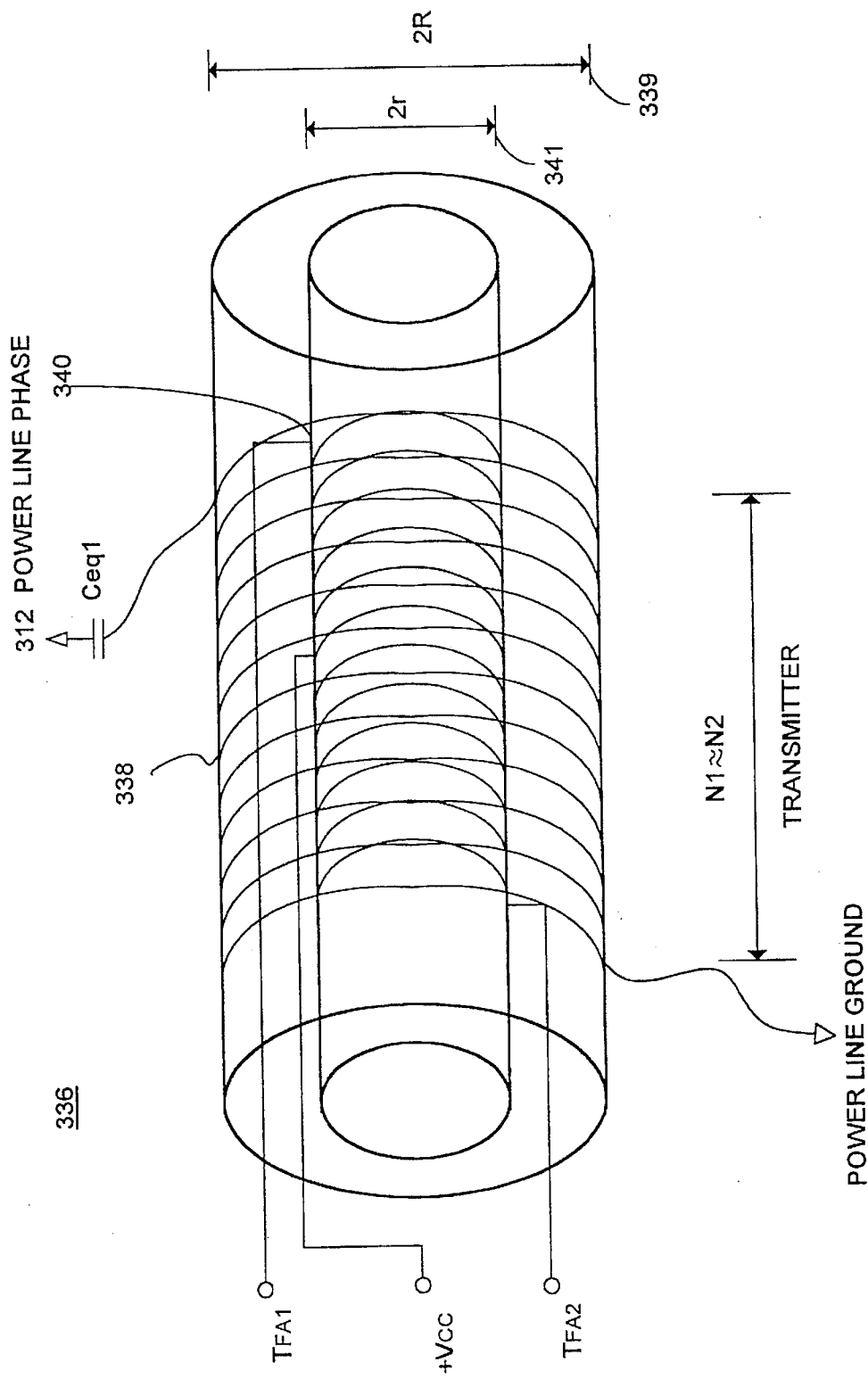
FIGS. 30A and 30B illustrate the coaxially extended air-core transformer with coupling capacitor utilized in the present invention.
Figure 30B:
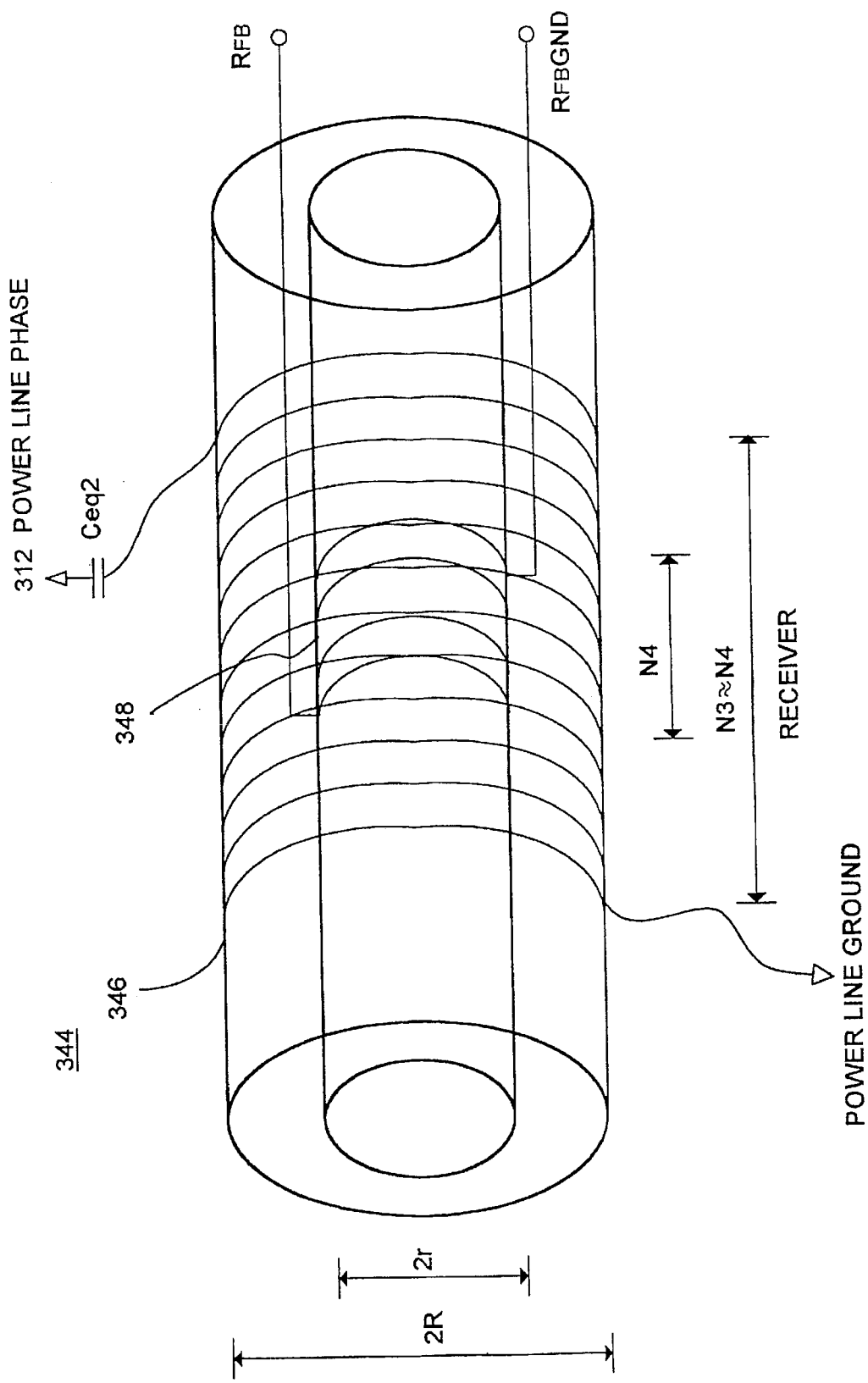
Figure 30C:
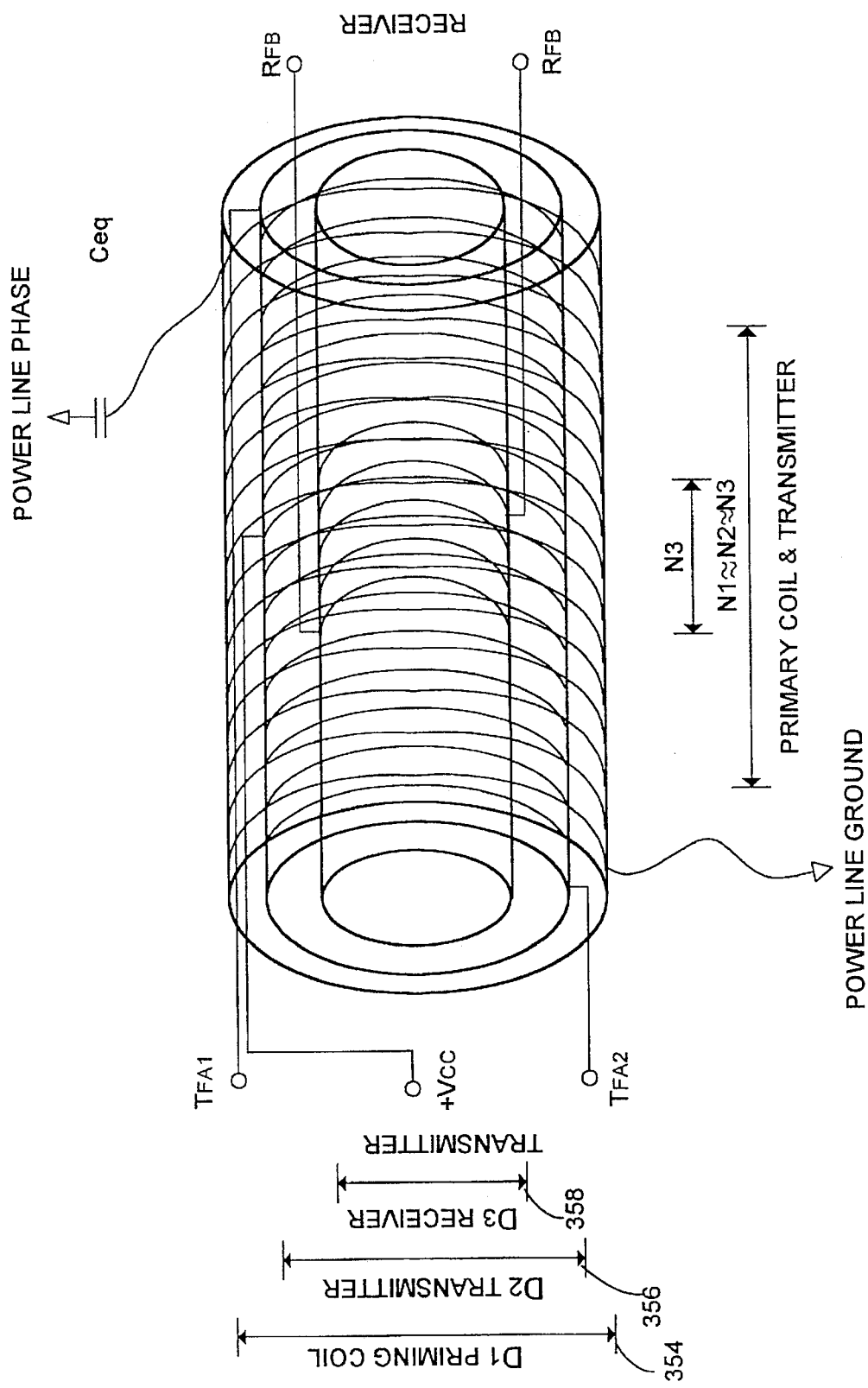
FIG. 30C illustrates a half duplexing coupler in accordance with the present invention for data communications through distribution transformers.

Referring to FIGS. 30A–30C, the phase shift linear air-core transformers of the present invention are described in greater detail. The phase shift linear transformer of the present invention involves a dielectric core coupler which uses a dielectric material disposed between the primary and secondary windings. A dielectric is a material which is an electric insulator or in which an electric field can be sustained with a minimum dissipation in power. Examples of other dielectric materials include plastic, paper, wood, resin compounds, glue based compounds, as well as other materials understood by those skilled in the art to be dielectric and suitable for the core of a transformer as described herein. A dielectric is used to insure that the AC voltages are not transferred from the primary winding to the secondary winding. Even the several hundred kilovolts which can be contained in a lightening strike which may hit the primary, would be insulated from the secondary by the use of a dielectric material such as a resin.

In a preferred embodiment, an epoxy core is used. The epoxy core of this embodiment is made up of a resin and an activator. It is desirable to minimize the shrinkage of the resin. For this reason, a medium shrinkage resin such as that contained in EP5342 of Eager Plastics Company, Chicago, Ill. can be used. Other suitable resins and activators (epoxies) will be understood by those skilled in the art. Multiple pours of the epoxy as well as fillers (such as slate, flour or sand) can be used to minimize shrinkage and the exothermic heat it generates.

In another embodiment of the phase shift linear transformer of the present invention, an air-core coupler is used. The air-core coupler of this embodiment is constructed by wrapping the secondary and primary windings around plastic tubes having a hollow section. The tube with the secondary winding is fitted within the tube wrapped with the primary winding. Where air-coil couplers or structures are referred to throughout the specification, dielectric core, couplers or structures, such as resin core couplers, can be used interchangeably.

The tube of the phase shift linear transformer over which the primary winding is wound and within which the dielectric material is filled, can be made of a plastic or similar dielectric material as recited above. In addition, the tube/dielectric material combination can be a single piece forming a solid bar of dielectric material such as a medium-shrinkage resin. The secondary winding is then wrapped around this dielectric bar and then the dielectric bar with the secondary winding is enveloped in a casing of a dielectric material such as the low-shrinkage resin over which the secondary is wound or another dielectric material such as a plastic. The primary winding is then wound around the secondary dielectric material encasing the secondary winding.

Both the primary and secondary windings in a preferred embodiment are wound very tightly, so that the insulation from one wire abuts the insulation of an adjacent wire. Therefore, the distance between adjacent wires is the thickness of the insulation on each adjacent wire.

The particular gauge wire as well as the diameter of the overall winding, depends upon the frequency for which the particular phase shift linear transformer is being designed. Example wire can be between 320 and 336 gauge for the many applications although higher or lower gauge wires can be used depending upon the particular application. Further, the primary and secondary windings may have different gauge wires used again to tune the device to the particular frequency for a specific application. It is also possible for a particular application that the primary and the secondary would use the exact same wire for their windings. Examples of wires which can be used for the primary or secondary winding are copper/magnet wires such as Belden Heavy Armored Poly-Thermaleze and single Beldsol® Solderable wires of Belden Wire and Cable. Other wires suitable for the primary and secondary windings will be understood by those skilled in the art.

In a preferred embodiment, both the primary and secondary are single layer windings, not multiple layer windings. Also, in a preferred embodiment, both the primary and secondary windings are adhered to the resin or resin tube. One method for adhering the wire to the dielectric tube or dielectric bar is through the use of a glue.

The novel air coil structures function as respective inductively and capacitively coupled air-core transformers for both transmission and reception. FIG. 30A illustrates the transmitter transformer 336 with coupling capacitor network Ceq1. As shown in FIG. 30A, the transmitter transformer 336 is connected in series with Ceq1 and the power line 312. The transformer is phase shift linear and comprises a primary winding 338 and coaxial smaller secondary winding 340 which is placed between the primary winding. The primary winding 338 has a winding diameter 2R 339 which is greater than the diameter of the secondary winding 2R 41 and accordingly creates an air gap between the two. Of particular significance is the fact that both the primary and secondary windings 338, 340 in the transmitter air coils have the same number of turns (designated by N1–N2), and are thus at a 1:1 ratio. Accordingly, the transmitter doesn't require a high transmission voltage, as is characterized by prior art devices. Further Ceq1 is set to resonate with the primary winding at the carrier frequency FA, thus creating a band pass filter at the carrier frequency FA. This maximizes the current at the carrier frequency FA.

The values of Ceq1 and the resistors, 335, 345 are set to generate a large voltage loss at frequencies less that 10 KHz (thus encompassing the 60 Hz and its harmonics). Thus, the significantly reduced 60 Hz signal cannot generate a large enough current to pass the static capacitance. That is, for transmission, the resistivity of the primary coil is roughly equal to the lowest known value of the characteristic impedance of the power line.

The receiver transformer is now described with respect to FIG. 30B. The receiver is connected to the power line 312 via Ceq2. As with the transmitter of FIG. 30A, the receiver air coil comprises a phase shift linear transformer having a primary winding 46 with a first diameter 2R 347 and a secondary coaxial winding 348 having a second diameter 2R 349. Accordingly, an air gap, and thus a static capacitance, is similarly created between the respective primary and secondary windings 346, 348. In the receiver transformer, the ratio of the primary and secondary windings can be about 1:1. While this ratio can be altered or modified, such a change requires a resultant alternation in the size of the air gap, i.e. the relative ratio of 2R and 2r. The capacitor network Ceq2 is set to resonate with the primary winding at carrier frequency FB, thus creating a band pass filter at carrier frequency FB.

In operation, the power line voltage is significantly reduced by Ceq2 and the resistors. Thus, the static capacitance with the secondary winding significantly attenuates the 60 Hz and its harmonics, thus effectively functioning as a high pass filter. The carrier frequency voltage is thereby maximized. The air-core transformer produces a wider phase linear bandwidth than previous systems. The bandwidth characteristics off the present invention are shown in FIG. 26. For good reception, the resistivity off the primary can be equal or greater than the lowest characteristic impedance of the power line.

From a design standpoint, the philosophy is to minimized the 60 Hz line current and its harmonics at the output of the coupler. For higher voltage power-line coupling the coupling capacitor, Ceq1 should have a smaller value:
(f)2(carrier)/(f)2(60 Hz) ratio determines the Vcarrier/V60 Hz ratio at the output of the coupler. Preferably, a higher carrier frequency should be used for higher power line voltages. Vcarrier is measured at the preselected carrier frequency at the secondary output of the receiver coupler in volts. V60 hz measured at the same location of Vcarrier, is the voltage of the 60 Hz.

The above relationships coupled with the capacitive transformers serve to block the 60 Hz line current. The resistive matching serves to reduce power line noise at the bandwidth. The above makes it possible to communicate directly through power line transformers. The use of an air-core transformer reduces reflected impedances from the secondary side as well as from the power line transformer to the primary side of the air-core transformer.

Figure 41:
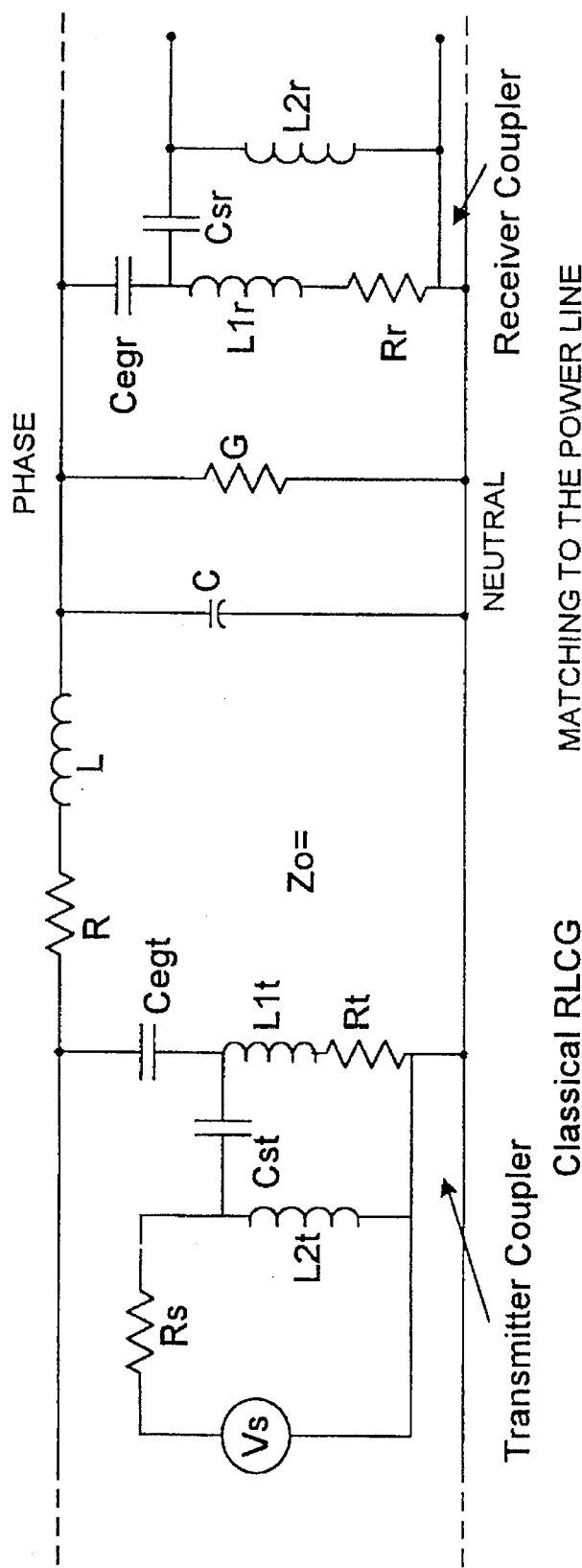
FIG. 41 is an equivalent circuit model for a power-line carrier communication system with resistive matching to the power line characteristic impedance by the coupler.

The theoretical operation off the circuit is seen with reference to FIG. 41, an equivalent circuit model for a power line carrier communication system with matching resistors Rt and Rr. At primary resonation, the LC impedances will be zero at transmission and reception such that the resistivity of the primary coil Rt matches the characteristic impedance of the power line. On the receiver side, Rr can be equal or larger than the characteristic impedance of the power line. Due to the use of the air-core transformer and resistive matching, the whole power line system can be phase shift linearized even through a power line transformer. These relationships facilitate error free and high speed communications over long distances.

Figure 47:
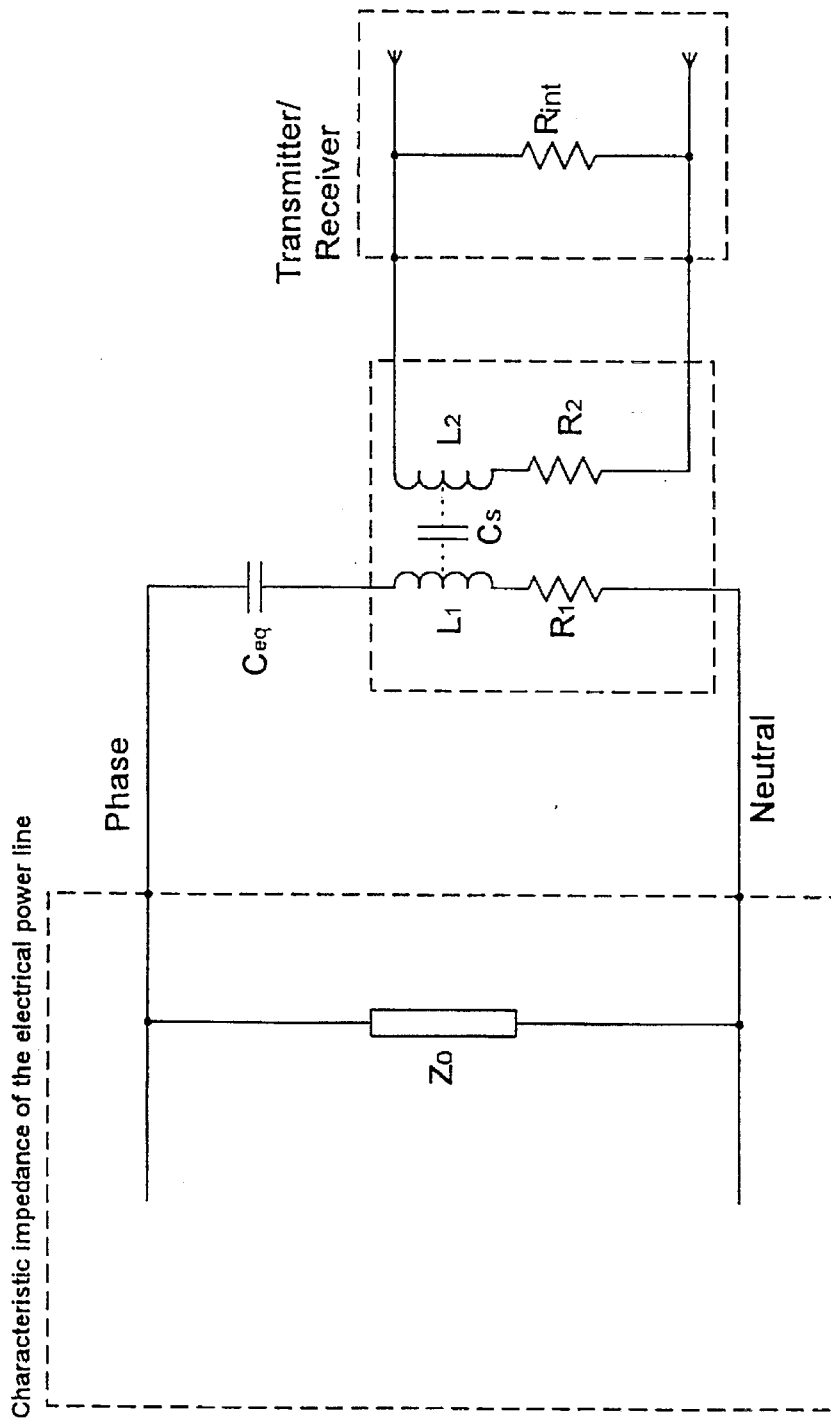
FIG. 47 is an equivalent circuit model for a power-line carrier communication system with resistive matching to the power line characteristic impedance by the coupler.

FIG. 47 shows a power line communications system for matching the characteristic impedance of an electrical line using an air-core (or dielectric) coupler (or transformer) which is capacitively and inductively coupled to the electrical line. In FIG. 47, Zo is the characteristic impedance of the electrical line where Zo is approximately equal to the square root of L/C and L and C are the inductive and capacitive components, respectively, of the electrical line.

Ceq and L1 are the equivalent capacitance and the inductive component of the Primary of the air-core coupler. R1 is the resistive value of L1. L2 is the inductive component of the secondary of the air-core coupler. R2 is the resistive value of L1. Rint is the impedance of the transmitter or the input impedance of the receiver, depending upon whether the air-core coupler is operating as a transmitter or receiver. FIG. 47 illustrates the air-core coupler of the present invention working either as a transmitter or a receiver (or transceiver).

The air-core coupler primary winding is matched to the electrical line characteristic impedance at a preselected frequency band, as well as to the other couplers attached to the electrical line at the same frequency. The secondary winding is matched to the transceiver (transmitter and/or receiver) input impedance. Since the values of L1 and Ceq approach zero at the preselected frequency F1, where F1 is given by equation (1).

$$F1 = \frac{1}{2\Pi L1C1} \qquad (1)$$

(where F1, L1 and C1 are approximately zero), R1 (and the rest of the R1 values for any other couplers) will match Zo and $\omega L2$ will match Rint if standard copper magnetic wire is used for the primary and secondary windings.

If a resistance wire, such as Deltalloy wire having a specific resistivity of 675 OHM CIR. MIL. FT. with a composition of 15% Chromium and 60% nickel, available from Delta/PWF Corp., R2 can be increased and a wider bandwidth can be achieved. A preferred resistance wire has a light magnetic attraction of approximately 5–10 ohms per foot for #24–434 gage wire (for example, 8.25 ohms per foot for #30 gage wire) which is coated/insulated.

The wider bandwidth results from R2 being greater than $\omega L2$ as $Q=\omega L/R$. The larger R2 value from the resistance wire will also provide a more stable band. By matching resistance values a more linear band is also achieved, as compared to matching inductance values to resistance values.

The coupling means 314, 322 shown in FIGS. 27, 28, 29, 30A and 30B are suitable for communication in association with wide range of power line voltages. As will be discussed herein, they can be utilized for high voltage, low voltage, twisted pair, coaxial, and phone line communications, as well as for communication directly through power line transformers.

Communications Options

1. Computer Communication through Power, Coaxial and Twisted Pair Lines

The couplers of the present invention can be applied to LAN (local area network) communications and facilitate communication speeds up to 10 Kilobaud. For this application, the coupling means 314 preferably use a first carrier frequency FA of around 75 KHz (and 81.5 KHz for FSK) and a second carrier frequency FB of around 111 KHz (and 117.5 KHz for FSK) over power lines 312 of up to about 1 KVAC. The coupler preferably uses first pluralities of capacitors 334 as shown therein, the coupling capacitor equivalent circuit is equal to 90 nanofarads. The first air coil 336 should have a primary winding 338 with a coil diameter of 2.2 cm, #26 gauge magnet wire and a secondary winding 340 with a coil diameter of about 1.7 cm, #28 gauge magnet wire. The second plurality of capacitors 342 has an equivalent circuit equal to 15 nanofarads. The second plurality of capacitors 342 has an equivalent circuit equal to 15 nanofarads. The second air coil 344 should have a primary winding 346 of 2.2 cm, #30 gauge magnet wire and a secondary winding 348 with a coil diameter of about 1.7 cm, #28 gauge magnet wire. The system utilizes the modems shown in FIG. 31A, 32 and 33A. Using a suitable transistor for transmitting, the communication speed can be increased above 9.6 kbaud over power, twisted pair, and coaxial lines.

On the other side of the system, coupling means 322 comprises first plurality of capacitors 334 as shown therein, the coupling capacitor equivalent circuit is equal to 40 nanofarads (this includes the static capacitance of the air-core transformer). As above, the first air coil 336 should have a primary winding 338 with a coil diameter of 2.2 cm, #26 gauge magnet wire and a secondary winding 340 with a coil diameter of 1.7 cm, #26 gauge magnet wire. The second plurality of capacitors 342, as shown therein, coupling capacitance equivalent circuit is equal to 33 nanofarads. The second air coil 344 should similarly have a primary winding 346 of about 2.2 cm, #34 gauge magnet wire and a secondary winding 348 with a coil diameter of about 1.7 cm of the #30 gauge magnet wire.

For duplex operation the resistive matching at the frequencies should be less than 1 Ohm for transmission and 3 Ohms for reception. For half duplex operation the resistive matching should be about 1 Ohm for both transmission and reception.

2. High Voltage Power Line Communications

The couplers are also applicable to high voltage power line communication applications in which a 15 KVDC/4.5 KVAC capacitor can be used for power-line voltages of up to 765 KV. The couplers of the present invention can be utilized for communication speeds up to 9600 baud. In this application first FA and second FB carrier frequencies of 80 KHz and 115 KHz, respectively, are preferred, and the connections of first 334 and second 342 pluralities of capacitors are somewhat modified over what is shown in FIGS. 28 and 30. The first plurality 334 comprises a 2 nanofarad coupling capacitor for 80 KHz transmission. The second plurality 342 comprises a 0.5 nanofarad coupling capacitor for reception. It is to be appreciated that the above system will be comparatively large, having a height of approximately fifteen feet and will typically be located at a ground station adjacent to large high voltage transmission line.

Referring to the air-core transformers for this application, the first air coil 336 of the coupling means 314 suitably comprises a primary winding 338 with a coil diameter of 8.9 cm, #24 gauge magnet wire, and a secondary winding 340 with a coil diameter of 6.0 cm of #16 gauge magnet wire. The second air coil 344 likewise suitably comprises a primary winding 346 of 7.3 cm, #26 gauge magnet wire, and a secondary winding 348 with a coil diameter of 4.8 cm, #16 gauge magnet wire. The inductivity of the primary is calculated according to the equation $L = \frac{1}{4} 2\ f2\ C_{eq}$.

The identical coupling means 322 under the same circumstances also includes the capacitor pluralities 334, 342. The first plurality 334 suitably comprises a 1 nanofarad coupling capacitor for transmission at 115 KHz, while the second plurality 342 comprises a 1 nanofarad coupling capacitor for 80 KHz reception. The first air coil 336 comprises a primary winding 338 with a coil diameter of 8.9 cm, 24 gauge magnet wire and a secondary winding 340 with air-coil diameter of 6.0 cm, #12 gauge magnet wire. The second air coil 344 likewise suitably comprises a primary winding 346 of 8.9 cm, #26 gauge magnet wire and a 348 with a coil diameter of about 6.0 cm, #16 gauge magnet wire. No ferrite transformer is found within the transmitter and receiver. It is also possible that no receiver is needed. The resistive matching for transmission is about 5 Ohms and for reception is about 10 Ohms for duplexing operations. A resistive match of approximately 5 Ohm is needed for half duplexing operation where transmission and reception occurs in several locations.

Figure 42:
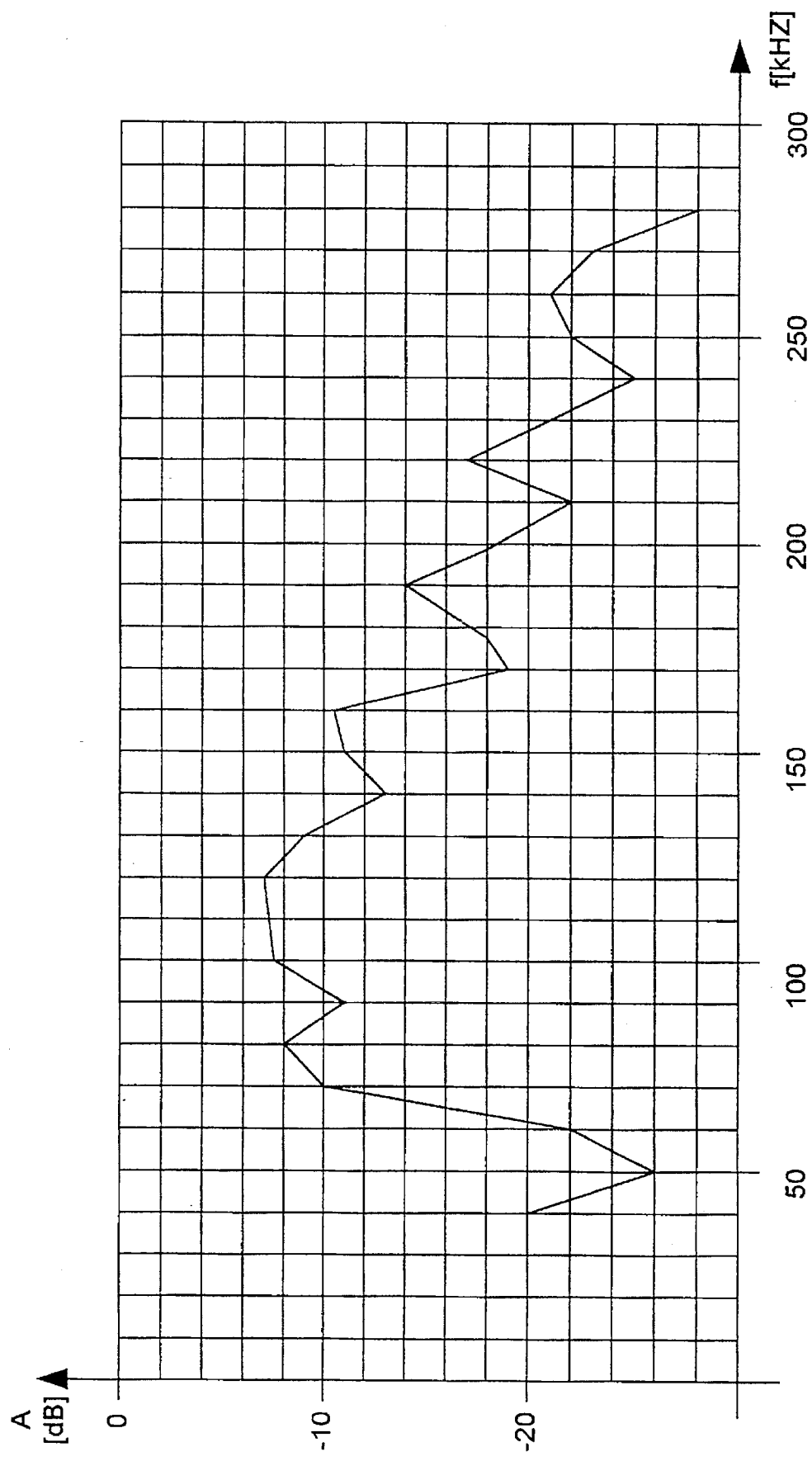
FIG. 42 is a graph of power line attenuation versus carrier frequency on the 35 KVAC power line for a 20 KM distance.

FIG. 42 is a graph of power line attenuation versus carrier frequencies on the 35 KVAC power line for 20 KM distances. A 150 Ohm load was used for the matching conditions. The best range of communication can be seen here from 70 to 160 KHz. As the number of transformers on the power line increases, the attenuation of the power line will increase especially above 100 KHz. Note that the diameter of the coils is partially determined by the available size of the PVC pipe because the windings are made on said pipe.

3. Communication Through Power Line Transformers

Figure 43:
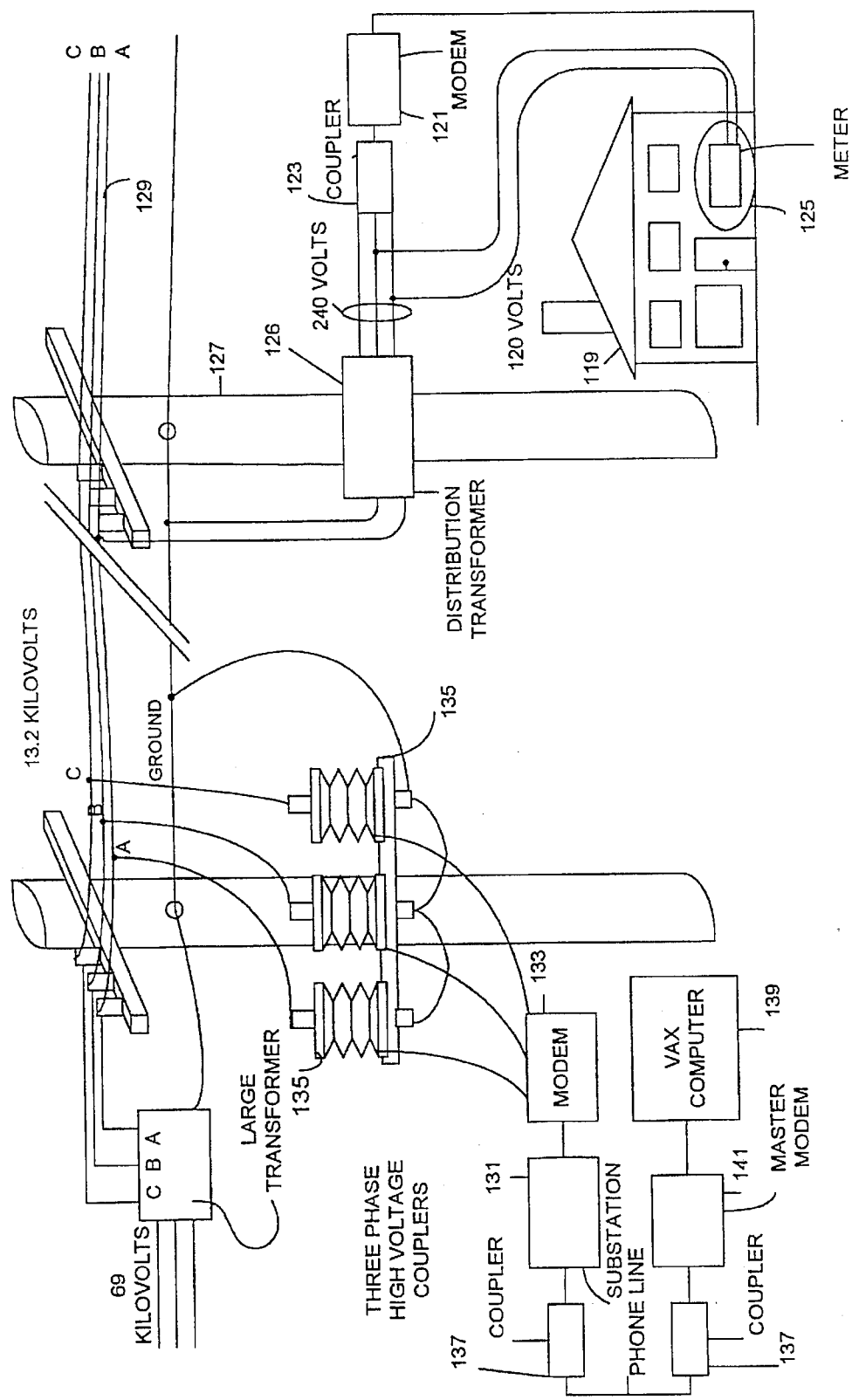
FIG. 43 is an illustration of an electric meter reading system incorporating the communication system of the present invention which may be implemented by a public utility.

As noted above, the communication apparatus of the present invention may also be utilized for communication through power line transformers (See FIG. 43). The couplers permit communication through transformers at communication speeds of over 1200 baud. It is to be appreciated that for communication through the transformer in FSK, PSK, ASK, FDM or Spread Spectrum using half-duplex with F1=30 KHz and F2=31.6 KHz, using five serial and 100 nanofarad (4.5 KVAC) capacitors connected serially with 6 Megohm, 5 watt resistors (up to 22 KV power-line), the bandwidth of the couplers will cover the F1 and F2 frequencies.

FIG. 30C illustrates a half-duplex coupler for data communication through the high voltage side of distribution transformers. In this system two or three solenoids (air-coils) having two or three different diameters are utilized. The diameter of outer coil 354 is 6.0 cm, #26 gauge magnet wire, the middle 356 is 4–8 cm, #20 gauge magnet wire and the smallest 358 is 4.2 cm, #22 gauge magnet wire. The largest diameter outer coil 354 is the primary which resonates with the capacitor, the middle is the transmitter and/or receiver coil 356 and the smallest is the receiver coil 358 (if it is needed). For reception, the transmitter coil must be uncoupled. In order to have transmission, the receiver coil is uncoupled.

On the low power side of the power line distribution transformer corresponding to the 120, 240 and 480 V power lines, the system can be configured to use the same carrier frequency, with one coupler on the low voltage side (i.e. a single primary and single secondary). (See FIG. 43). The transformer is coupled to 66 nanofarad capacitors-500 VAC) -In this situation, the primary coil 338 has a diameter of 2.7 cm using #24 gauge magnet wire with the secondary coil 340 having a diameter of 2.2 cm using #26 gauge magnet wire. The transmitter and receiver do not contain a ferrite transformer. It is also possible that no receiver will be needed. Theoretically, a real time 4800 baud can be achieved through power line transformers over long distances. It is to be appreciated that the couplers of the present invention will permit more than one carrier frequency to be simultaneously transmitted through the same power line.

B. Transmitter and Receiver Devices

Figure 32:
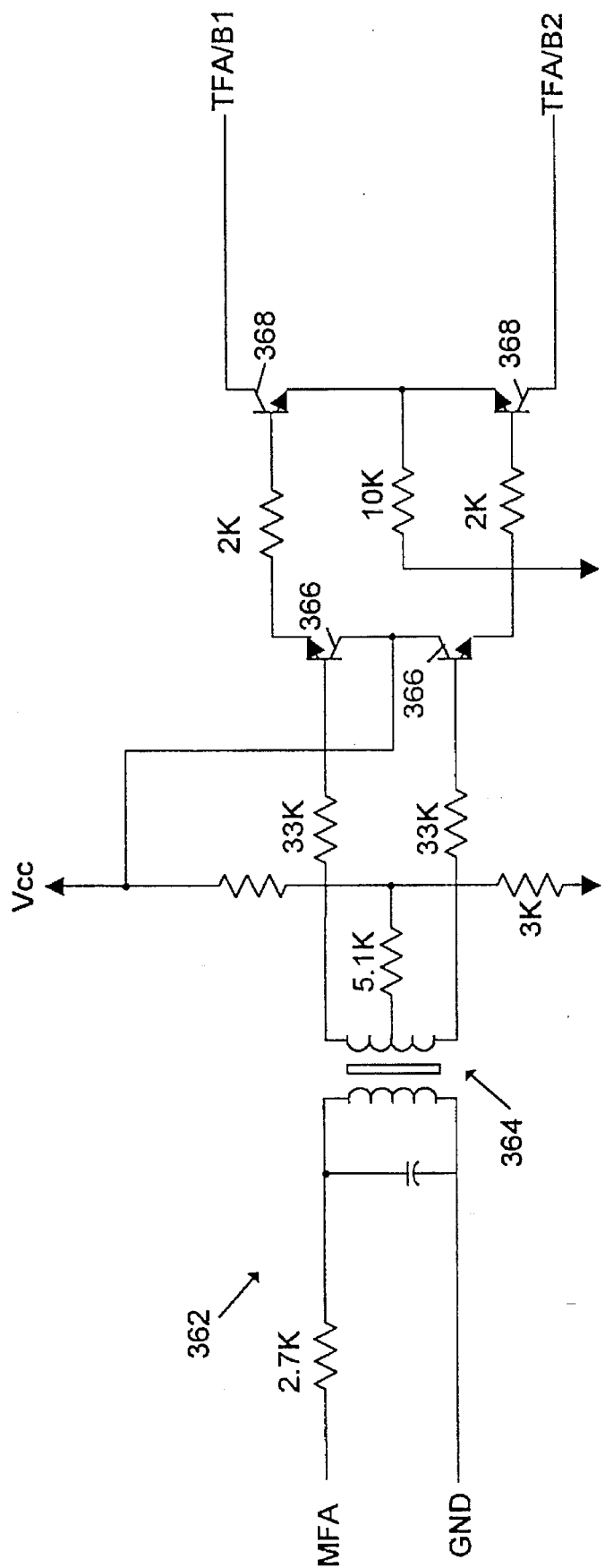
FIG. 32 is a schematic diagram of a transmitter means used in the present invention.

The preferred transmitter 316, 324 useful in the power line communication of data signals over long distances is shown in FIG. 32. This transmitter can be utilized in all of the applications of the present invention, including transmission through power line transformers. The transmitter means generally comprises a driver 362 which is connected to the coupling means 314, 322 by way of their respective connections TFA/B1, TFA/B2. Because of its use of a magnetic coil 364 and transistors 366, 368, the transmitter 316 while comparatively slow, is especially useful over high voltage power lines. Suitable transistors 366 for this transmitter are conventional SK 3444, while the transistors 368 may suitably comprise conventional SK3024. For higher power transmission, 2N3055 transistors may be utilized instead of SK3024. The particular value of each resistor and capacitor shown in FIG. 32 will depend upon the specific operating characteristics of the driver but they would be readily ascertainable without undue experimentation by one of ordinary skill in the art of electronics. Nevertheless, exemplary values of the resistors and capacitors are shown in FIG. 32. It is also understood that without a ferrite transformer, this modified transmitter is able to transmit at a high communication speed.

Figure 33:
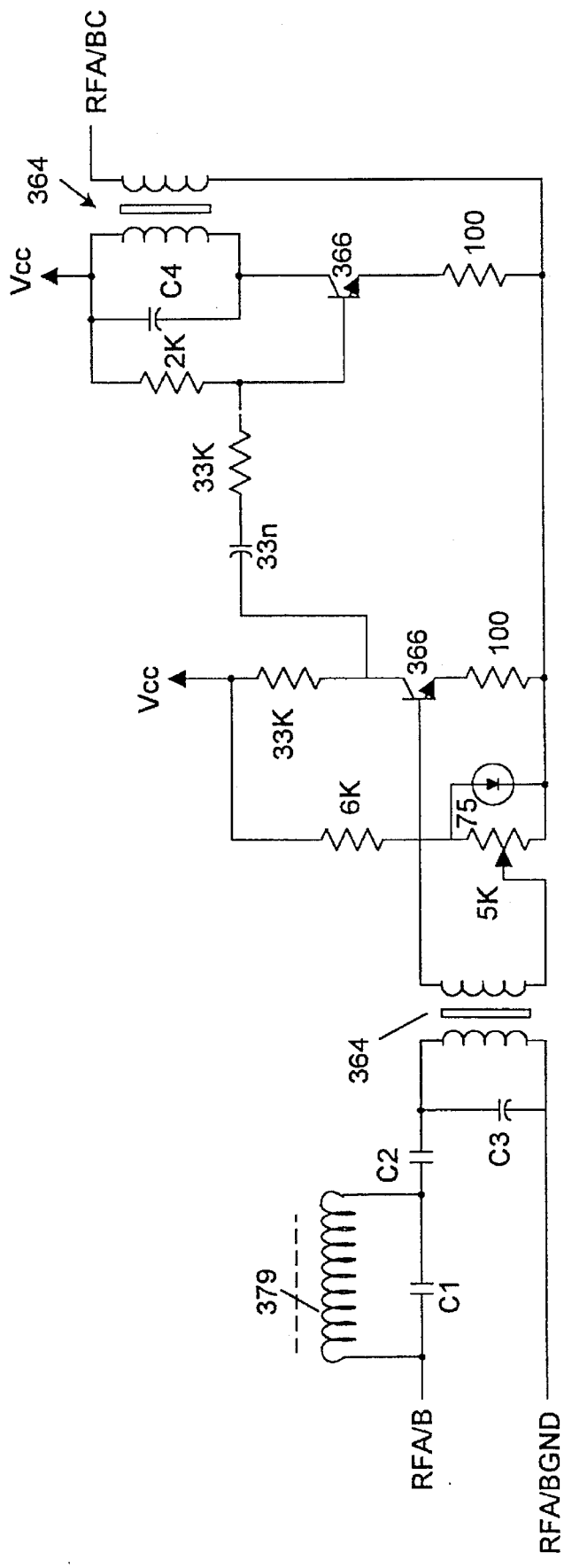
FIG. 33 is a schematic diagram of receiver means used in conjunction with the transmitter means shown in FIG. 32, in the power-line communication of data signals over long distances.

The preferred receiver means 318, 326 which is useful in the power line communications of data signals over long distances is shown in FIG. 33. The receiver means 318, 326 is similarly connected to the coupling means 314, 322 by way of their respective connections RFA/B, RFA/BGND and RFA/BC. It will be readily apparent that the receiver means 318, 326 is more successful at attenuating out of band noise especially on high voltage power lines. Suitable transistors 366 are also conventional SK3444. The particular value for each resistor and capacitor shown in FIG. 33 would depend upon specific operating characteristics off the receiver 318, but they would be readily ascertainable without undue experimentation by one of ordinary skill in the art off electronics. Nevertheless, exemplary values off the resistors and capacitors are shown in FIG. 33. A key feature off the receiver off FIG. 33 is the inclusion of potentiometer 375 with which the bandpass filter receiver bandwidth can be changed. Another feature is the notch filter 379 coupled to magnetic coil 364 (band pass filter) which filters out transmission frequencies on the same side.

Figure 33A:
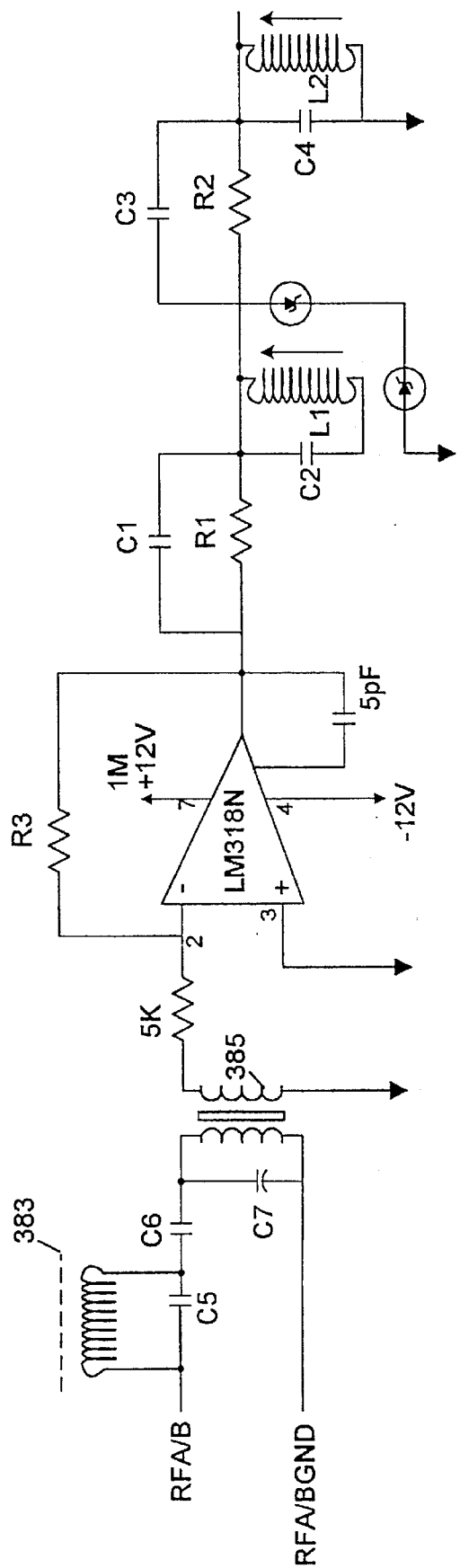
FIG. 33A is a schematic diagram of a receiver which can be used for high speed communications.

FIG. 33A shows an additional receiver 318', 326' which can be utilized between 120 V and 240 V including FSK, and which is particularly suited for low voltage LAN communications. In this receiver, C1 and R1 are used for F1; and C3 and R2 are used for F2 in a high pass configuration. In a low pass configuration, C2 and L1 are used for F1 and C4 and L1 are used for F2. The receiver further utilizes a notch filter 383 coupled to band pass filter 385 which filters out transmission frequencies. It is also appreciated that using no receiver or a modified receiver which does not contain a ferrite transformer the communication speed can be significantly increased.

C. Modulator/Demodulator Circuits

Figure 31A:
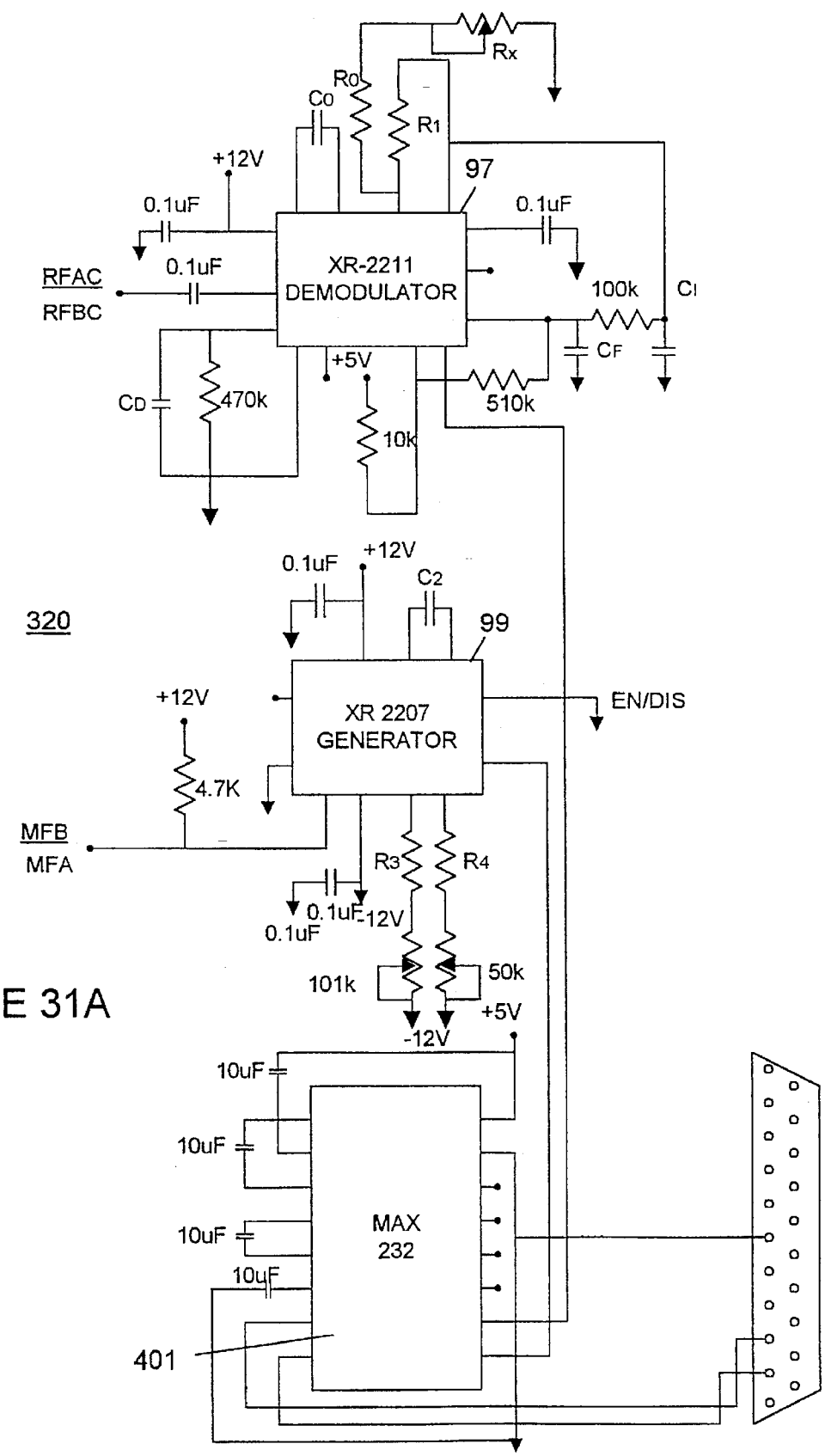
FIG. 31A is a schematic diagram corresponding to the modulator FA/demodulator FB shown in FIG. 27.

The modulation and demodulation of the data signals is now described with reference to FIGS. 31A and 31B. FIGS. 31A illustrates an FM modulator and demodulator 320. This circuit is particularly applicable for high voltage communication and particularly high voltage communication through power line transformers. The circuit comprises an XR-2211 FSK demodulator 397 XR-2207 FSK generator 399 and MAX232 computer input/output interface 401. The values for R0, C0, C1, C2, C3 and C4 are utilized to alter the carrier frequencies (FA and FB). The values of C1, R3 and R4 are varied to alter the FA and FB carrier frequencies.

Figure 31B:
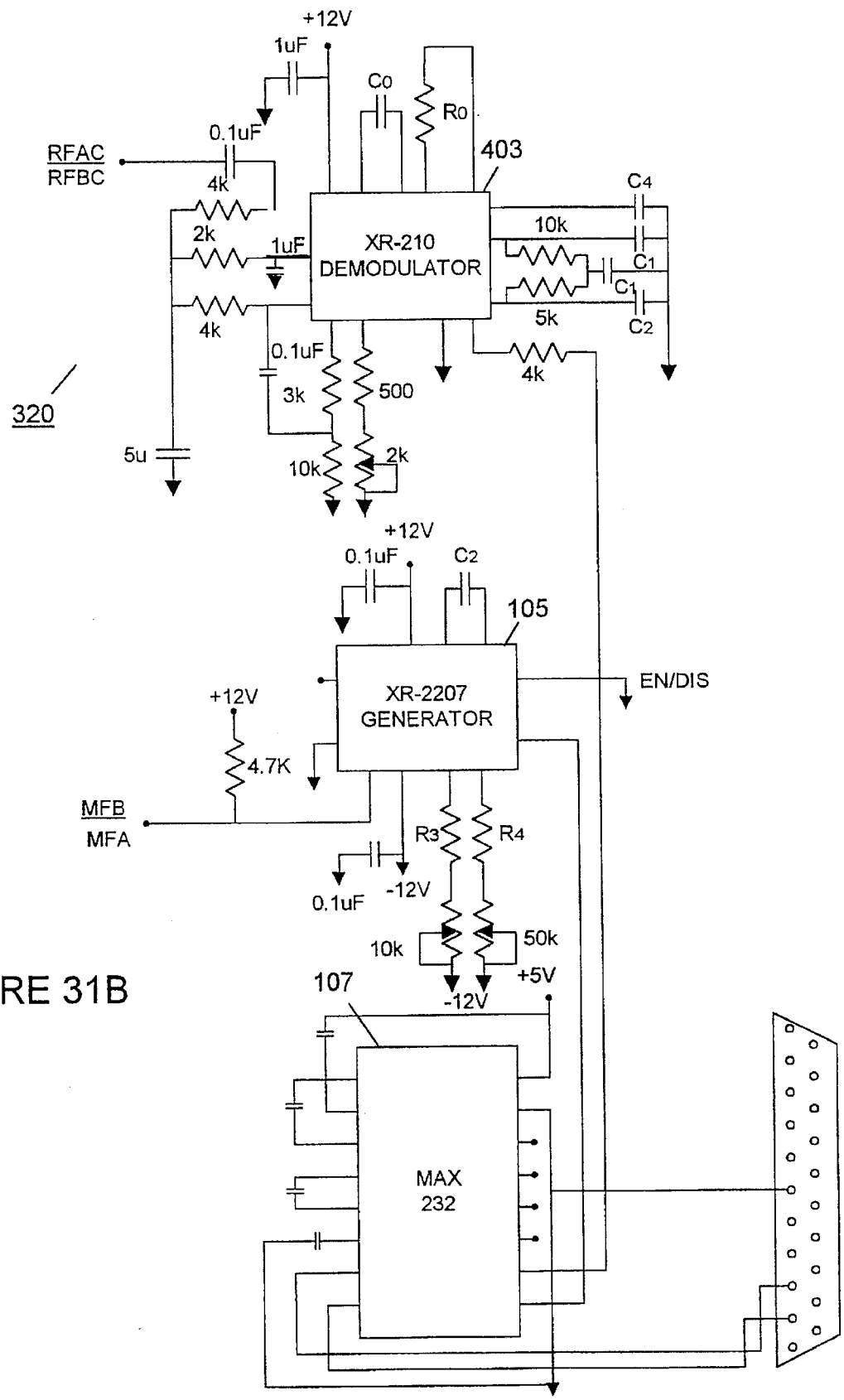
FIG. 31B is a schematic diagram of an alternative modulator FA/demodulator FB for the system in FIG. 27.

FIG. 31B illustrates an alternative FM modulator and demodulator 320' for high frequency communication for LAN and phone line communication. The circuit incorporates the XR-210 FSK demodulator 403, XR-2207 FSK generator 405 and MAX232 computer input/output interface 407. The values for R0, C0, C1, C2, C3 and C4 are utilized to alter the carrier frequencies (FA and FB). The values of C1, R3 and R4 are varied to alter the FA and FB carrier frequencies.

Figure 31C:
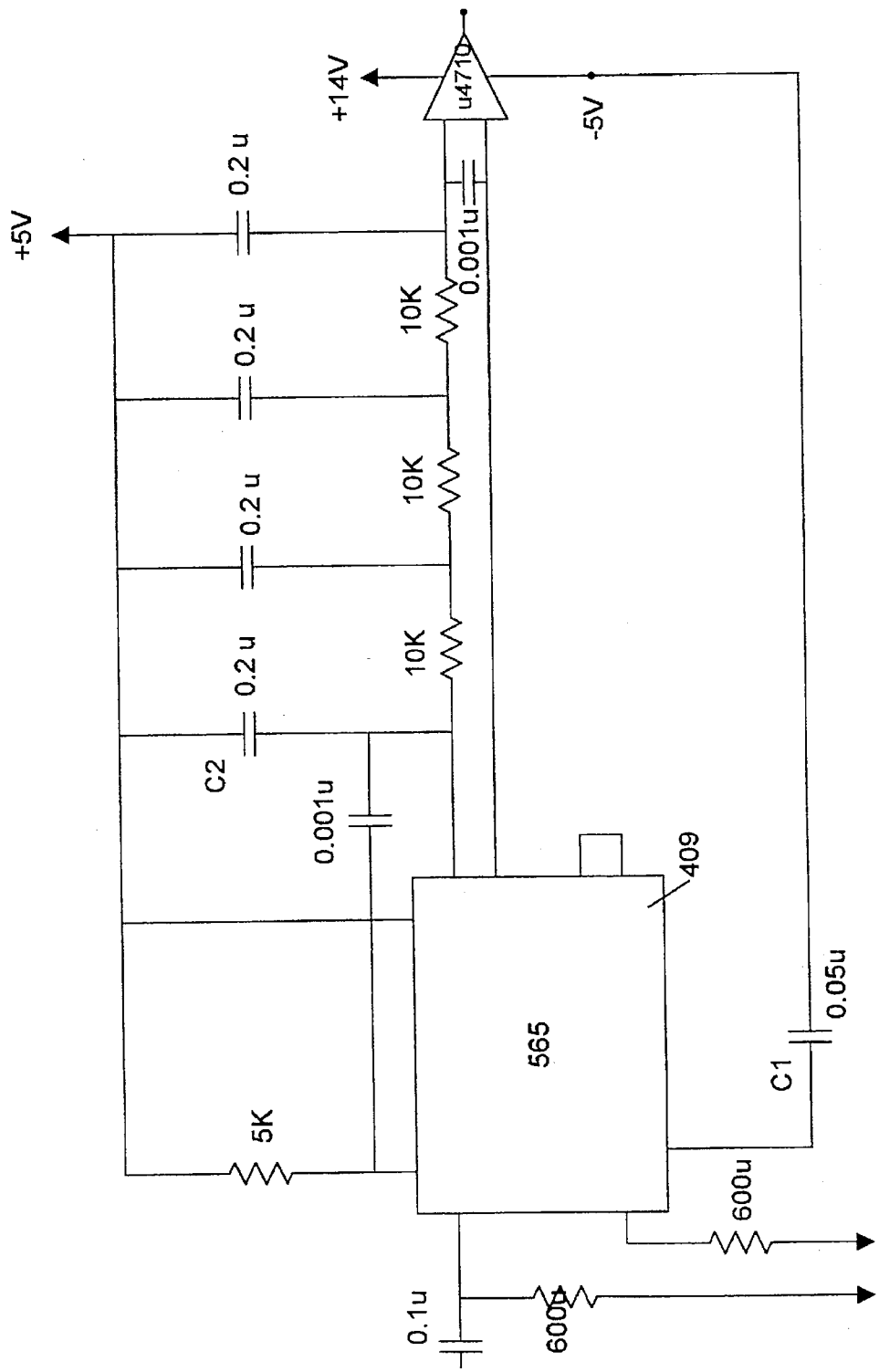
FIG. 31C is an FSK decoder phase lock loop which can function as the modulator/demodulator circuit of FIG. 27.
Figure 31D:
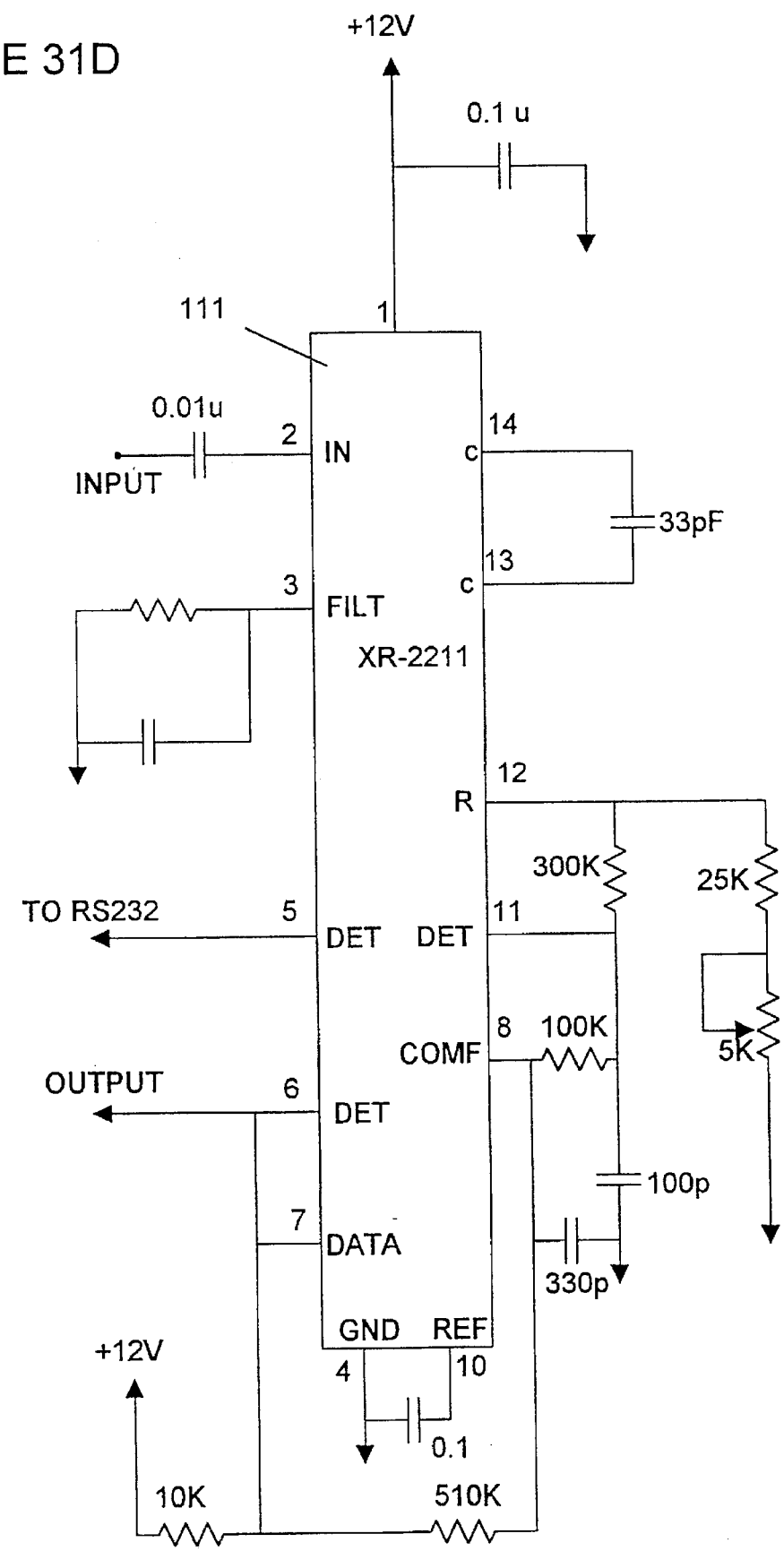
FIG. 31D is the primary phase lock loop of FIG. 31A.

FIGS. 31C and 31D illustrate additional modulator/demodulator circuits 320', 320''' which can be utilized in the present invention. FIG. 31C shows an FSK decoder using the 565 interface 409. The loop filter capacitor is chosen to set the proper overshoot on the output and a three-stage RC ladder filter is used to remove the noise frequency component. As shown in FIG. 31D, another FSK chip, the XR2211 411 can be used to demodulate and the XR2207 (not shown) can be used for modulation.

Modem Circuits

Figure 39:
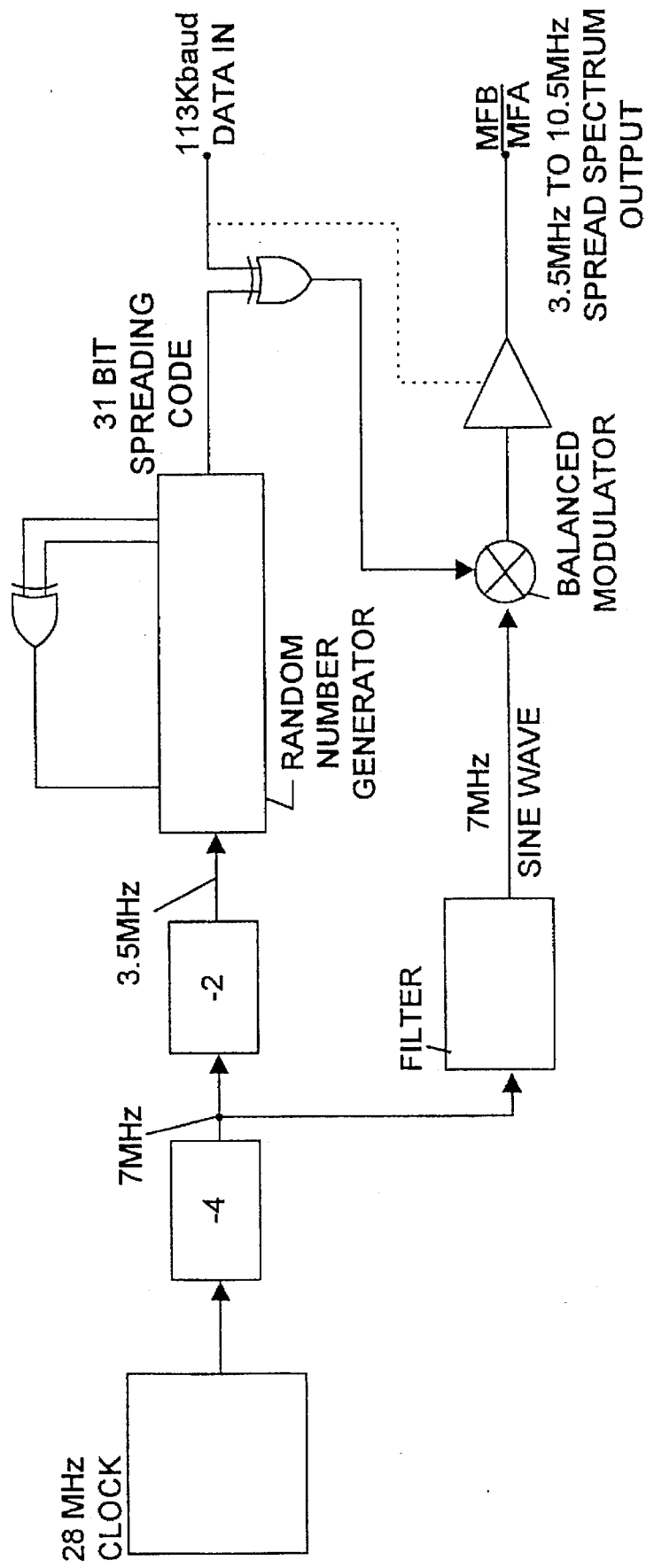
FIGS. 39 and 39A show a spread spectrum transmitter/receiver in accordance with the present invention which is particularly applicable for communication in between noise.
Figure 39A:
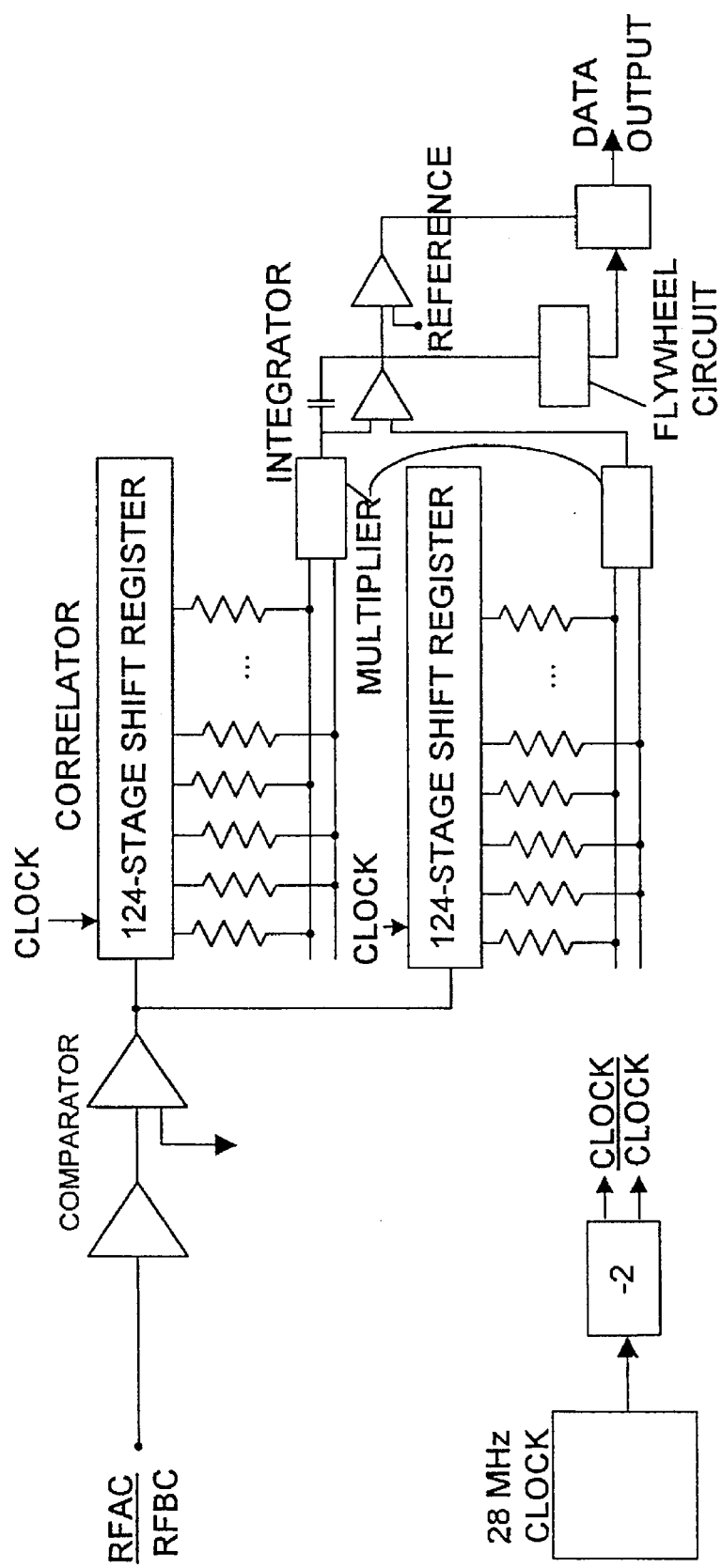
Figure 40:
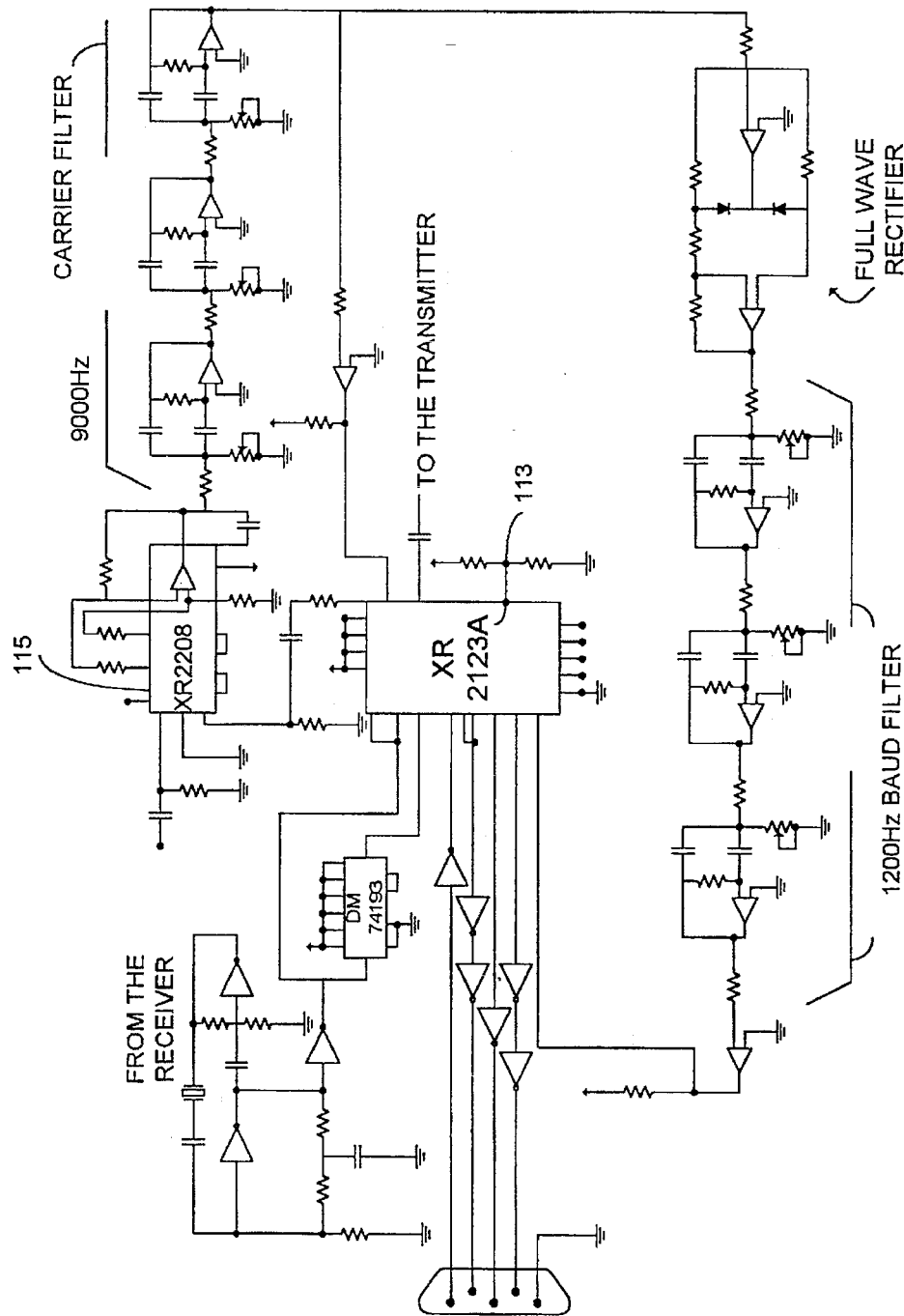
FIG. 40 phase shift keying modulator/demodulator which can be utilized with the present invention.

FIGS. 39 and 40 illustrate two complete modem configurations which can be utilized in the present invention. FIG. 39 is a spread spectrum transmission and receiver modem. This circuit is suited for communication through high voltage AC and DC power lines and for communication through transformers. The spread spectrum modem can be used for error free communication over long distances.

FIG. 40 illustrates a phase shift keying transceiver modem circuit particularly applicable for phone line and LAN communication. This circuit includes an XR2123 modulator/demodulator 433, XR2208 Operation Multiplier 415, and DM74193 synchronous up/down counter 417. This circuit requires a smaller bandwidth for communication than FSK because it uses only one carrier frequency while changing sine and cosine waves. The carrier frequency must always be at least 10 dB above the noise.

Operational Example

The particular attributes of the apparatus and configurations of the present invention are perhaps best illustrated in view of the following comprehensive example described with reference to FIGS. 43–46. This example utilizes most of the coupler configurations and modems discussed above and illustrates how the communications apparatus and novel couplers of the present invention can be utilized in a comprehensive system using LAN, phone line, high voltage and low voltage power line communications, as well as communication through power line transformers.

FIG. 43 illustrates an example of the couplers of the present invention as they may be utilized by an electric power public utility for reading home power meters. In this example, each house 419 receiving electric power from utility would have a modem 421 and air coil transmitter and receiver coupler circuit 423 in accordance with the present invention coupled to the electricity meter 425. The coupler 323 would connect to the 240 low volt distribution transformer 426, via low voltage lines, situated on the utility pole 427 located adjacent to the house 419. The couplers will have the low voltage configuration which is capable of communicating through power line transformers such as discussed in section A.3. above. The system will utilize the transmitters, receivers, modulators/demodulators, or modem circuits disclosed in FIGS. 31A, 32 and 33. The distribution transformer will be connected to one of the three 13.2 KV power lines 429 on the utility pole 427.

At the other end of the system situated at a local substation 431, a second substation modem 433 is connected to one of three couplers 435 in accordance with the present invention. The couplers are encased in resin, as disclosed above, and will preferably have the high voltage side transformer configuration set for the in FIG. 30c. The substation 433 is itself connected via couplers 437 such as disclosed in section A. 11 to the large central computer 439 of the utility (generally a VAX) via phone lines. The substation 431 and computer 439 will communicate over the power or phone line at rates up to 10K baud as set forth herein using the high speed couplers and the appropriate high speed modems.

When the utility desires to make a meter reading, the central computer 439 will issue an addressable command which is transmitted via a master modem 441 and coupler 437 to the particular substation at speeds up to 10K baud over power or conventional phone lines 438. The substation will then transmit an addressable command to a particular meter via modem and couplers. The command is transmitted over the 13.2 KV line at speeds up to 1200 baud, through the distribution transformer, through the home couplers 423 and modem 421. A meter reading is recorded, transmitted by the home modem 421 through couplers 423, through distribution transformer 426, over the 13.2 KV power line 429 to the appropriate substation coupler 435 and to the substation modem 433. The system only requires between one and ten watts for power transmission in both directions.

Figure 43A:
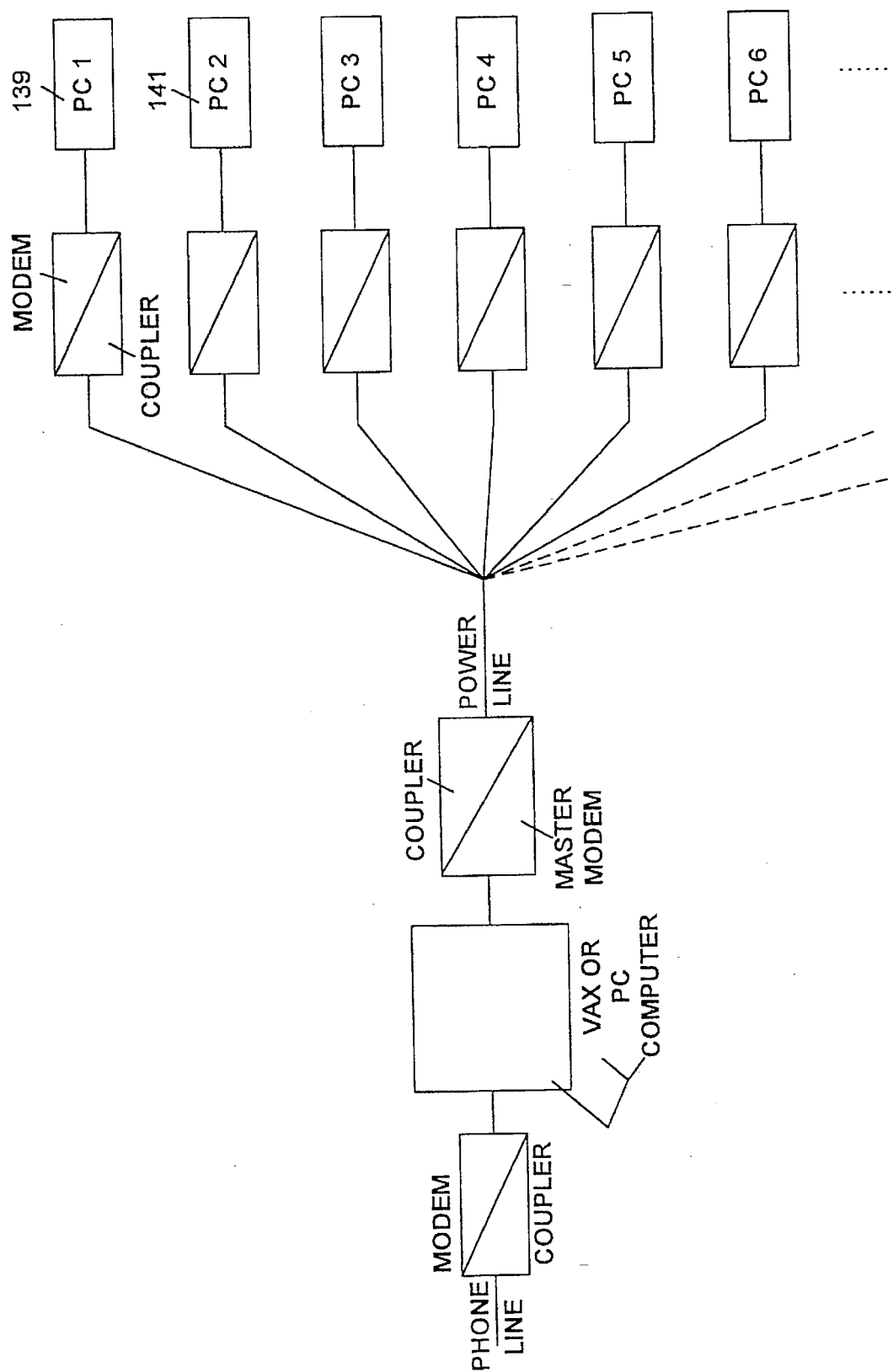
FIG. 43A is a block diagram illustrating the use of the couplers of the present invention within a LAN linked by power lines or conventional phone lines.

From the substation, the meter reading may be transmitted via conventional phone lines 438 to the central computer 439. Additionally, as shown in FIG. 43A, the high speed LAN couplers of the present invention could be used within the utility to connect local workstations to the central computer 439. For example, a clerical worker situated at a work station may access the VAX computer through the power lines of the facility via modems and high speed LAN or phone line couplers of the present invention at data transmission speeds of up to 10 Kbaud.

Figure 44:
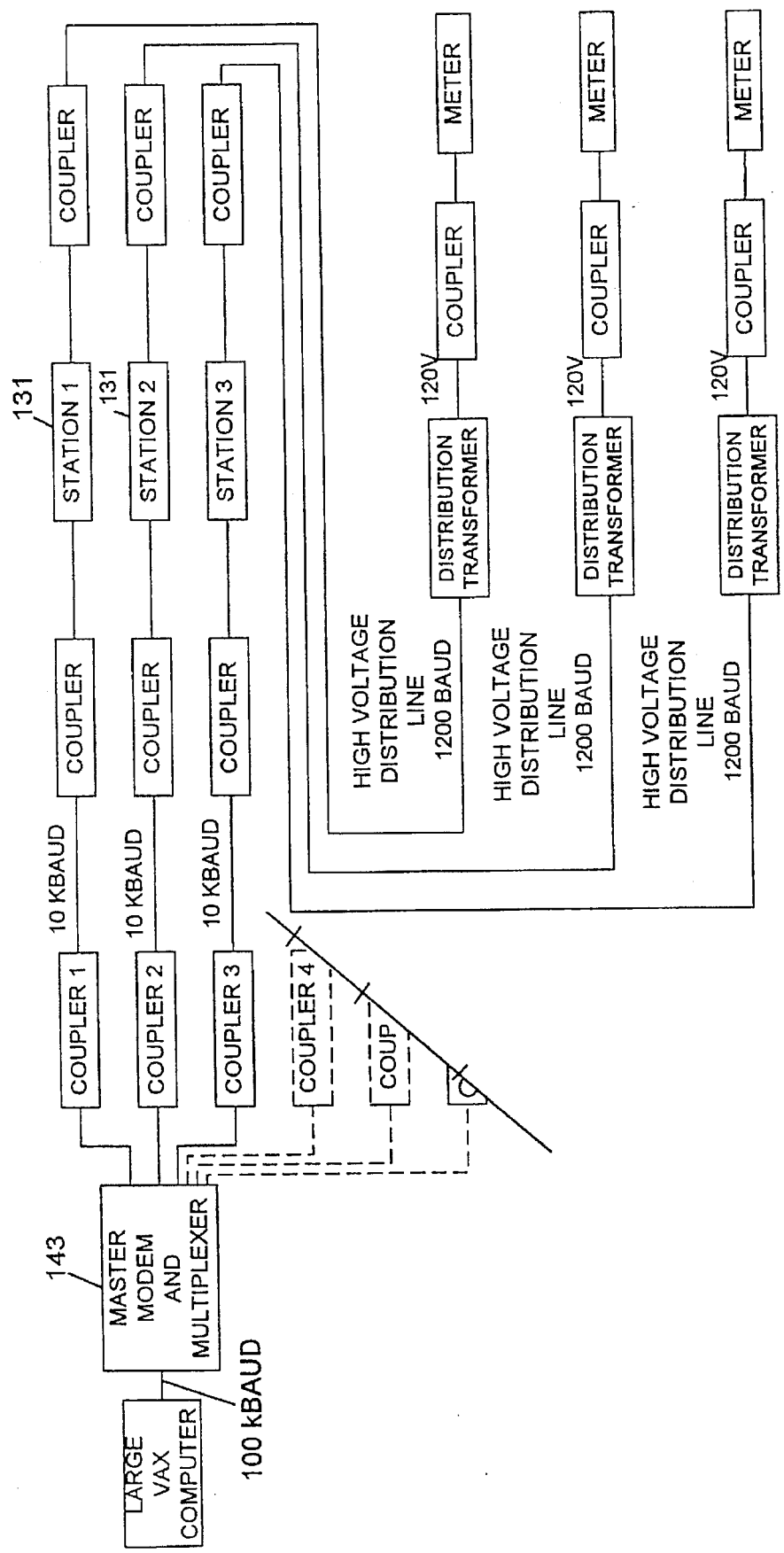
FIG. 44 is a block diagram of the system of FIG. 42 as applied to a multiplicity of substations.

FIG. 44 is a block diagram of an expanded system which may be utilized by a public utility to meter a multiplicity of substations. In this embodiment the central computer would simultaneously read a large number of meters via a master modem and multiplexer coupled to a multiplicity of couplers 443. As shown, the computer communicates with each substation (1, 2, 3, etc.) over conventional phone lines. The respective substations then communicate with the individual meters at 1200 baud via high voltage distribution line and through distribution transformers.

Figure 45:
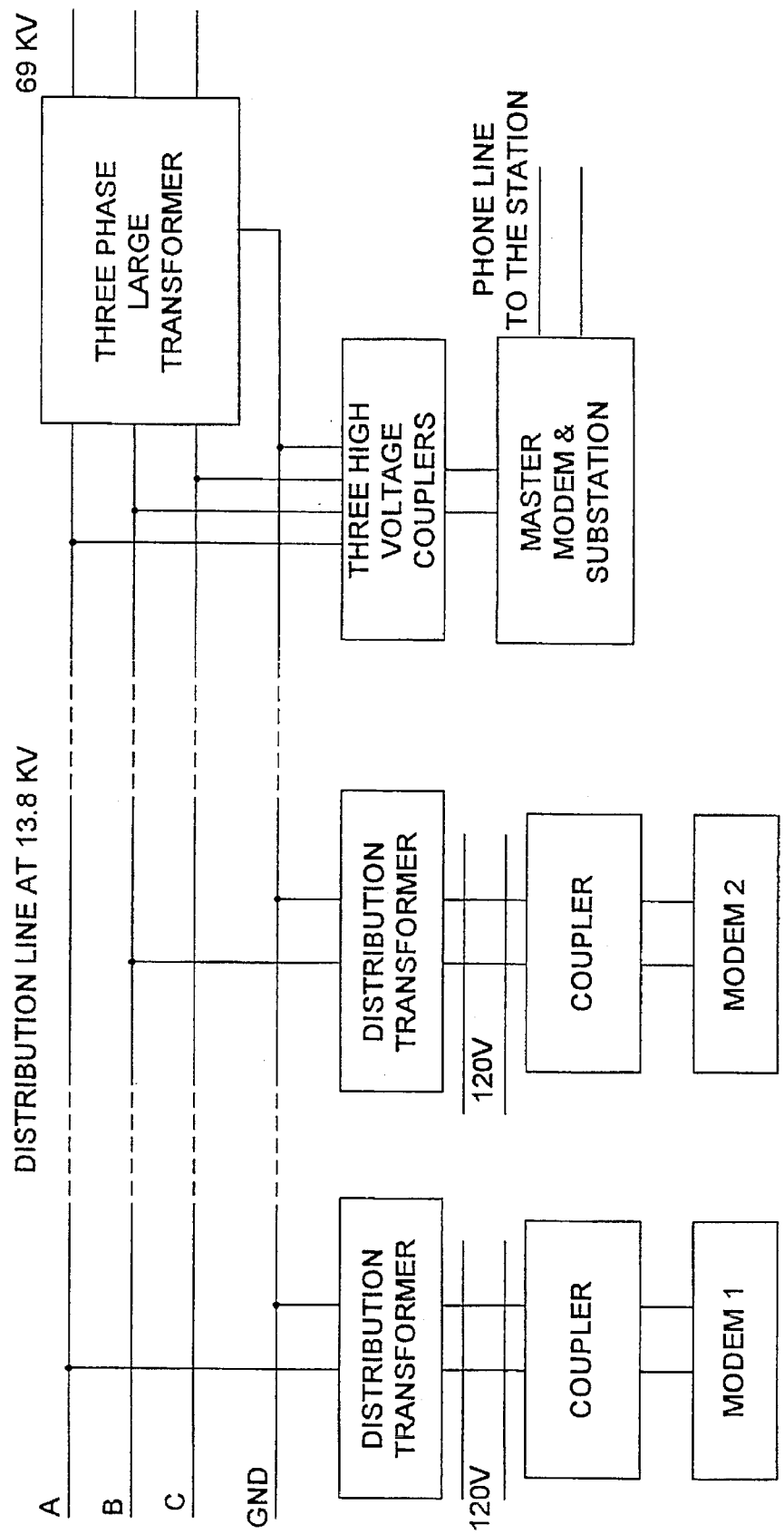
FIG. 45 is a simplified block diagram of the system of FIG. 40.
Figure 46:
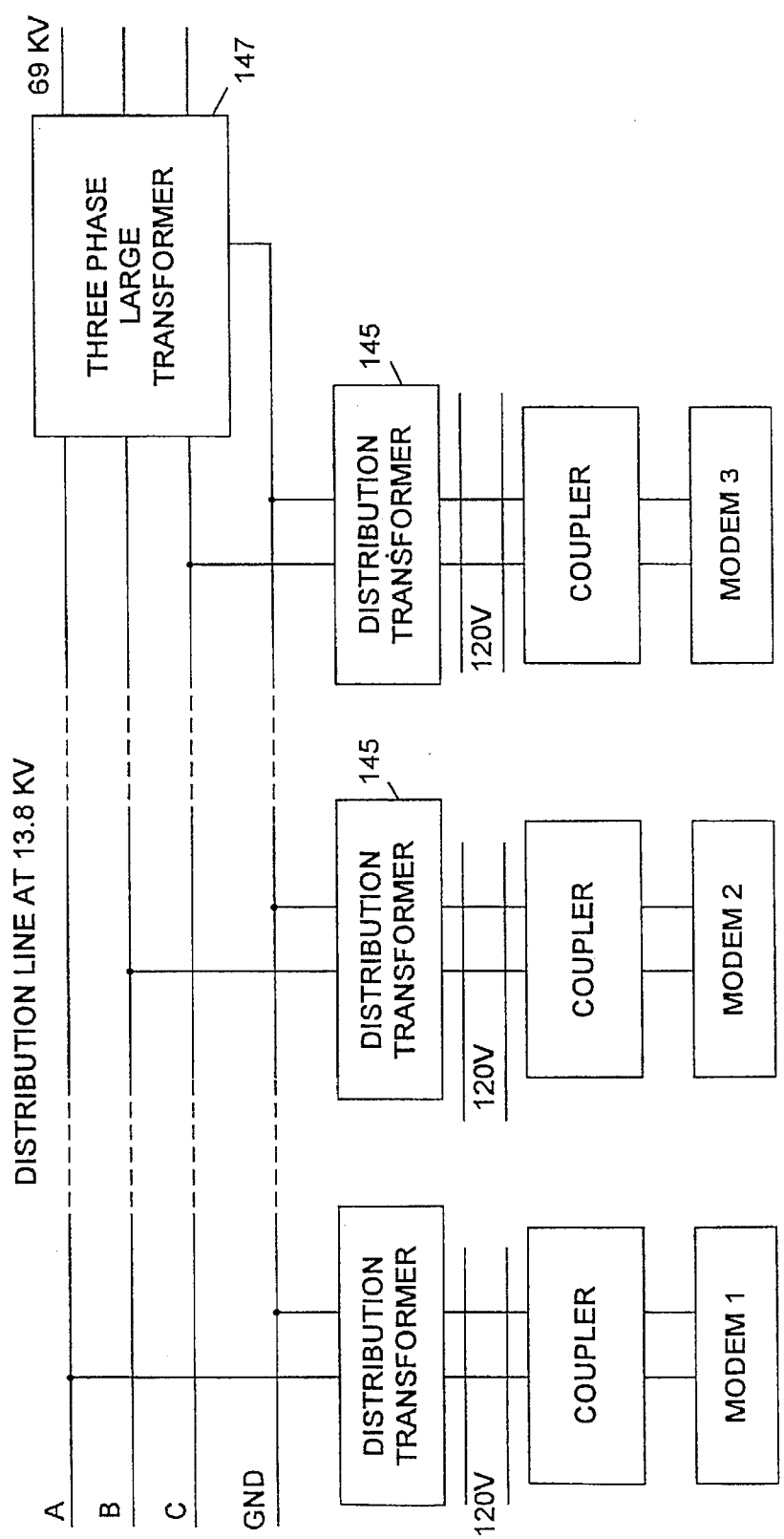
FIG. 46 is a block diagram of a power line communication system.

FIG. 45 is a simplified block diagram of the communication system of FIG. 43. FIG. 46 is a block diagram of how the couplers of the present invention can be utilized to communicate through two power line transformers 445 and through a three phase large transformer 447. In this configuration, the couplers will comprise low voltage couplers designed for communication through power line transformers as discussed above. It is to be noted that the couplers of the present invention will permit the simultaneous transmission and reception of more than one carrier frequency through the couplers. Hence, the couplers can be simultaneously utilized by an electric public utility for electric meter reading at a first frequency while a public water utility utilizes the couplers at a second carrier frequency for water meter reading.

Figure 34:
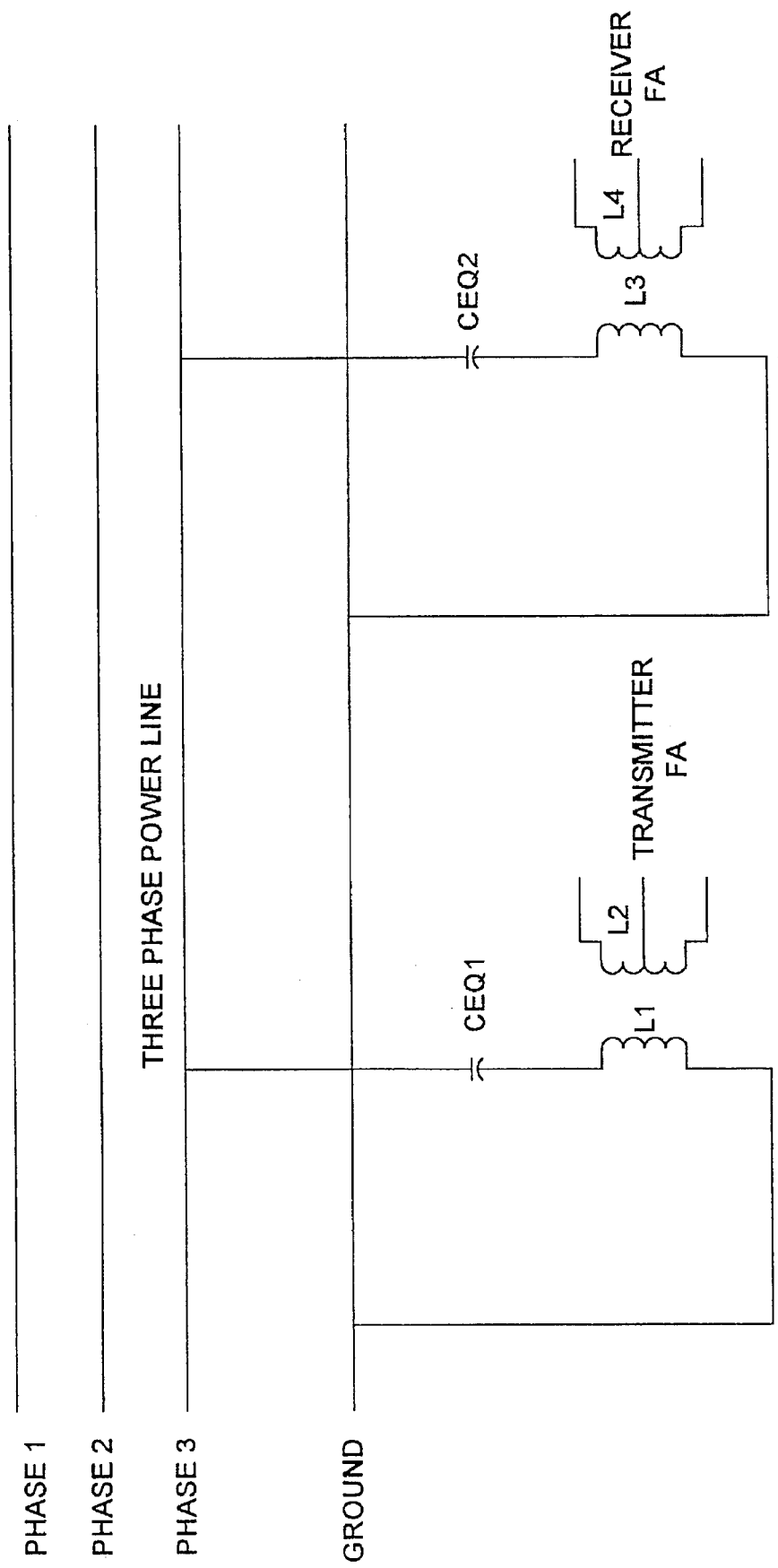
FIG. 34 is a schematic representation of a coupling for the power line from phase to ground.
Figure 36:
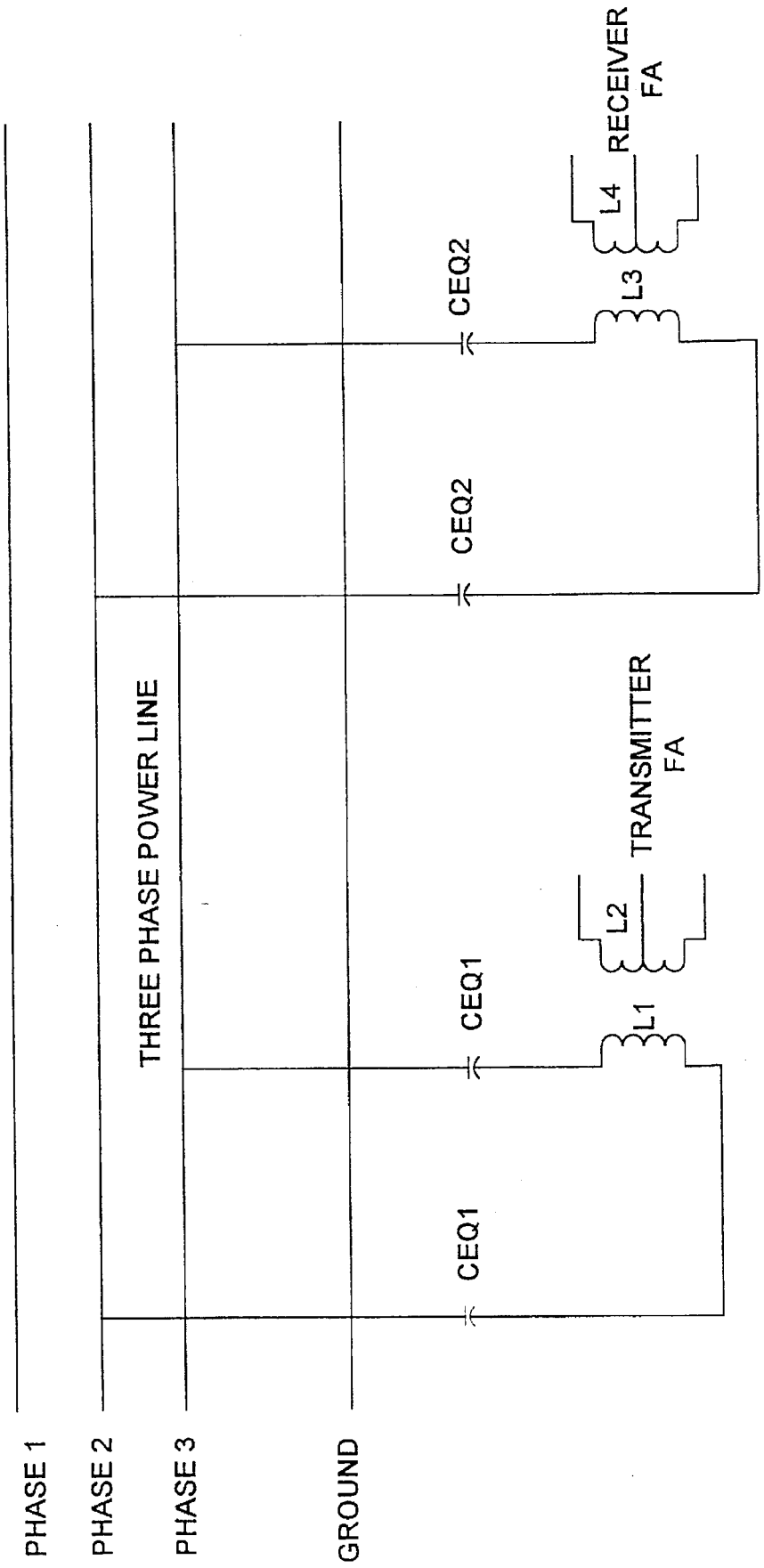
FIG. 36 illustrates a two phase coupling connection to the power line, phase to phase.

A final consideration of the present invention is the connection of the apparatus to a three phase power line. FIG. 34 illustrates the general case of coupling the apparatus to the power line, phase to ground. In this format, the carrier frequency is undetectable by other phase-ground coupling connections and each phase is isolated from each other for communication purposes. FIG. 35 illustrates a special three phase coupling connection to the power line, 3 phases to ground. This system utilizes all three phases from the power line and ground for communication. In this case, the carrier frequency is detectable on any phase-ground coupling connection. In this manner, the phases are interconnected for communicating purposes. FIG. 36 illustrates a special two phase coupling connection to the power line, phase to phase 447. This system utilizes two phases from the power line for communication. The carrier frequency is detectable only on the two phase coupling connection. In this configuration, only the coupled two phases are connected from communication purposes.

Figure 37:
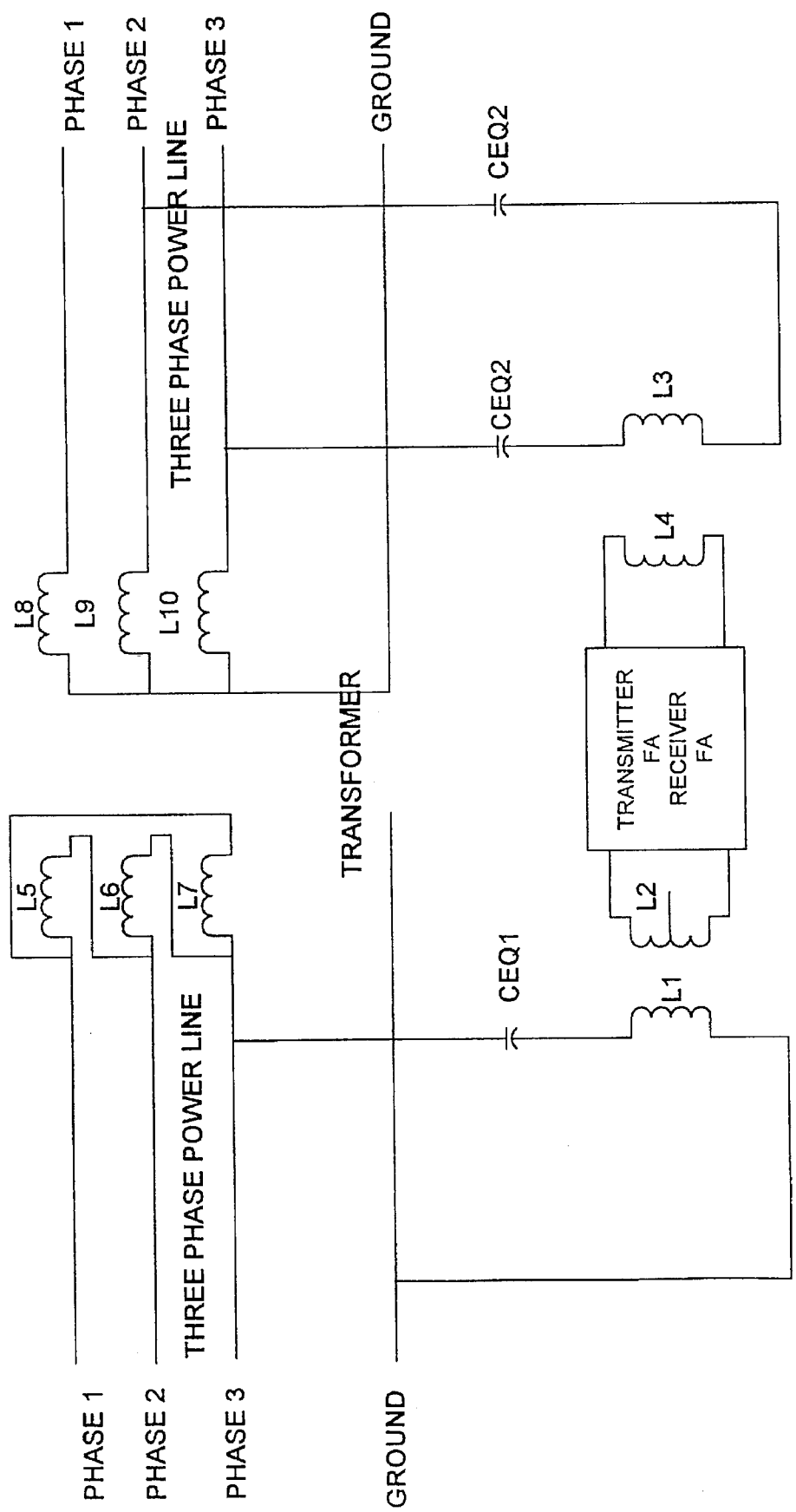
FIG. 37 shows a three phase transformer coupling of the type predominantly used in Europe.
Figure 38:
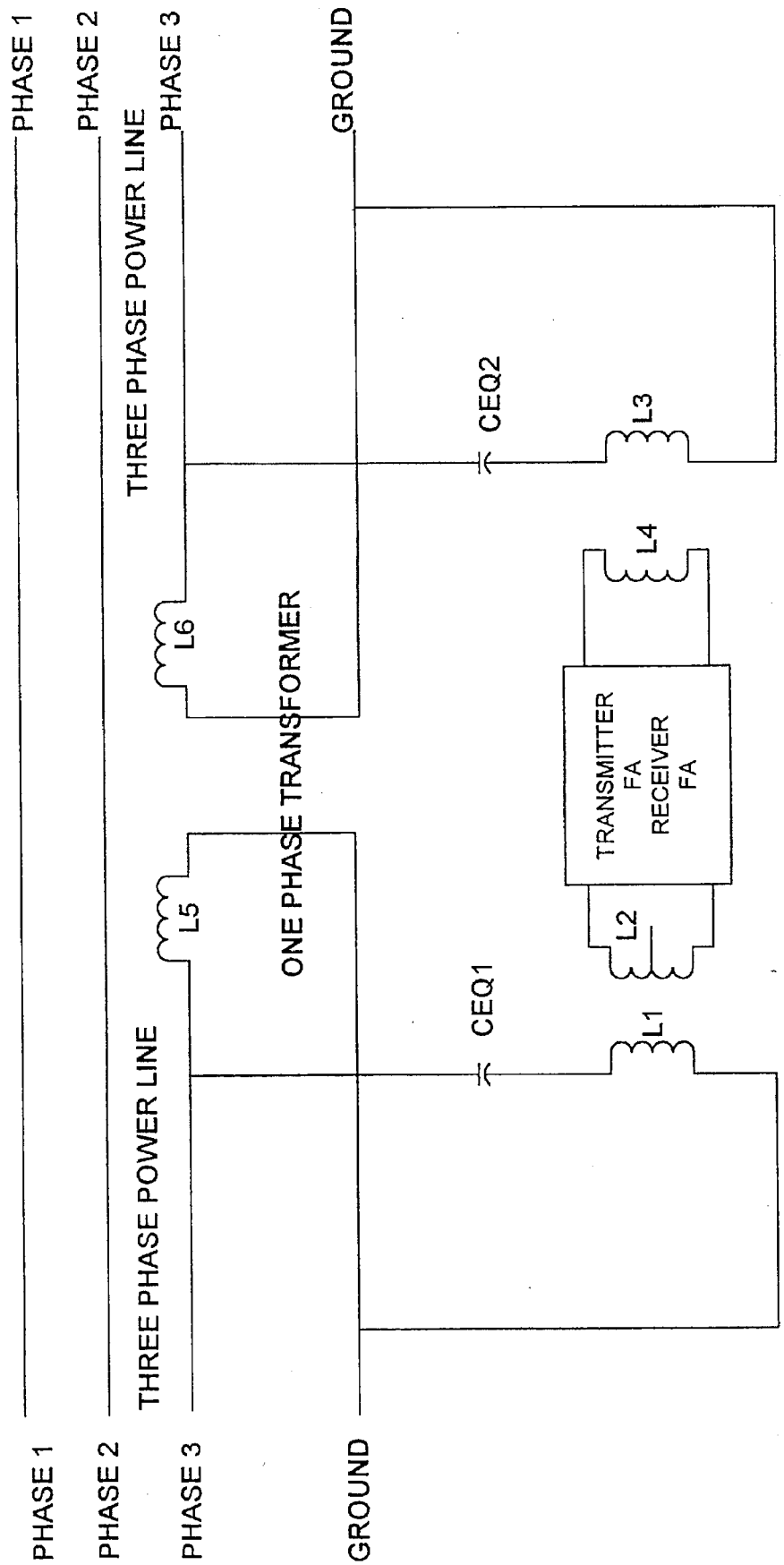
FIG. 38 shows a one phase transformer coupling of the type generally used in the United States.

FIG. 37 illustrates a three phase transformer coupling around delta and Y (Wye) transformers 449. This coupling system is generally utilized in Europe. The carrier frequency is detectable on the other power line. In this manner, two different high voltage power lines are connected to each other for communication purposes. Finally, FIG. 38 illustrates a one phase transformer coupling which is generally used in the U.S.A. In this manner, the carrier frequency is detectable on the other power line. Accordingly, two different high voltage power lines are connected to each other for communication purposes.

Description of the Video Distrubution System

Figure 1:
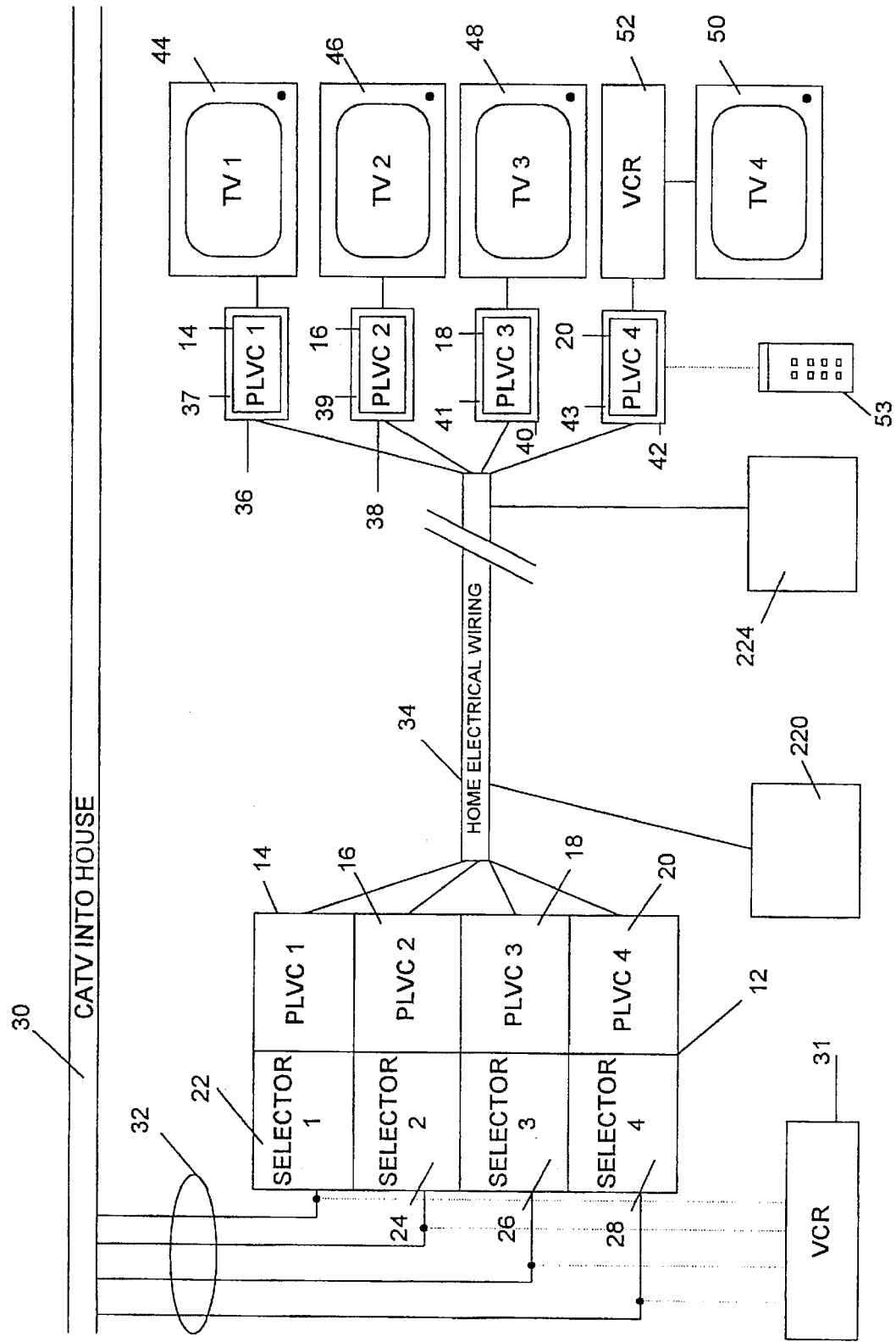
FIG. 1 is a block diagram of a cable television/video distribution and selection system in accordance with the present invention.

And now will be described the video distribution system in detail. There is shown in FIG. 1 a block diagram of an exemplary cable television and video distribution and selection system constructed in accordance with the present invention. System 10 can be setup in any home or other building which is wired with AC electrical wiring, such as 3 strand (ground, hot, neutral) used in home and building construction.

System 10 allows the operation of up to four simultaneously and independently operated television sets or other viewing or recording devices, such as a monitor or VCR. System 10 is designed to operate using analog signals distributed throughout a home or building and thus, does not require more expensive digital to analog and analog to digital equipment necessary to make these conversions.

Main cable 30 carries cable television signals into a house or building (not shown). Main cable 30 is a source for video signals which can be selected by televisions or other tuning devices distributed throughout the home or building. Alternatively, a VCR 31 or other video broadcast devices such as a laser disc player or a video camera can also serve as the video signal source or as an alternate video signal source for selection of signals by the tuning devices distributed throughout the home or building. Accordingly, the description which follows applies to the selection of a VCR 31 or other source device for video signals as well as the selection of cable television signals and can be incorporated into System 10.

Figure 2:
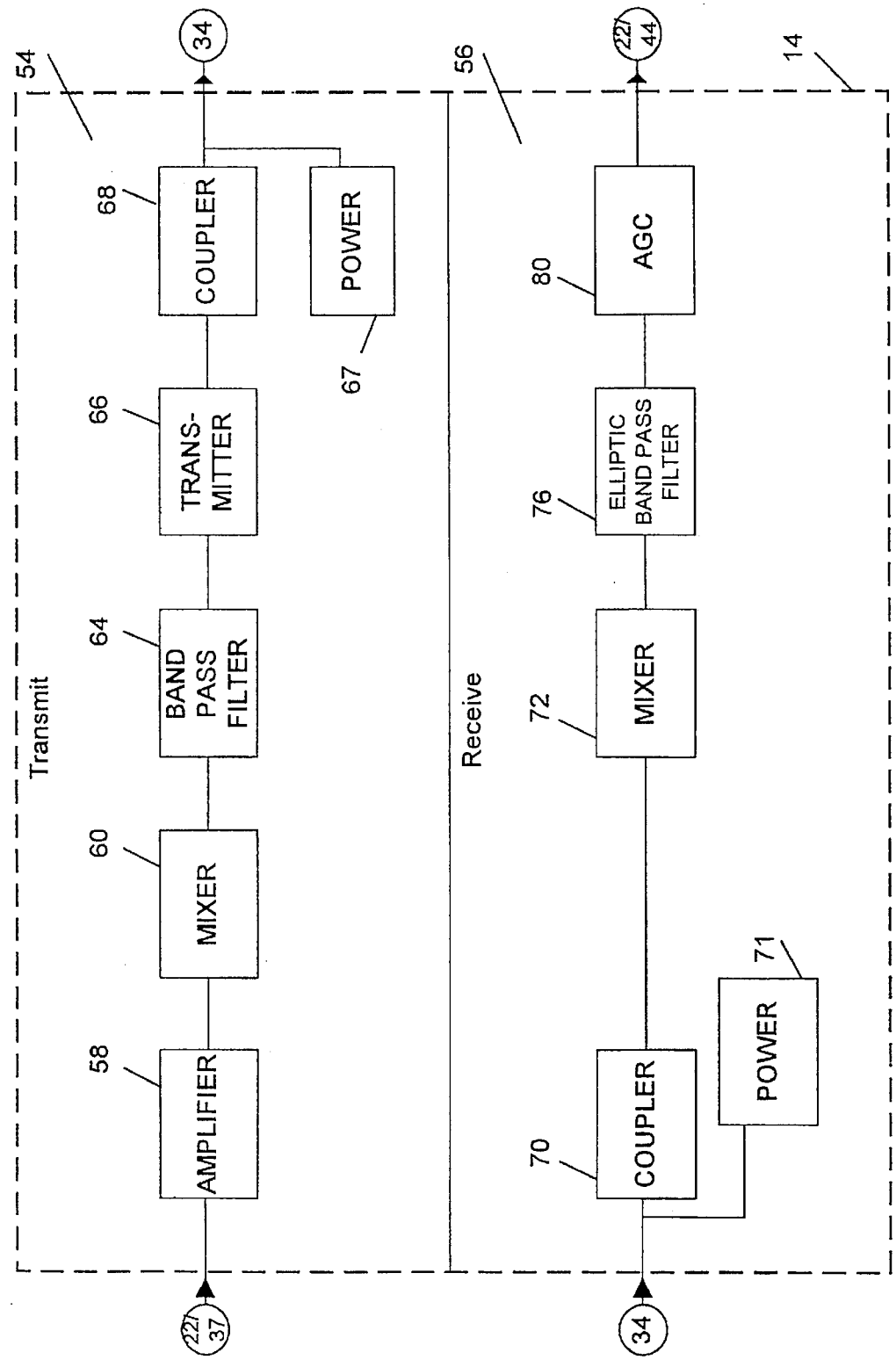
FIG. 2 is an exemplary schematic block diagram of a power line video coupler, comprising a transmitter section and a receiver section in accordance with the present invention.

Cable 30 is connected to distribution box 12, via lead lines 32. As the present invention can distribute signals to four simultaneously and independently operating television sets or viewing/recording devices, four lead lines 32 connected to cable 30 are shown. Each lead line 32 is connected to a separate channel selector (tuner) of distribution box 12. The channel selectors of the present invention can tune cable television channels as is understood by those skilled in the art. Selectors 1-4 are correspondingly numbered—22, 24, 26, and 28. Further, each selector is connected to a corresponding power line video coupler (PLVC). PLVCs 1-4 are correspondingly numbered 14, 16, 18, and 20. The selectors and power line video couplers operate in pairs as distribution devices. It is possible for the selectors and PLVCs to be separate devices or a combined device (as illustrated in FIG. 2). For example, channel selector 1 and PLVC 1 operate together; channel selector 2 and PLVC 2 operate together; channel selector 3 and PLVC 3 operate together; and channel selector 4 and PLVC 4 operate together. Accordingly, throughout this description of the present invention, although only one channel selector/PLVC pair may be described, each additional channel selector/PLVC pair will be understood to operate in a similar fashion to the one being described. The difference between the four channel selector/PLVC pairs shown in distribution box 12 is that each PLVC is tuned to operate at a different frequency band. This is to accommodate the four separate 6 MHZ video signals which can be transmitted between the 2 MHZ and 30 MHZ frequency band and which will be discussed more fully herein.

Distribution box 12 is connected to home electrical wiring 34 to distribute the cable television/video signals throughout a home or building. The connection between distribution box 12 and home electrical wiring 34 will most commonly be made at a junction box or a fuse box (not shown), which in many instances will be located in proximity to the entry of cable 30 into a home or building. Typically, the cable and electrical entry points into a home or building are in a basement or garage. Distribution box 12 may be of a size suitable for mounting on a wall near a fuse box or junction box and may be no more obtrusive than the fuse box or junction box. It is not necessary, however, for distribution box 12 to be located or connected to a junction box or fuse box. Distribution box 12 can be located anywhere in a building where connection to electrical wiring 34 can be made and also access all rooms, via electrical wiring 34, where television sets are to be used. Such a location will also require access to source signals such as cable television or VCRs. If only VCR signals were being distributed (i.e., 4 VCR signals to choose from), proximity to a cable television connection 30 would not be required. It is also possible to set up system 10 so that a user could select a VCR signal or a cable television signal.

The connection between home electrical wiring 34 and distribution box 12 is made at each PLVC. As each PLVC is tuned to a different, overlapping, or interfering frequency, a single connection can be made from distribution box 12 to electrical wiring 34, as long as each PLVC is tied into this connection.

A television set or other viewing or recording device can be placed in every room of a home or building or multiple television sets or tunable devices can be placed in every room. In the present system, however, only four can be operated independently (i.e., tuned to an independent channel) and simultaneously.

Referring back to FIG. 1, four television sets 44, 46, 48, and 50 are shown to represent four independent and simultaneous viewing or recording devices. Each television is connected to a remote device (receiver/selector) 36, 38, 40, and 43, respectively. Each remote device contains a PLVC which corresponds in number to the PLVC contained in distribution box 12 with the same PLVC numbering. This represents that each of the four PLVC units is correspondingly tuned to the same frequency as the PLVC unit contained in distribution box 12. Also present in each remote device is a means for selecting a cable television channel (or alternatively, a separate source such as VCR 31). An example of such a selection system is a remote control cable selector box as is commonly provided by cable television service providers. This type of system is illustrated as remote control 53 which operates in the infrared spectrum as is commonly used in cable television selectors, VCRs, televisions, stereo equipment, and video cameras, and is therefore understood by those skilled in the art. A separate remote control device, such as remote control 53 would operate each selector section 37, 39, 41, and 43 of the corresponding remote devices, 36, 38, 40, and 42. Alternatively, a key pad entry located on a remote device could be used in addition or instead of remote control 53.

In operation, a user desiring to watch a particular cable television channel would use a remote control device 53, and pointing the device at a remote device such as remote device 36, select a channel. Remote device 36 receives the infra-red signal from remote control device 53 at its selector 37. The selection signal (the channel selected) is then transmitted through PLVC 14 over home electrical wiring 34 to the corresponding PLVC 14 in distribution box 12. PLVC 14 communicates this signal to selector 22 which tunes the requested cable channel from cable 30. The cable channel tuned by selector 22 is then communicated through PLVC 14 in distribution box 12 through home electrical wiring 34 and back to remote device 36. The cable channel signal is then communicated through PLVC 14 located in remote device 36 to television set 44 for viewing by the user. A similar operation can take place for television sets 46, 48, and 50 simultaneous with the operation described for television 44.

A VCR 52 can also be disposed between a remote device box and a television as is shown with respect to remote device 42 and television SO. This is a common setup when standard cable television boxes are used with VCRs and televisions.

In operation, System 10 will operate transparent to the user. The user will not recognize any difference between the operation of System 10 and a current cable distribution system. A difference in performance and operation will be the availability of a cable television outlet wherever an electrical outlet is located in a home, as every electrical outlet will also serve as a cable television outlet. Also, the possibility of having an alternate source signal such as VCR 31 will now be possible and selectable. With the increasing number of smaller and better quality televisions, the ability to connect a television set at any location in the house where an electrical outlet is located will be highly advantageous. Also, a VCR or other video signal source can be located anywhere there is an electrical outlet. It is not required by the present system that distribution devices be centrally located.

There is shown in FIG. 2 a block diagram of a power line video coupler used in the present invention. Power line video coupler 14 shown in FIG. 2 should be understood to be identical to PLVC 16, 18, and 20, except that each of the four power line video couplers is tuned to a different frequency band between 2 MHZ and 30 MHZ which are non-overlapping and do not interfere with each other.

PLVC 14 is shown divided into a transmitter section 54 and receiver section 56. Whether located in a remote device (with a television set) or in distribution box 12, each PLVC is required to both transmit and receive signals. When located in a remote device (connected to a television set), a PLVC will have to transmit a selector signal to select a cable television station. It will then be required to receive the corresponding cable television signal transmission. When located in a distribution box 12, each PLVC will be required to receive the selection signal for a particular cable television channel and then transmit the corresponding cable television signal.

Using selector 22, PLVC 14 and television set 44 as an example, transmit section 54 must take its input either from selector 22 in distribution box 12 or selector 37 in remote device 36. A cable television signal will be provided by selector 22. This signal is fed into amplifier 58 and then into mixer 60. A frequency signal produced by oscillator 62 of mixer 60 is combined with the input signal from selector 22. The mixed signal is then sent through a band pass filter 64 to filter out the component of the signal from mixer 60 which is not desired, allowing the cable television signal to pass through. The filtered signal is then sent through transmitter 66 and out through coupler 68 to the home electrical wiring 34. Coupler 68 contains a pair of power line couplers as described earlier. A transmitter power supply 67 is also shown in FIG. 2.

When receiving a signal, the signal comes in through home electrical wiring 34 into a (pair of) coupler 70 which is located in receiver section 56 of PLVC 14. Coupler 70 is identical to coupler 68, but operates as a receiver instead of a transmitter and has a power supply 71. The signal then goes through mixer 72 which operates in, an opposite manner to the operation of mixer 60. This will "unmix" the down-converted signal, restoring it to its original frequency. The unmixed signal then leaves mixer 72 and enters an elliptic band pass filter 76. The filtered signal is then put through an automatic gain control 80 to optimize this signal which is then output to television set 44.

In operation, the selector/receivers of the present invention are designed to transmit signals in the frequency range between 60 and 72 megahertz when sending a signal between a remote device and a television set. VHF channel 3 corresponds to the frequency range of 60–66 megahertz, while channel 4 corresponds to the frequency range of 66–72 megahertz. Thus, a user selects Channel 3 or 4 to eliminate interference as is commonly done when connecting a VCR to a television set.

The present system is designed to transmit over a house or building electrical power lines in a frequency range between 2 and 30 megahertz. In the present system, the video signal with a 6 megahertz bandwidth (between 60–66 megahertz for channel 3 and 66–72 megahertz for channel 4) is down-converted to a signal with a bandwidth between 2 and 30 megahertz for video signal transmission. A 6 megahertz bandwidth is necessary for video transmission in analog format. Accordingly, there is a range of 28 megahertz in which 6 megahertz signals can be transmitted. Accordingly, this allows up to four separate transmission bands to be used without interfering with each other. This, in turn, is the number of independently and simultaneously television sets or viewing or recording devices which can operate in accordance with the present invention and is illustrated as such in FIG. 1.

For each separate television, a 6 megahertz bandwidth must be set aside. For example, beginning at 2 megahertz, adding 6 megahertz to this reserves the band between 2 and 8 megahertz. However, the selector signal sent from the remote device requires its "own" frequency so as not to interfere with the video signal transmission. Therefore, an extra four, single megahertz frequencies must be set aside to transmit the selector signal. Smaller or larger frequency bands could also be used, with a one megahertz frequency band described herein as an example.

An example allocation of frequency bands is to use the 2–6 MHZ frequencies as the four selector signal frequencies and begin the video signal (6 MHZ bandwidth) at 6 MHZ. Another way of allocating frequency bands is to add the one MHZ selector signal to the six MHZ video signal, yielding a frequency bandwidth of seven MHZ. The first or last portion of this seven MHZ frequency band could be used for the selector signal. Other ways of allocating frequency bands should be understood by those skilled in the art.

Assuming the selector signal frequencies extend between 2 and 6 MHZ, the first video signal (i.e., first television) extends between 6 and 12 megahertz. The second signal (i.e., the second television) extends between 12 and 18 megahertz. The third signal (i.e., the third television) extends between 18 and 24 megahertz, and the fourth (i.e., the fourth television) extends between 24 and 30 megahertz.

Each PLVC unit is designed to down-convert for transmission and up-convert for reception in one of these four band widths. Thus, PLVC 14, for example, will be designed to operate in a first bandwidth between 6 and 12 megahertz. Accordingly, mixer 60 and mixer 70 in PLVC 14 are designed to down-convert and up-convert the signal so that the signal sent through home electrical line 34 is in the 6 to 12 megahertz range. If channel 3 (between 60–66 megahertz) is used, it is necessary to generate a mixing signal of 54 megahertz. This 54 megahertz signal is generated by oscillators 62 and 74. By mixing in a signal of 54 megahertz, the 6 megahertz signal sits between 6 megahertz and 12 megahertz. If channel 4 (in the 66–72 megahertz bandwidth), is used then mixers 60 and 72 have to mix in a signal of 60 megahertz. As each selector/receiver is switch selectable between channel 3 and 4, oscillators 62 and 74 provide a different signal to mixers 60 and 72 respectively, depending upon whether channel 3 or channel 4 was chosen by the user.

Mixtures 60 and 72, actually mix both the positive and negative component of the wave form generated by oscillator 62 and 74. As the signal is down-converted for transmission through electrical lines 34, it is necessary to filter out the unwanted (additive) portion of the wave form. Band pass filter 64 only allows signals in the 2–30 megahertz band to pass. Elliptic band pass filter 76 in receiver 56 carries out a similar function.

Figure 3:
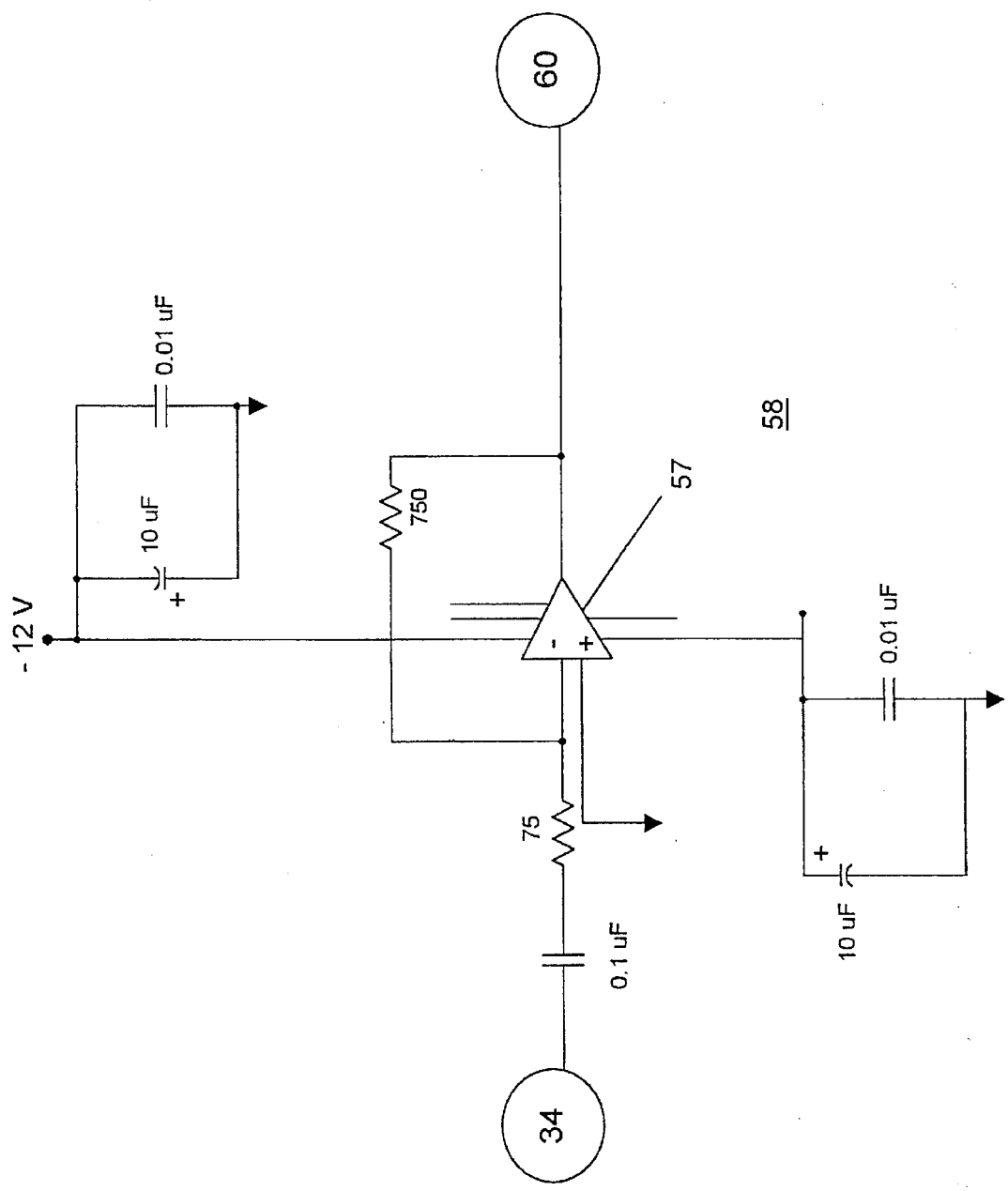
FIG. 3 is a schematic diagram of a transmitter amplifier circuit 58 shown in FIG. 2.

There is shown in FIG. 3 a schematic diagram of amplifier circuit 58. Amplifier circuit 58 provides an amplified signal to mixer 60. Amplifier circuit 58 contains an amplifier 57 which is part No. AD 811, made by Analog devices.

Figure 4:
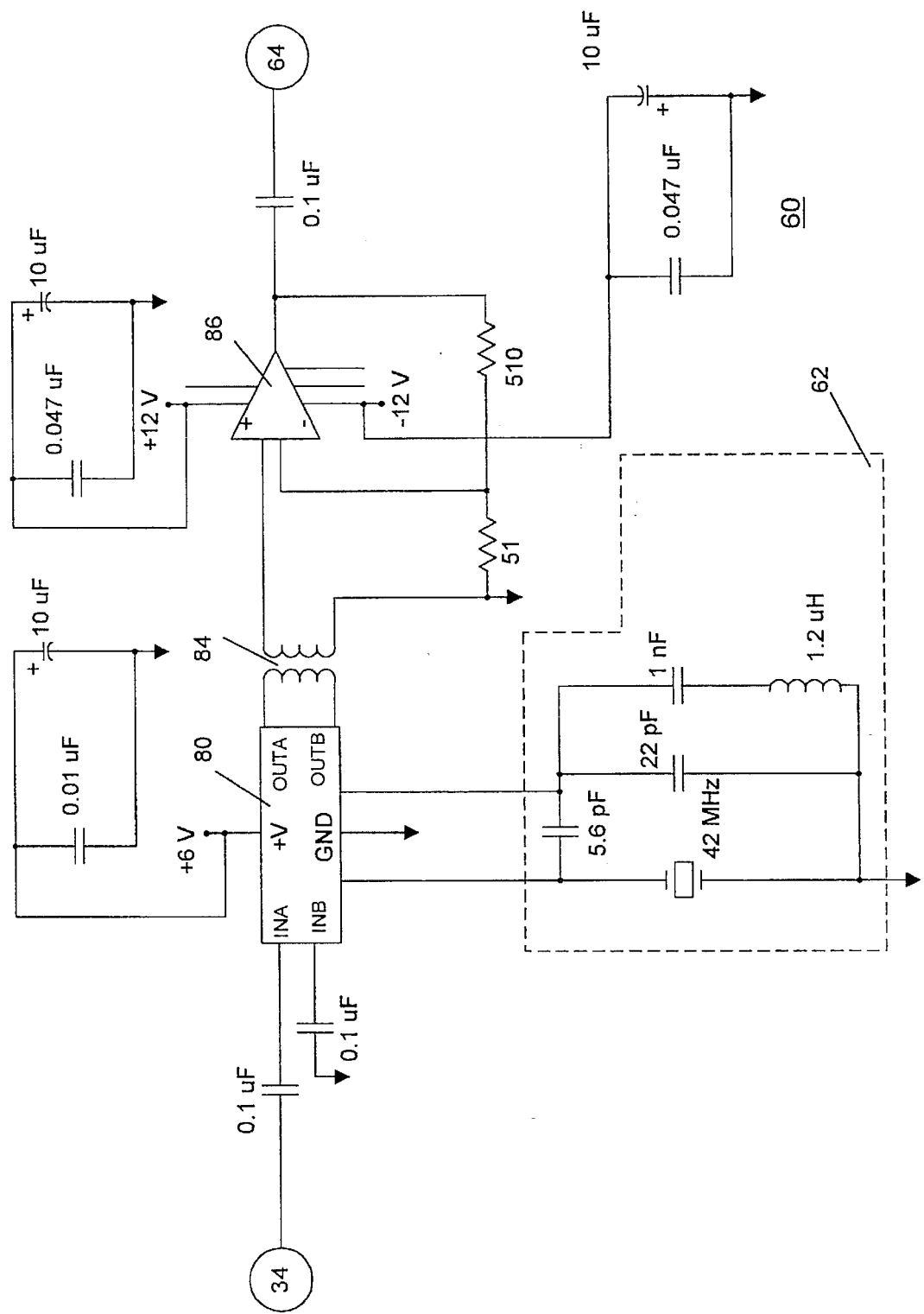
FIG. 4 is a schematic diagram of transmitter 15 mixer 60 shown in FIG. 2.

There is shown in FIG. 4 a schematic diagram of transmitter mixer circuit 60. Transmitter mixer 60 receives its input from amplifier 58. A signal (difference signal) from oscillator 62 is generated within transmitter mixer 60 and is combined with the signal from electrical line 34 at mixer 80. An example of mixer 80 is integrated circuit No. NE 612 made by Phillips. The down-converted signal passes through inductor 84 and then through amplifier 86 before being transmitted to band pass filter 64.

Oscillators 62 or 74 could alternatively be designed with adjustable LC circuitry to adjust the frequency needed to be generated by the oscillator circuit.

Figure 5:
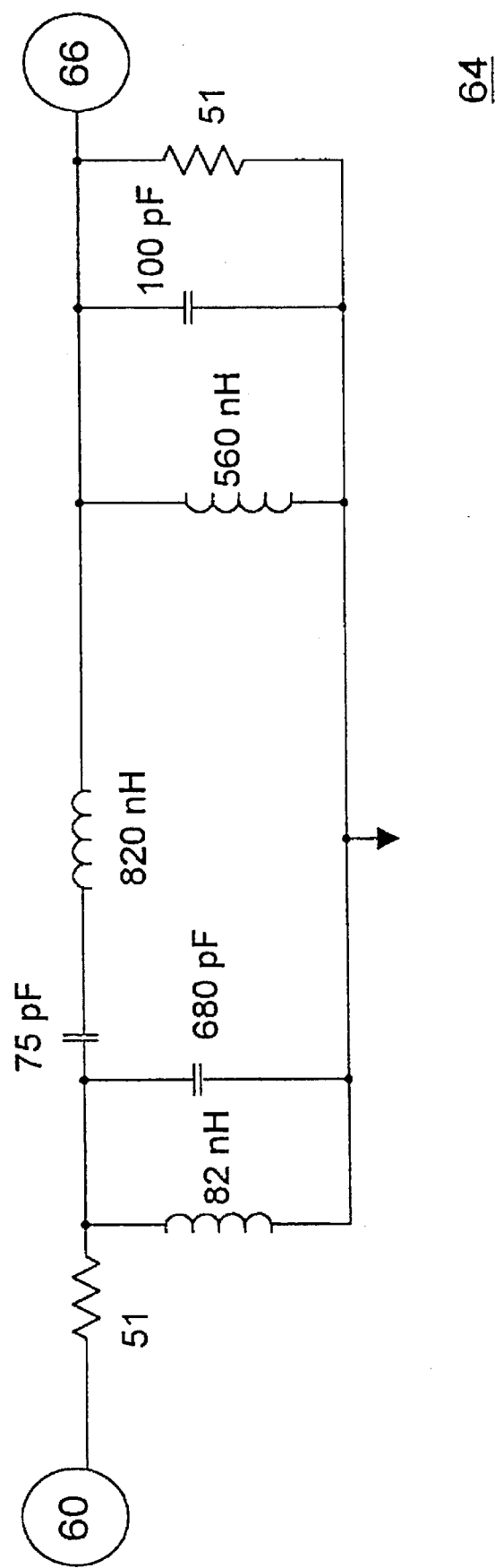
FIG. 5 is a schematic diagram of transmitter band pass filter 64 shown in FIG. 2.

There is shown in FIG. 5 a transmitter band pass filter 64. Band pass filter 64 is designed to pass signals in the 2–30 megahertz frequency and will be understood by those skilled in the art.

Figure 6:
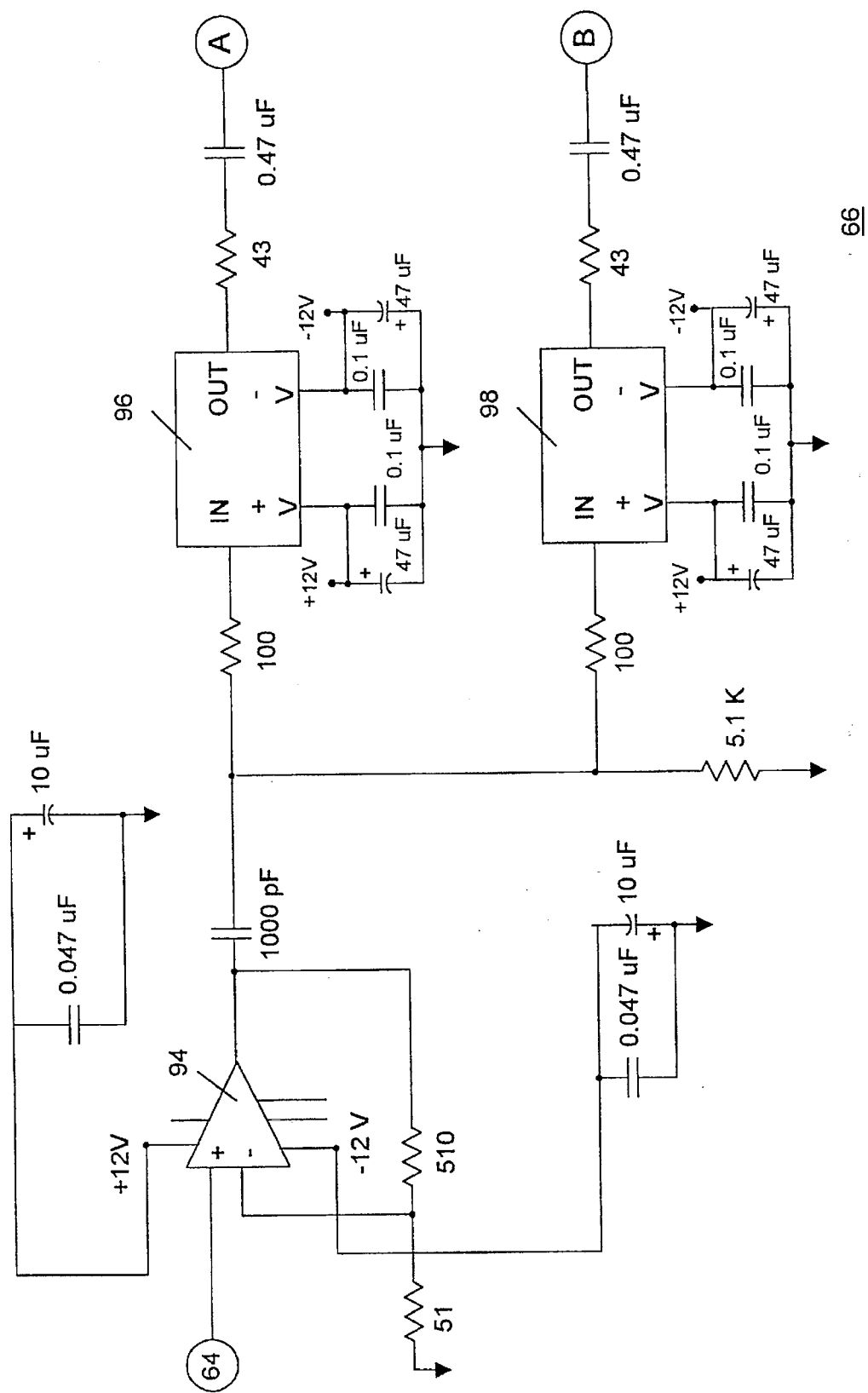
FIG. 6 is a schematic diagram of transmitter 66 shown in FIG. 2.

There is shown in FIG. 6 a schematic diagram for transmitter 66. After the input signal from band pass filter 64 enters transmitter 66, it is amplified at amplifier 94, Part No. AD 811 made by Analog Devices. As the couplers 68 used in an exemplary embodiment of the present invention will transmit a signal with a bandwidth of up to 3 megahertz, two 3 megahertz components must be generated for output. Buffers 96 and 98, Part No. EL 2008 made by Elantec are used to separate out two three megahertz components of the six megahertz video signal. If a signal is being generated between 6 and 12 megahertz as described above, output "A" from buffer 96 would carry 3 megahertz of that signal (i.e., 6 to 9 megahertz) while output "B" from buffer 98 would carry the other 3 megahertz of that signal (i.e., 9 to 12 megahertz). In this way, the full 6 megahertz of the video signal is ultimately output through coupler 68.

Figure 7:
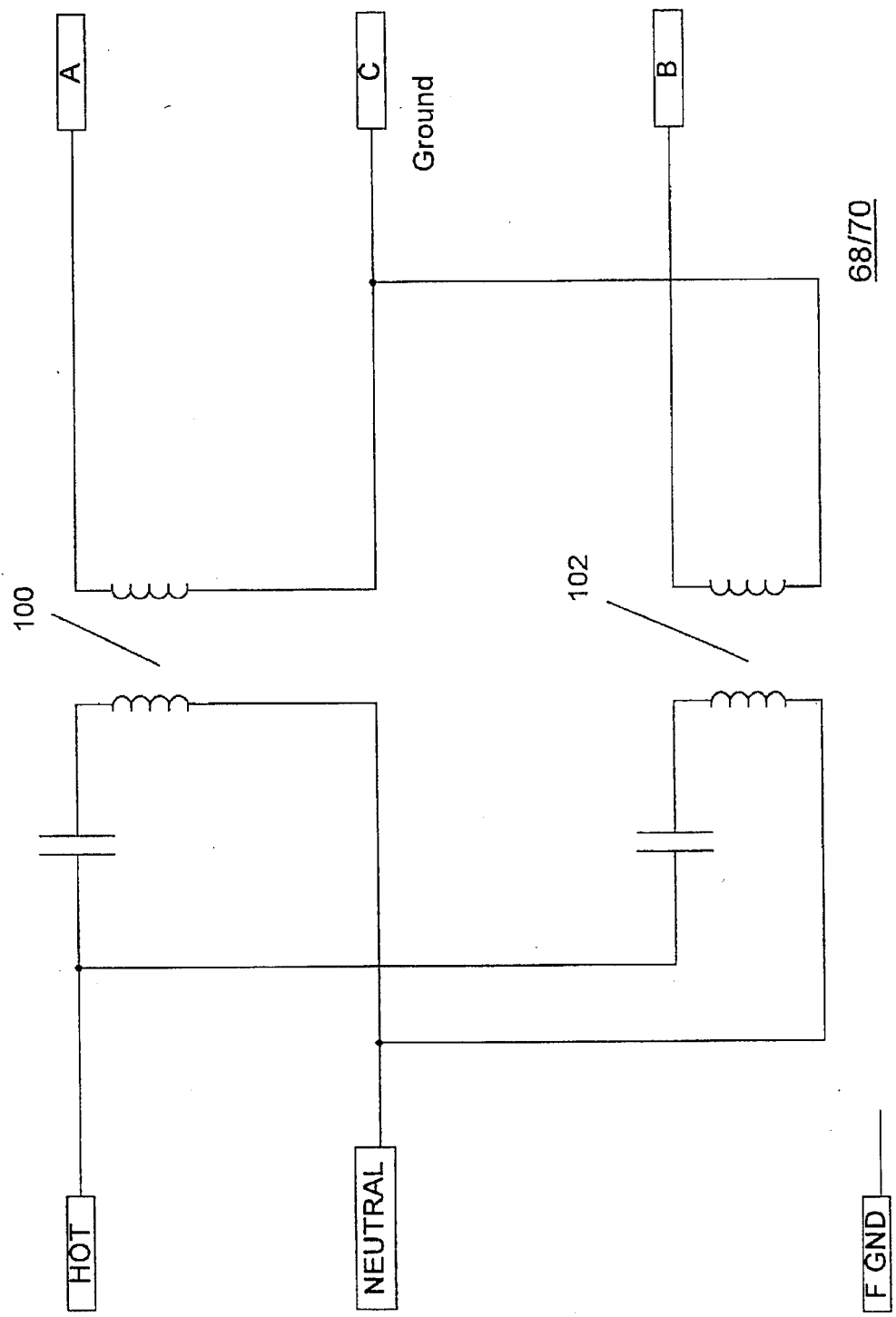
FIG. 7 is a schematic diagram of couplers 68 and 70 shown in FIG. 2.

There is shown in FIG. 7 a diagram of an example coupler which can be used as coupler 68 or coupler 70. Couplers 68 and 70 actually comprise a pair of couplers in order to provide a full 6 megahertz video signal. The "A" and "B" designations correspond to the inputs to the coupler from transmitter 66 (see FIG. 6) in the transmit mode and the output from coupler 70 (see FIG. 8) in the receive mode. Coils 100 and 102 represent the dielectric core (air core) couplers described in Applicant's copending patent application, U.S. application Ser. No. 08/180,421, filed Jan. 11, 1994. As the couplers are designed for use with grounded (three conductor) electrical outlets and wire, ground connections are shown in FIG. 7. Couplers 68 and 70 match the characteristic impedance of the AC electrical wiring using a dielectric core coil.

Figure 8:
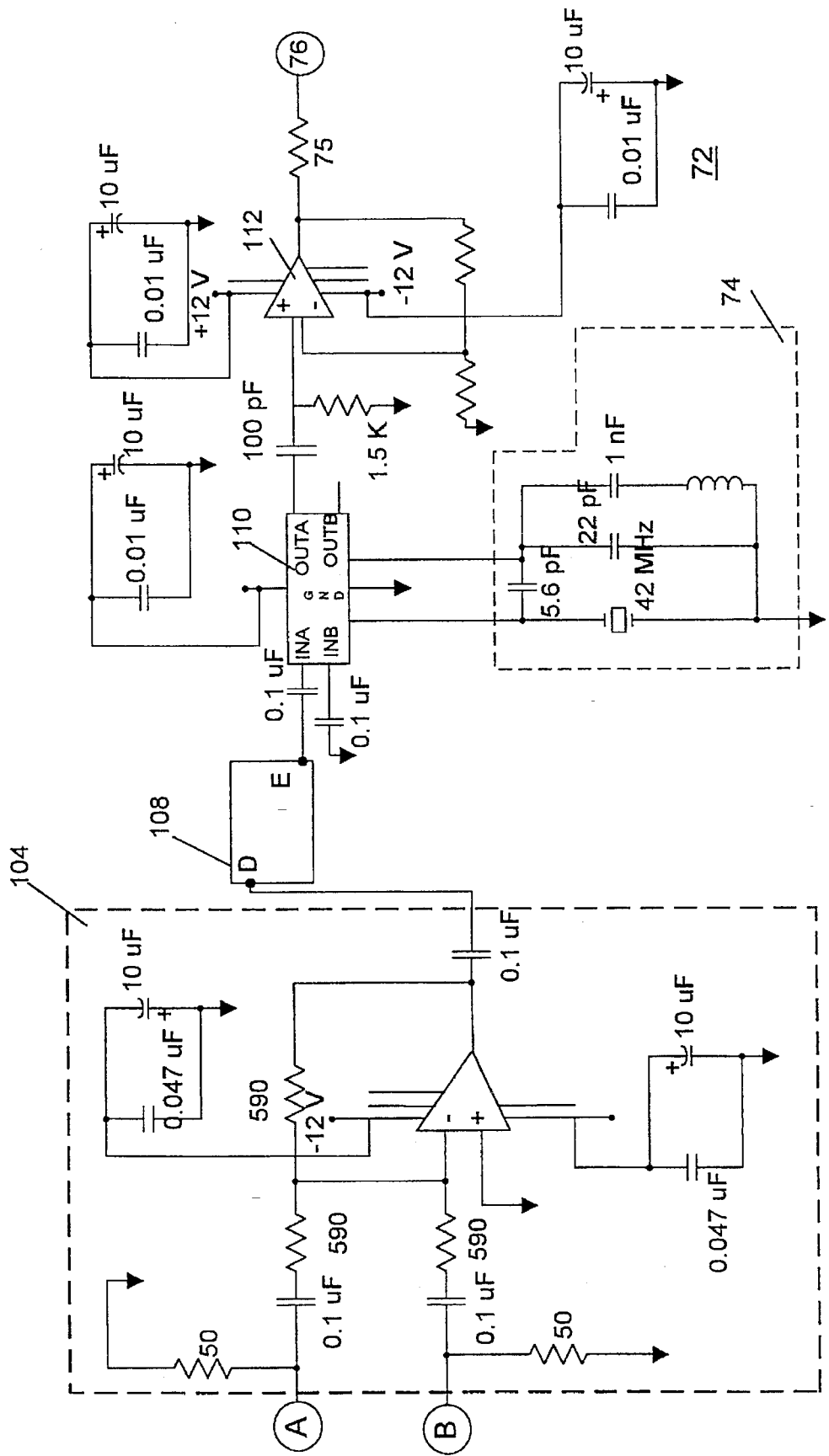
FIG. 8 is a schematic diagram of receiver mixer 72 shown in FIG. 2.

There is shown in FIG. 8 a diagram of an example receiver mixer 72. Receiver mixer 72 contains an adder circuit 104 with inputs "A" and "B", corresponding to outputs "A" and "B" of coupler 70 shown in FIG. 7. Inputs "A" and "B" each receive signals with a bandwidth of 3 MHZ, which when added together in adder circuit 104 recreate the 6 MHZ video signal.

Figure 9:
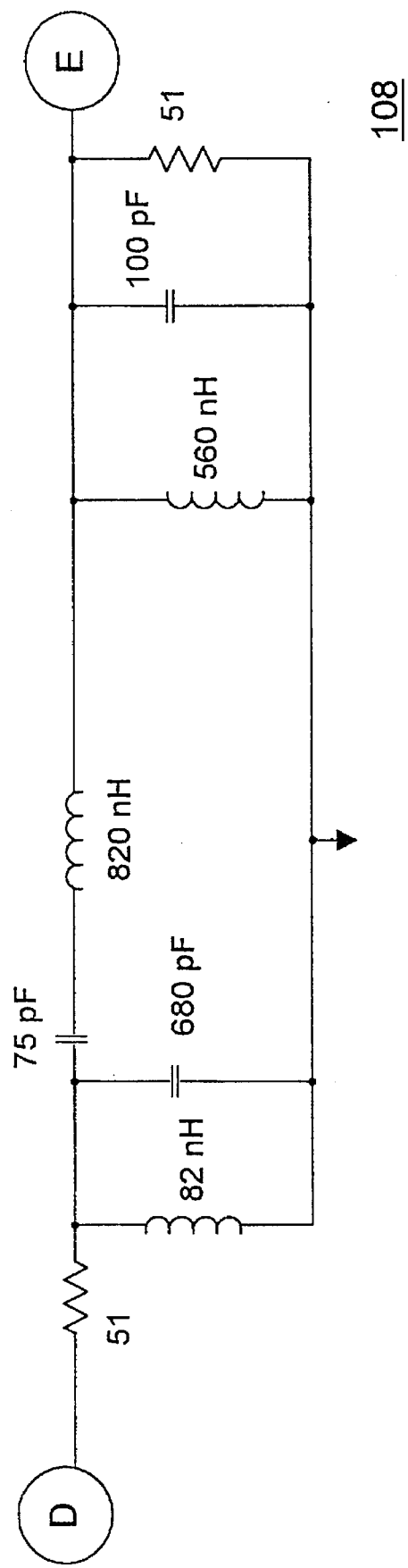
FIG. 9 is a schematic diagram of receiver band pass filter 108 shown in FIG. 8.

The 6 MHZ output signal from adder 104 enters bandpass filter 108 (an example schematic diagram of which is shown in FIG. 9). Bandpass filter 108 in the exemplary embodiment shown in FIG. 8 allows the 18–24 MHZ signal to pass through, filtering out any remaining signal. The output signal from bandpass filter 108 enters mixer 110 which is Part No. NE612 from Phillips, which mixes in a signal (difference signal) from receiver oscillator 74 to up-convert the 6 MHZ video signal to the channel 3 (60–66 MHZ) or channel 4 (66–72 MHZ) frequency. The up-converted signal passes through an amplifier 112, producing an output signal, which is fed into elliptic bandpass filter 76.

There is shown in FIG. 9 a schematic diagram of an example bandpass filter 108 used in receiver mixer 72. Example bandpass filter 108 is tuned to allow the 18–24 MHZ signal to pass, filtering out other frequencies.

Figure 10:
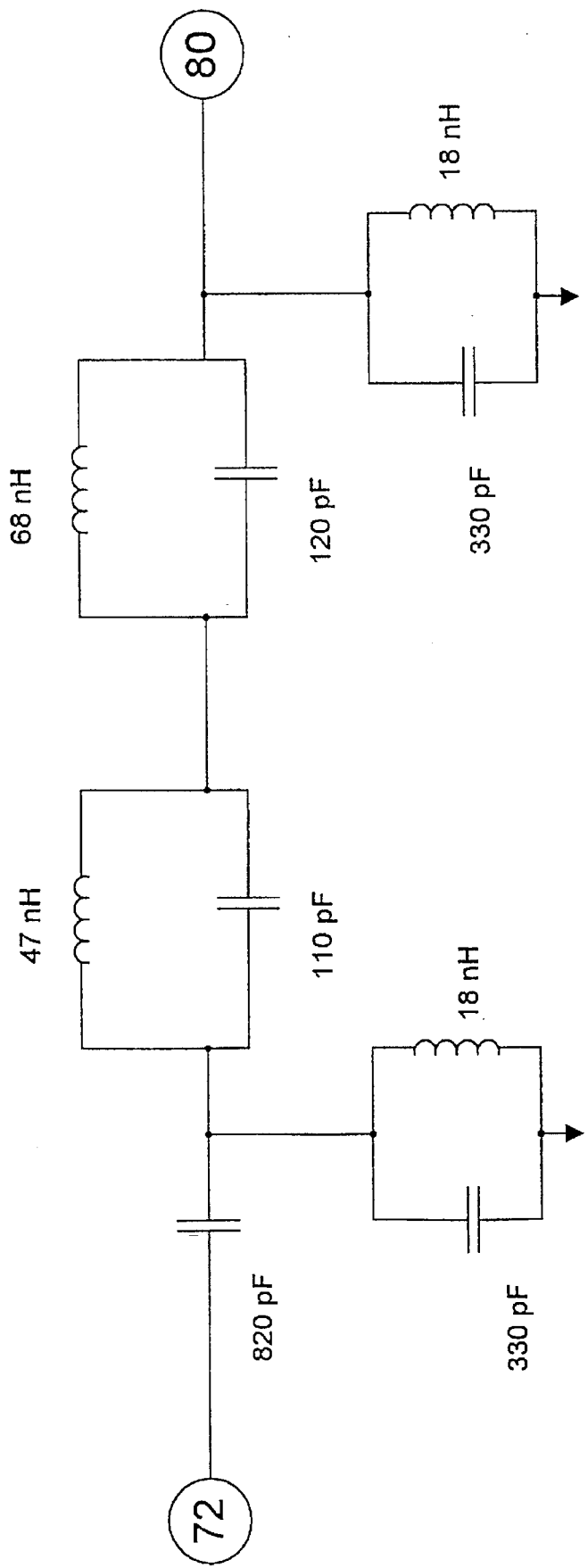
FIG. 10 is a schematic diagram of receiver elliptic band pass filter 76 shown in FIG. 2.

There is shown in FIG. 10 a schematic diagram of an example elliptic bandpass filter 76. Example elliptic bandpass filter 76 is a Bessel filter, which is a linear filter. It is tuned to pass the 60–66 MHZ signal and filter out other signals. It is comprised of capacitive and inductive components.

Figure 11:
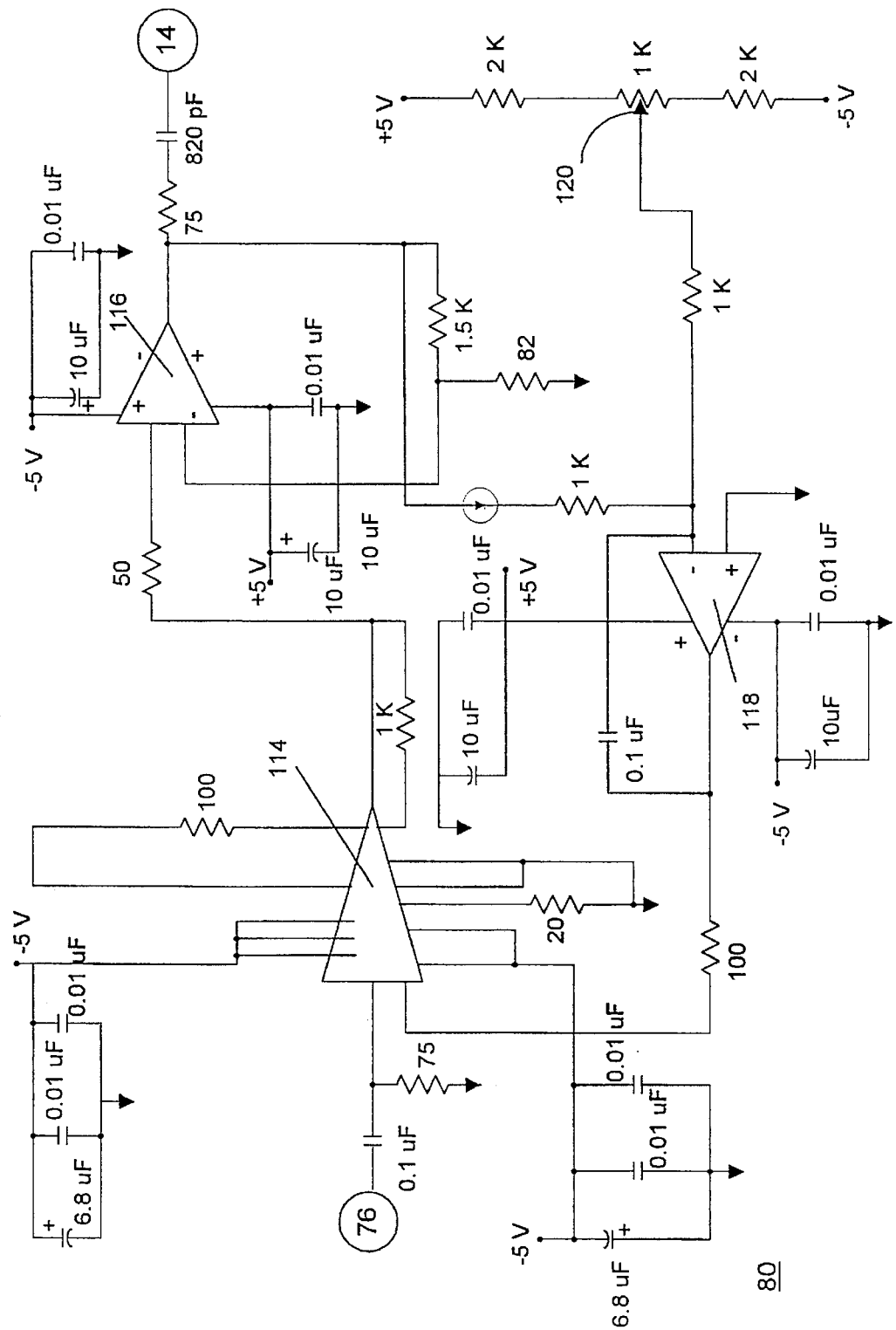
FIG. 11 is a schematic diagram of automatic gain control amplifier 80 shown in FIG. 2.

There is shown in FIG. 11 a schematic diagram of an example Automatic Gain Control (AGC) 80. AGC 80 receives its input from elliptic bandpass filter 76 in receiver section 56. AGC 80 provides increased gain to television 44 to enhance picture quality. AGC 80 includes several amplifiers, namely amplifier 114 (part no. CLC522 by Comlinear), amplifier 116 (part no. CLC401 by Comlinear) and amplifier 118 (part no. CLC420 by Comlinear). A potentiometer 120 is used to set the output level by allowing a DC voltage adjustment of plus or minus one volt.

A television set such as television 44 may be capable of having an input in the 1 volt, peak to peak range. For inputs to AGC 80 in the 30 dB range, AGC 80 is tuned to provide an output (input to television 44) of approximately 1 volt, peak to peak. Using AGC 80 expands the effective distance (for receiving a signal) of system 10 by allowing a remote device to be wired with up to approximately an additional 1000 feet of electrical wiring between the remote device and a distribution device.

Although the present system has been described with respect to signals sent over AC electrical wiring, system 10 could also be used with twisted pair wiring (telephone wiring) instead of AC electrical wiring. A system involving twisted pair wiring increases the distance which a useable signal can travel to approximately 20,000 feet.

The present system has been described as allowing the simultaneous, use of four independent television set because of the four six megahertz bands that can be used between 2 and 30 megahertz. This does not prevent, the use of multiple, dependent viewing/recording devices. For example, if one television set has a PLVC tuned to a particular cable television channel, using one of the four bands which have been allocated between 2 and 30 megahertz, additional PLVC units, tuned to the same band could be used, allowing additional viewing/recording devices to tune to the same channel. Such a set up would be advantageous for applications where multiple viewings of the same program are necessary, such as in schools, businesses and conferences.

Figure 13:
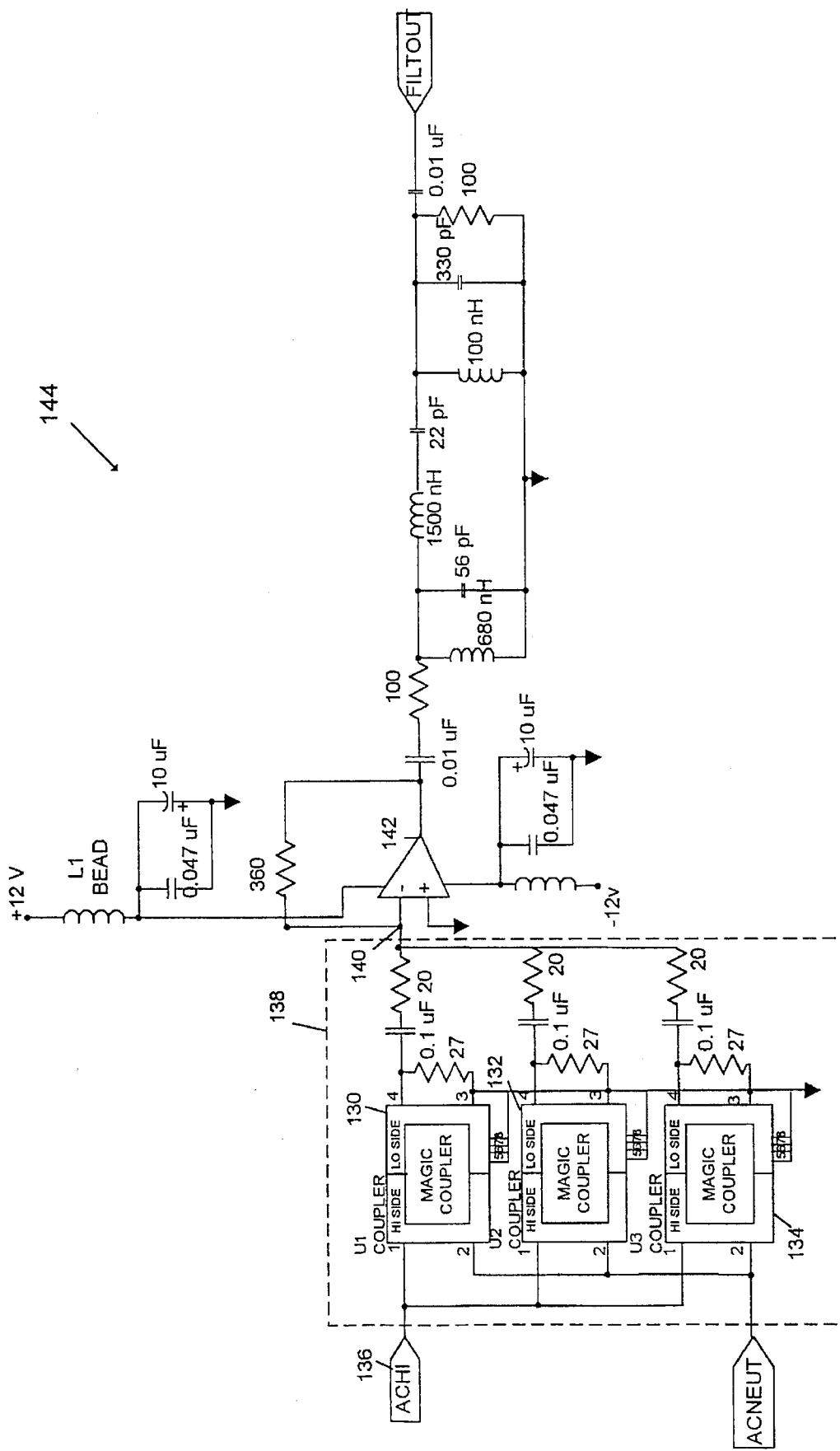
FIG. 13 is a schematic diagram of an improved receiver interface illustrating a multi-pass band power line coupler.

And now a preferred embodiment of the present invention will be described utilizing exemplifications of filtering and band pass technology described generally above. Turning to FIG. 13, it can be seen that there is a plurality of filters within band pass filter group 38. FIG. 13 depicts an improved receiver filtering front end which is comprised of a plurality of filter units, 130, 132 and 134, each of which are tuned to provide a flat response across the bandwidth for each video signal which is 6 MHZ. Using the example of a 6 MHZ wide video signal, lower band coupler 103 would be tuned to have a flat band past response on the first two MHZ, mid-band coupler 132 is designed to provide a flat band pass on the next two MHZ of said video signal, and high band coupler 134 is designed to provide a flat response over the top two MHZ of a 6 MHZ video signal.

The AC signal which is carrying the video information is introduced at input 136 in FIG. 13 and is distributed from AC input 136 in a parallel fashion to the input of each coupler which comprises the filter group 138. The output of each coupler is combined at output 140. Output 140 is introduced into the input of the inverting amplifier 142 for processing the filter output. The output of amplifier 142 is further introduced through band pass filter 152 before providing a filter output to be introduced to receiver attenuator 146.

Figure 12:
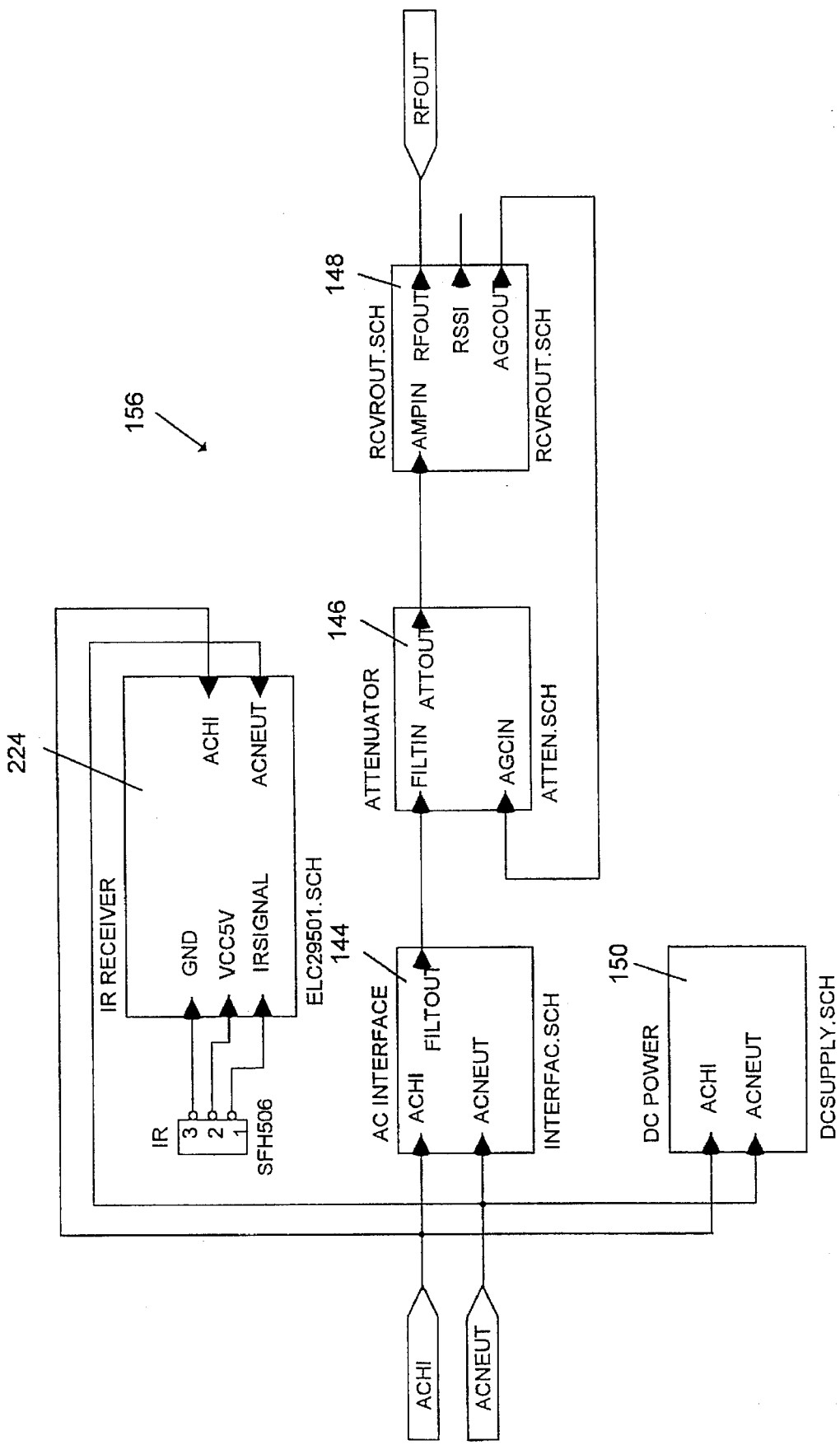
FIG. 12 is a block diagram describing the video receiver in the improved embodiment.
Figure 15:
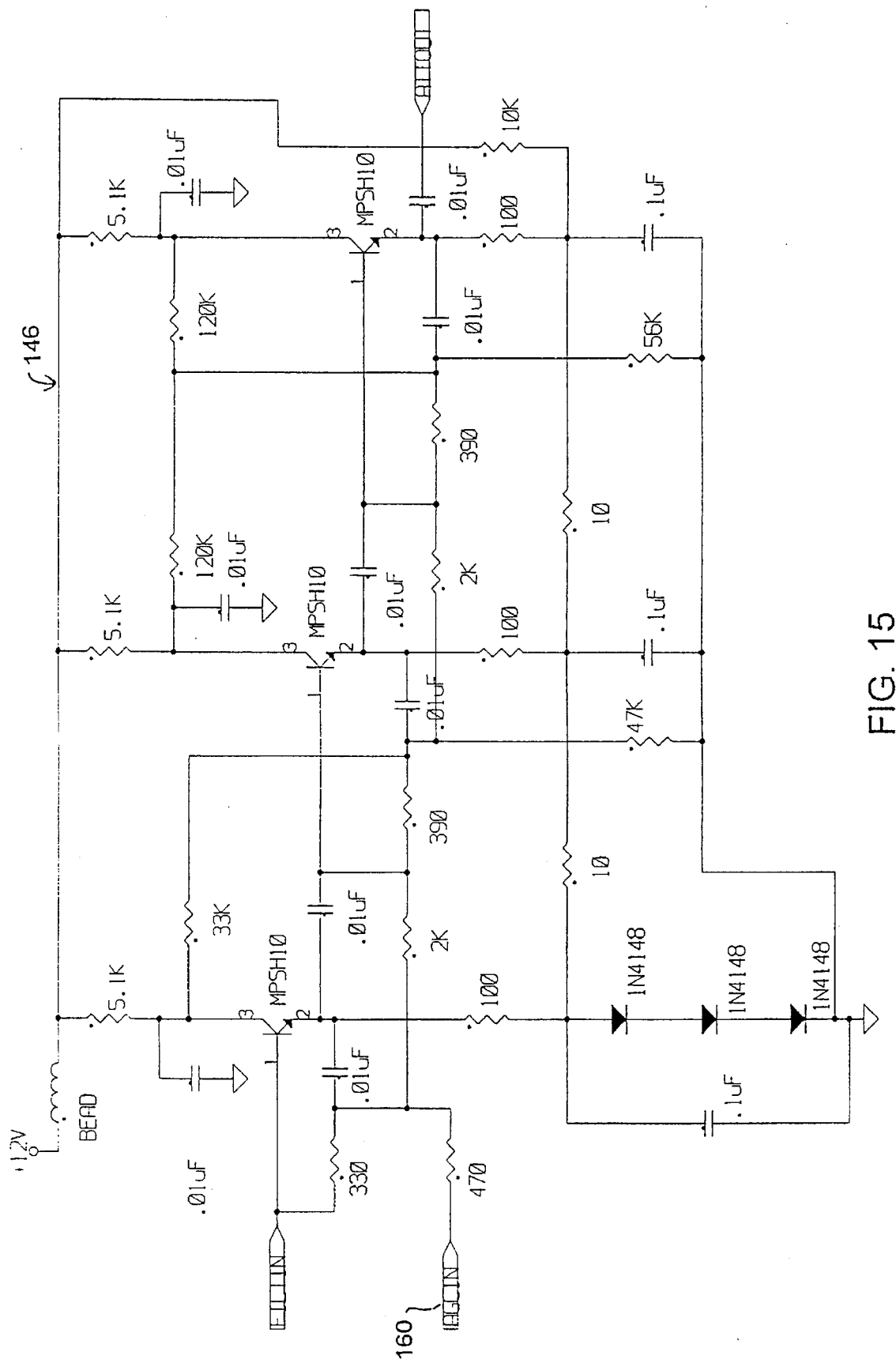
FIG. 15 power line coupled video receiver attenuator circuit.

Turning now to FIG. 12 it can be appreciated that receiver interface 144 is introduced into the input of receiver attenuator 146 detailed in FIG. 15. The construction and operation of attenuator 146, upon review of the schematic diagram disclosed, will be understood by those skilled in the art and is controlled, in part, from an automatic gain control output signal generated receiver AGC 148 shown generally in FIG. 12.

Figure 14:
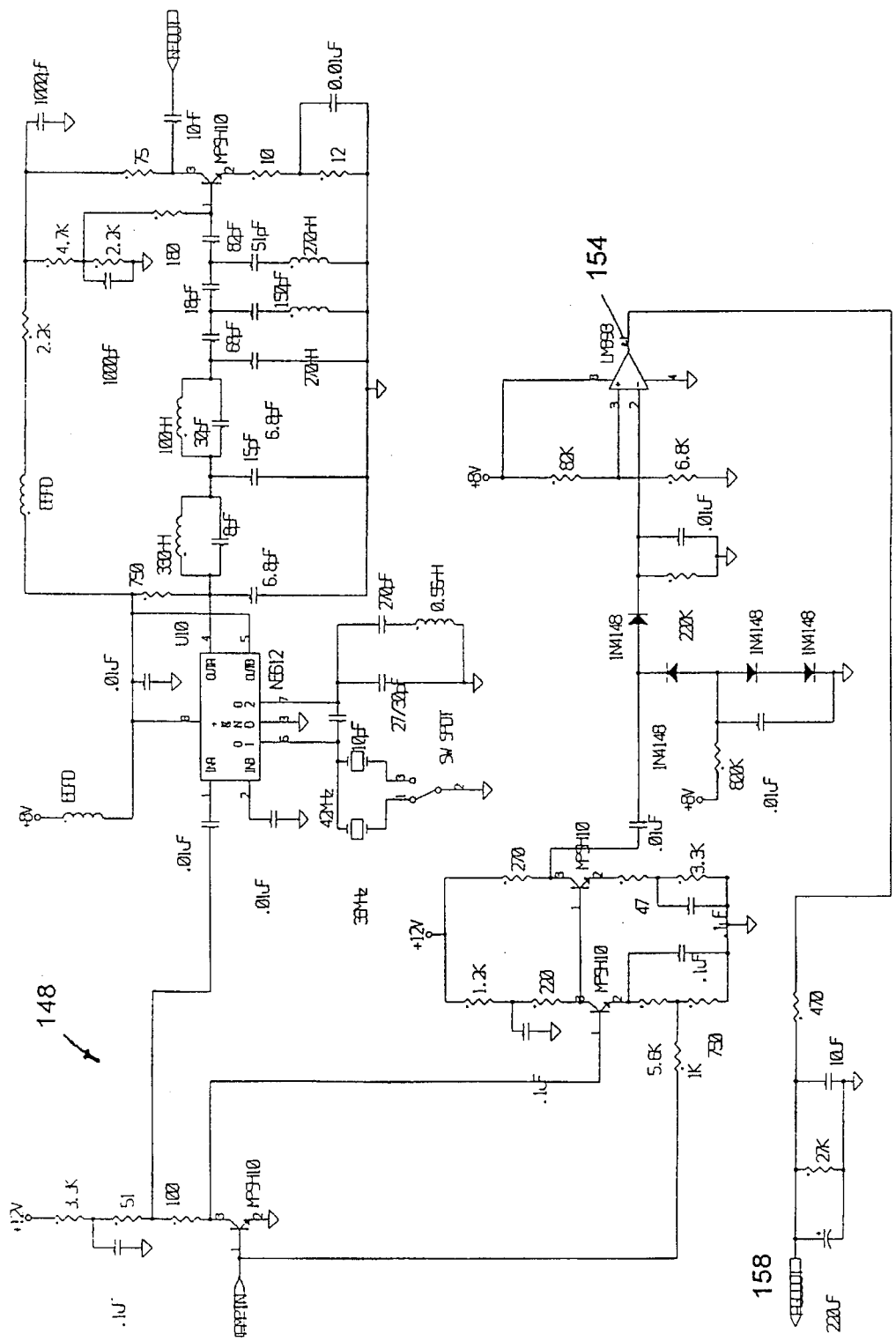
FIG. 14 is a schematic diagram of a power line video line receiver output automatic gain control.

Turning to FIG. 14, receiver AGC 148 is shown in its detail as provided in the preferred embodiment. Receiver AGC 148 also acts as a mixer to essentially provide a video signal selected, converted to a broadcast frequency in which a common TV receiver or other monitor can be tuned without modification. Upon review of FIG. 14, it would be appreciated that the input of the receiver AGC 148 is a high frequency RF signal containing the video to be decoded, introduced from a attenuator 146. The mixer disclosed in the preferred embodiment allows the ability of the user to select an IF frequency by selecting which crystal is used in the mixer to provide for an output in either broadcast TV channel 3 or channel 4, as may be desired by the user.

An improved design allows for threshold control of the video signal using a comparator circuit shown at 154 in FIG. 14. Comparator 154 provides an improved AGC signal for feeding back to a attenuator 146 depicted generally in FIG. 13. Working off a noise threshold, comparator 154 provides a positive signal to a attenuator 146 when the threshold video signal is adequate to provide good reception of the signal being decoded from the AC line. It can be appreciated that comparator 154 will select zero output such to send a signal to a attenuator 146 through its AGC output to provide for little or no amplification of the signal, unless a signal is actually being received of sufficient strength to be useable.

An important feature of this new AGC 148 is the use of the comparator, where the preferred embodiment is a component type LM 393 shown in the schematic depicted in FIG. 14. With use of a comparator for an AGC circuit, there is an enhancement processing of the video. Conventionally AGC circuits generally provide a linear output, increasing with the increase of input signal until a certain threshold is reached. Such threshold, conventionally AGC circuits general begin to hold the output amplitude of the signal it is processing at a given design level regardless of the continuing increase of the input signal. The disclosed invention, Comparator 154 provides almost no output, regardless of any input signal being present in the Comparator 154 unless and until a given design threshold level is reached. Such threshold level is normally the minimum useable signal which would provide an acceptable picture in the video system disclosed in the present invention. After the threshold is reached, the Comparator circuit switch is on and provides a constant output shown at 158 in FIG. 14. FIG. 15 shows receive attenuator 146, which receives the output of the AGC circuit described in FIG. 14.

Figure 16:
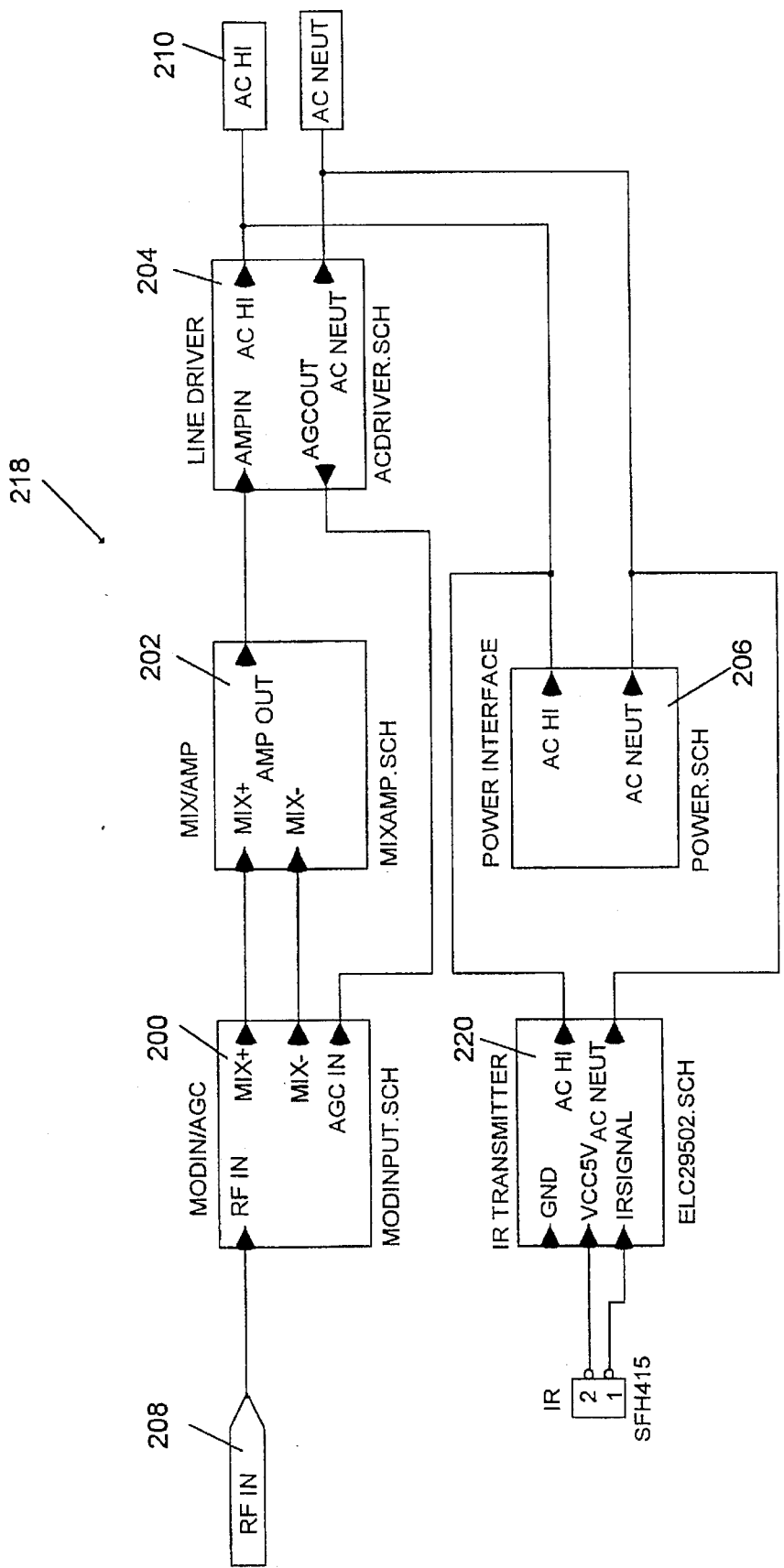
FIG. 16 is a block diagram of a power line coupled video transmitter.

Turning to FIG. 16, block diagram of the AC video transmitter 218 is shown. The output of an RF video generating devices is connected to RF input 208. An RF generating device or source can be a CATV signal introduced into a home, or a video cassette recorder which has an output which is normally connected to a standard TV receiver as earlier described. RF input at 208 is introduced into video modulator and AGC 200 which processes the signal so that in its preparation or being mixed to a suitable frequency for AC power line transmission. The output of AGC 200 is introduced into the mixer amplifier 202, which is described in more detail in FIG. 19. Output of mixer 202 is introduced in a line driver 204 which provides the coupling circuits and the filter pass band couplers which are similar to those described in the receive circuit. Also shown in FIG. 16 is a power interface and infrared transmitter 220. Infrared transmitter 220 is utilized to provide for remote control access of the RF video generation device, whether it be a cable TV interface, a video cassette recorder or some other device located at a central location in the home. Should one wish to have control of the remote device, such as a VCR, which is not within view of the infrared hand held transmitter, commonly used with such devices, it can be appreciated that remote transmission of the IR signal will be necessary. In a similar fashion to that of a video signal, it is possible to receive the infrared remote control commands locally, using a device with an IR receiver placed next to the TV monitor being used. Upon receipt of the infrared command signals from the user, IR signals are converted and transmitted over the power line using the same technology disclosed for the video signal and detailed herewith. The infrared transmission control signals are thereby transmitted over the power wiring of the house, similar to the video being used, and received at the remote location where the VCR is introducing a video signal to a transmitter such as that depicted generally in 218. Infrared command signals are converted back to infrared through a transmitter, the output infrared device is placed in the proximity of the video device being used, such as a VCR, so that the reproduced infrared signals can be retransmitted to the infrared input within the VCR. Thus, the infrared signals from the hand held device in the hands of the operator are relayed through the AC power line and are thereby retransmitted to a location which is an infrared line of sight device being controlled.

Figure 17:
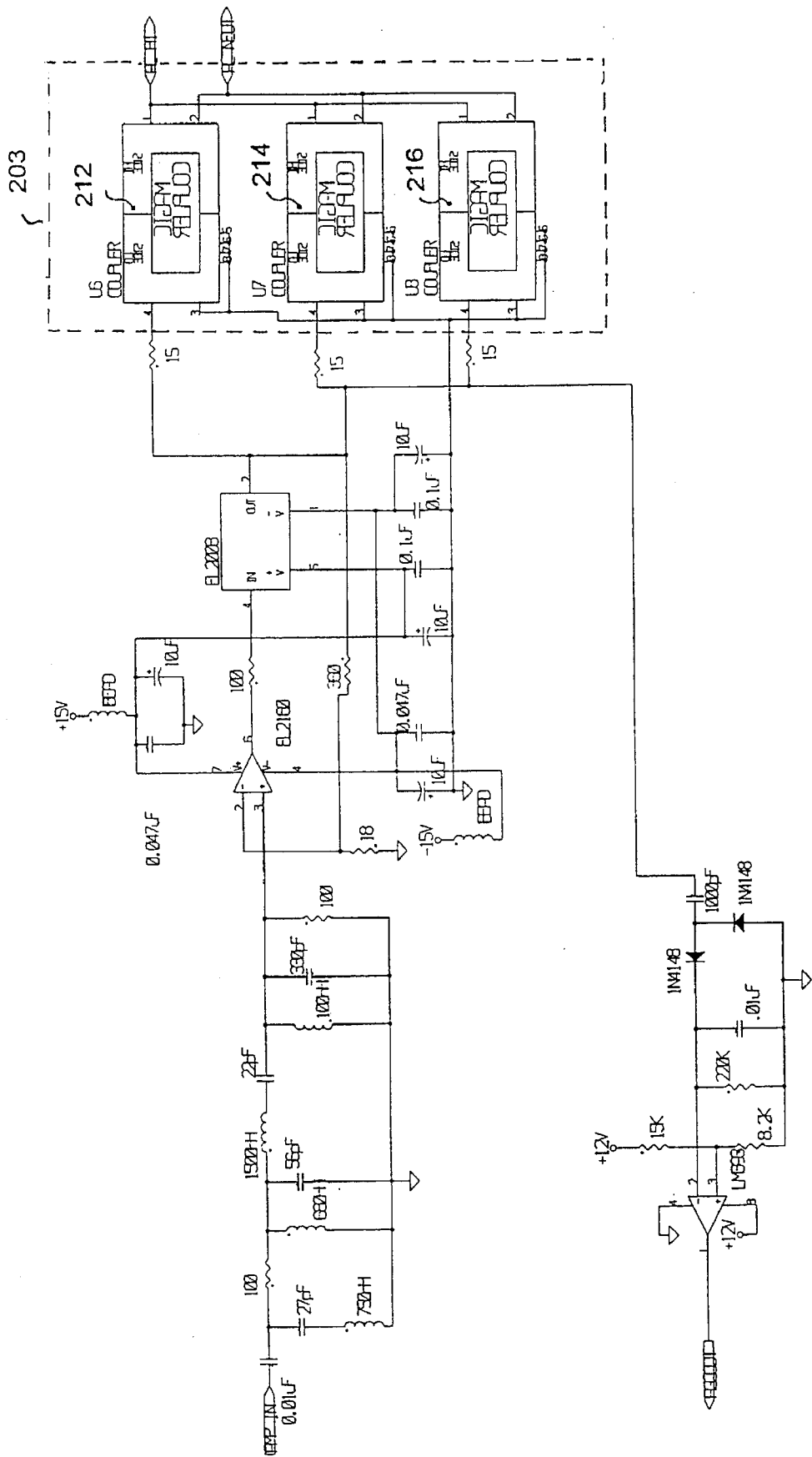
FIG. 17 is a schematic diagram of a power line coupled video transmitter depicting the AC line driver circuit.
Figure 18:
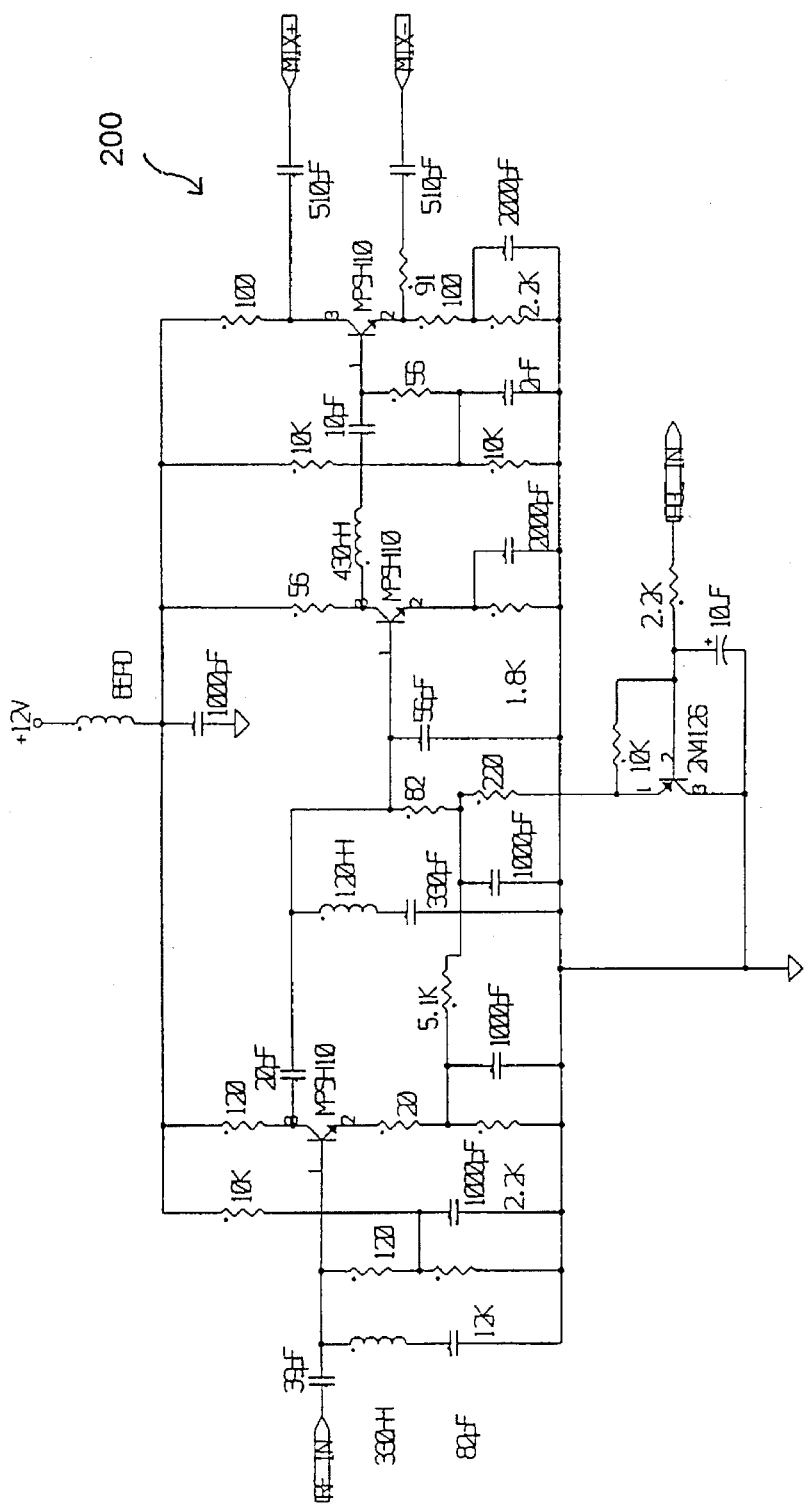
FIG. 18 is a schematic diagram of a power line coupled video transmitter AGC and mixing circuit.

Turning now to FIG. 17, a schematic diagram depicting line driver 204 is shown. An improved feature line driver 204 is transmitter filter group 203, which is comprised of three separate band pass filters 212, 214 and 216. In a fashion similar to that described in a receiver front end section, each of the filters in group 203 are tuned to prove relatively flat band pass of approximately of 2 MHZ of the 6 MHZ video signal being processed. By utilizing parallel band pass filters as described in both the receiver and the transmitter, it is possible to get a smoother and flatter band pass over the 6 MHZ spectrum desired. Also, there is linear phase shift over the band pass in question, providing a superior signal response to those coupler devices which utilize other coupling systems, such as ferrite core and other coupling technologies. The device is referred to as couplers in the diagrams are detailed in appended patent application entitled Improved Transformer Coupler for Communications Over Various Lines appended herewith. In FIG. 18, video AGC 200 is described in detail.

Figure 19:
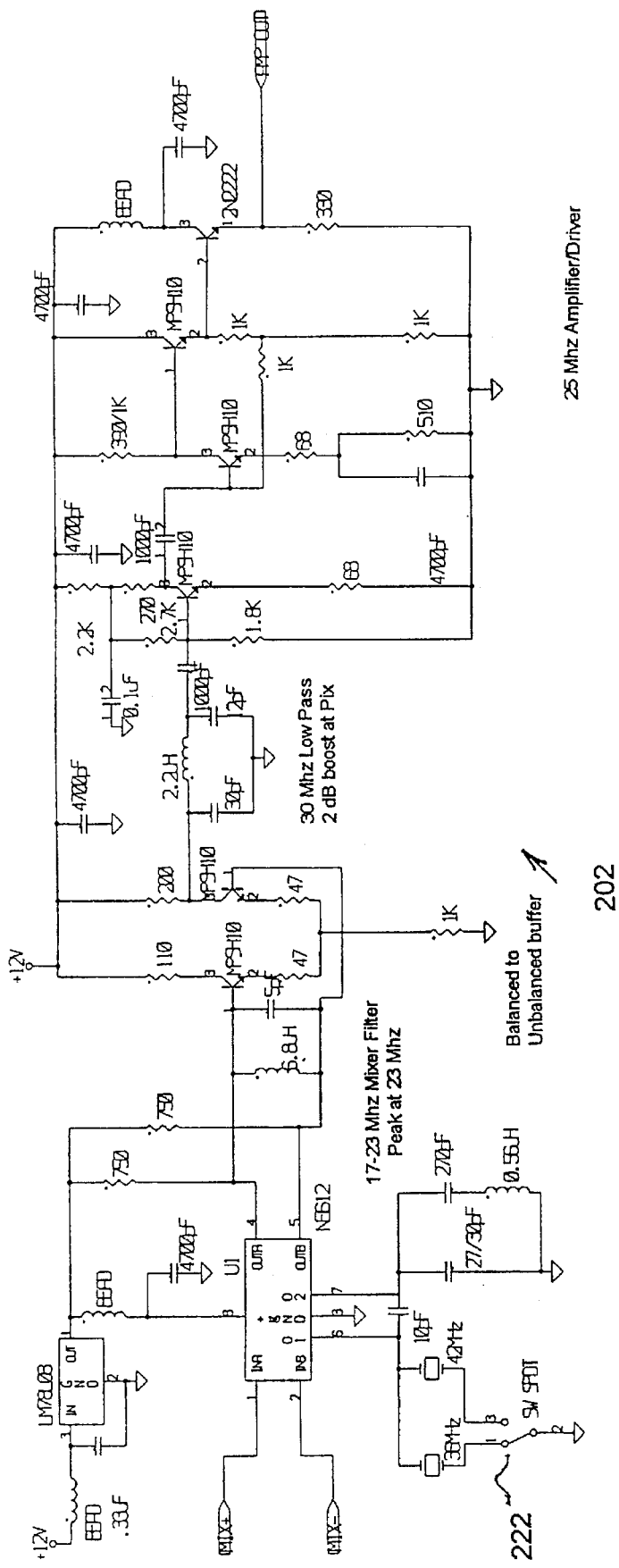
FIG. 19 is a schematic diagram depicting a power line coupled video transmitter mixing and amplification circuit.

FIG. 19 provides a detailed description of transmitter mixer 202, showing particularly the mixing circuit utilized including the ability to select an IF frequency by selection of particular IF crystal selector switch 222. The output of transmitter mixer 202 in FIG. 19 coupled to the line driver in 204 is described in FIG. 16.

Figure 20:
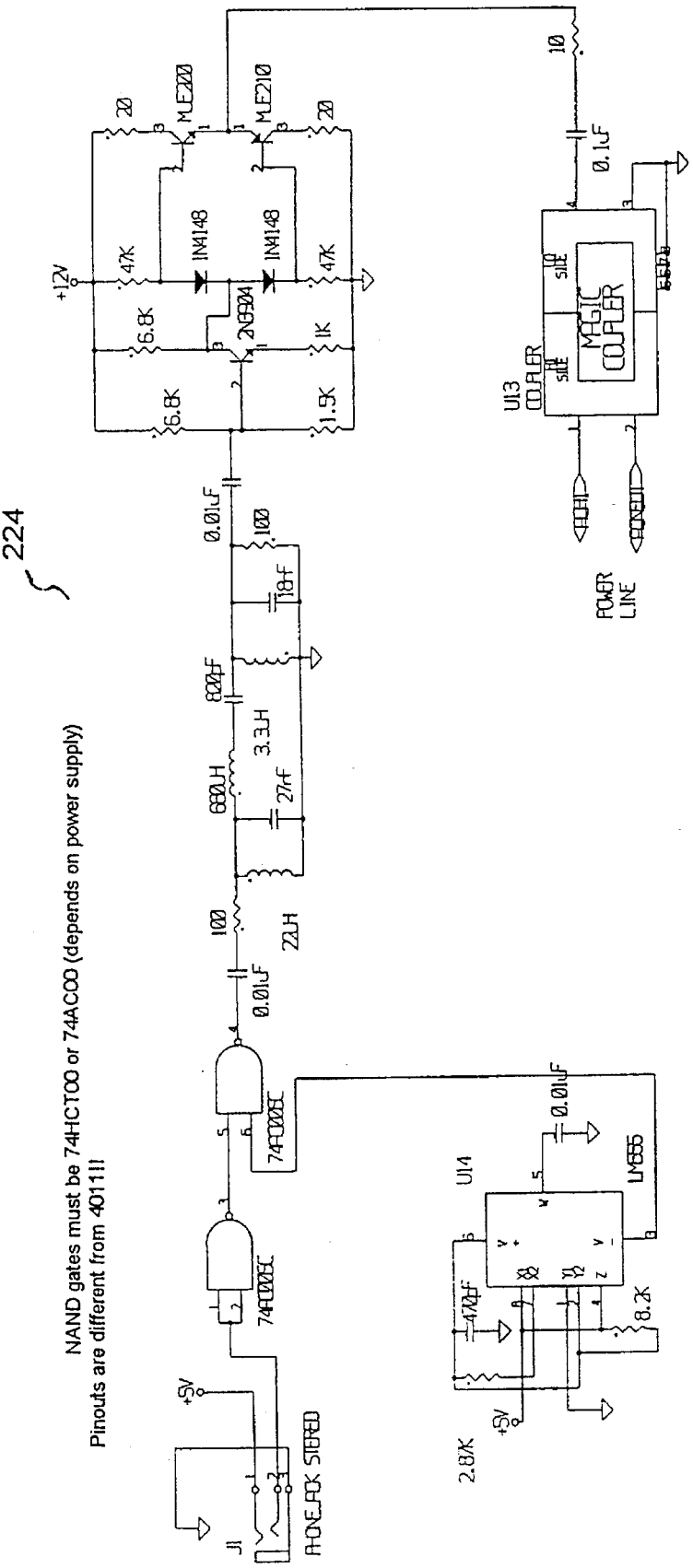
FIG. 20 is a schematic diagram of an AC power line coupled infrared remote control receiver.

FIG. 20 depicts an infrared receiver system to be used in conjunction with infrared transmitter 220.

Figure 21:
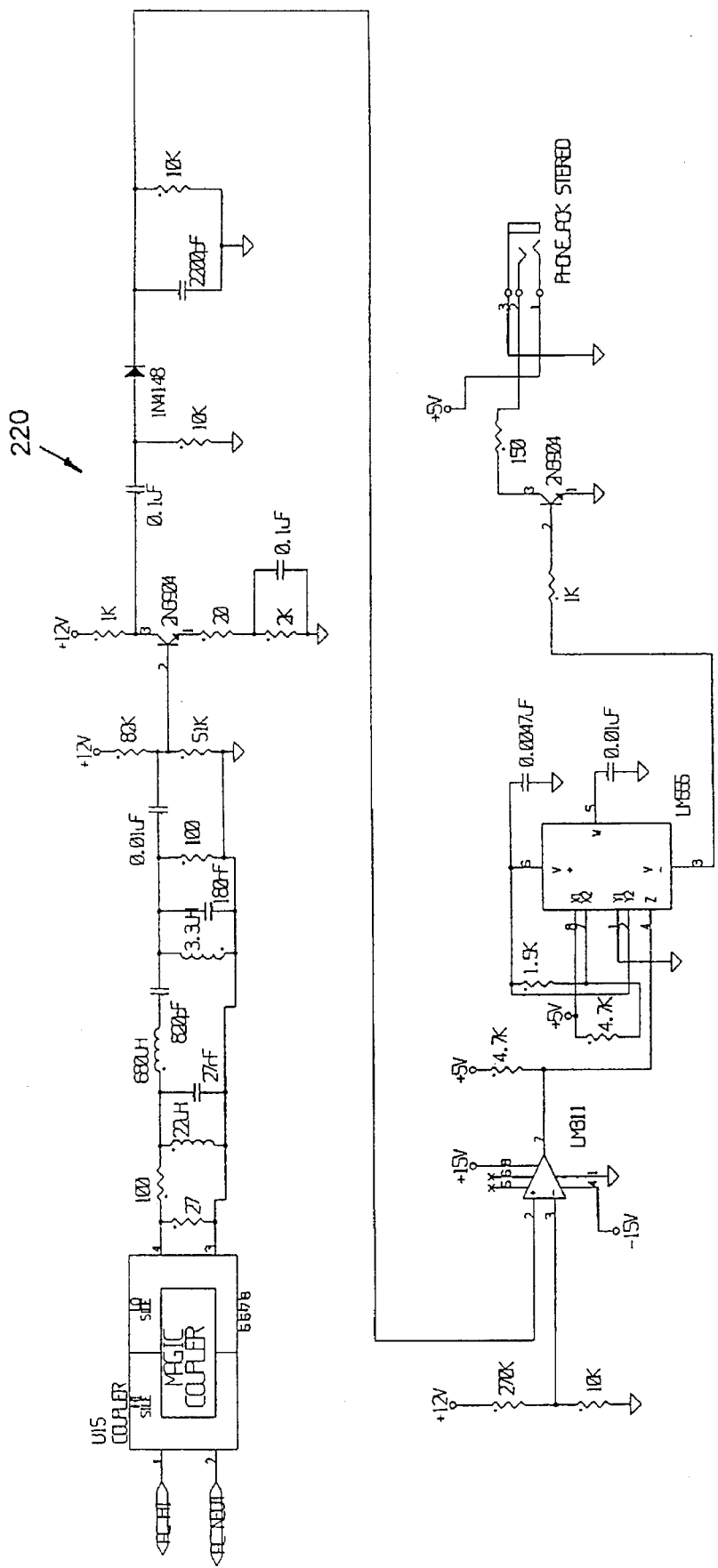
FIG. 21 is a schematic diagram illustrating the AC power line coupled infrared transducer.

FIG. 21 illustrates a preferred embodiment of the IR transmitter 220. It will be appreciated that the IR receiver in FIG. 20 and the IR transmitter in FIG. 21 work in conjunction to provide the remote control of the video device as described above.

While particular embodiments of the present invention are disclosed herein, it is not intended to limit the invention to such disclosure, and changes and modifications may be incorporated and embodied within the scope of the following claims:

What is claimed:

1. A video distribution system for selectively distributing video signals originating from at least one video signal source having a plurality of independent video signals comprising:

a) a display monitor;

b) AC electrical wiring;

c) a remote device connected to said display monitor and to said AC electrical wiring comprising:
   1) a first video signal selector device for generating a selection signal corresponding to one of said plurality of independent video signals,
   2) a first transmitter/receiver tuned to a first frequency band for:
      I) matching the characteristic impedance of said AC electrical wiring,
      ii) transmitting said selection signal over said AC electrical line, and
      iii) receiving said one of said plurality of independent video signals;

d) a distribution device connected to said AC electrical wiring and to said at least one video signal source comprising:
   1) a second transmitter/receiver tuned to said first frequency band for:
      I) matching the characteristic impedance of said AC electrical wiring,
      ii) receiving said selection signal, and
      iii) transmitting said one of said plurality of independent video signals corresponding to said selection signal over said AC electrical line to said first power line coupler;
   2) a second video signal selector for tuning said one of said plurality of independent video signals from said video signal source for transmission to said display monitor.

2. The video distribution system as recited in claim 1 further comprising a second remote device and a second distribution device each having a respective, first and second transmitter/receiver tuned to a second frequency band.

3. The video distribution system as recited in claim 2 further comprising a third remote device and a third distribution device each having a respective, first and second transmitter/receiver tuned to a third frequency band.

4. The video distribution system as recited in claim 3 further comprising a fourth remote device and a fourth distribution device each having a respective first and second transmitter/receiver tuned to a fourth frequency band.

5. The video distribution system as recited in claim 1 wherein said first and second transmitter/receiver's are tuned to a frequency band between 2 and 30 MHZ.

6. The video distribution system as recited in claim 2 wherein all of said transmitter/receiver's are tuned to frequency bands between 2 and 30 MHZ.

7. The video distribution system as recited in claim 3 wherein all of said transmitter/receiver's are tuned to frequency bands between 2 and 30 MHZ.

8. The video distribution system as recited in claim 1 wherein said first frequency band is between 6 and 7 MHZ wide.

9. The video distribution system as recited in claim 2 wherein said first frequency band and said second frequency band are between 6 and 7 MHZ wide.

10. The video distribution system of claim 1 further comprising at least one additional remote device connected to said AC electrical wiring and an additional display monitor, having an additional transmitter/receiver tuned to the same frequency band as said first transmitter/receiver.

11. The video distribution system of claim 1 wherein said one of said plurality of independent video signals is transmitted a distance in the range of 1 to 1000 feet.

12. The video distribution system as recited in claim 1 wherein the matching of the characteristic impedance of said AC electrical wiring utilizes multiple power line couplers, each tuned to a band pass which is less than the total band pass of each said video signal.

13. The video distribution system of claim 1 further comprising a remote control device which relays said selection signal from a portable infrared transmitter.

14. A video distribution system for selectively distributing video signals originating from at least one video signal source having a plurality of independent video signals comprising:

a) a display monitor;

b) an electrical conductor;

c) a remote device connected to said display monitor and to said electrical conductor comprising:
   1) a first video signal selector device for generating a selection signal corresponding to one of said plurality of independent video signals,
   2) a first transmitter/receiver tuned to a first frequency band for:
      i) matching the characteristic impedance of said electrical conductor,
      ii) transmitting said selection signal over said electrical conductor, and
      iii) receiving said one of said plurality of independent video signals;

d) a distribution device connected to said electrical conductor and to said at least one video signal source comprising:
   1) a second transmitter/receiver tuned to said first frequency band for:
      i) matching the characteristic impedance of said electrical conductor,
      ii) receiving said selection signal, and
      iii) transmitting said one of said plurality of independent video signals corresponding to said selection signal over said electrical conductor to said first power line coupler;
   2) a second video signal selector for tuning said one of said plurality of independent video signals from said video signal source for transmission to said display monitor.

* * * * *